(12) United States Patent
Senda et al.

(10) Patent No.: US 11,092,130 B2
(45) Date of Patent: Aug. 17, 2021

(54) IGNITION TIMING CONTROL DEVICE FOR INTERNAL COMBUSTION ENGINE

(71) Applicant: TOYOTA JIDOSHA KABUSHIKI KAISHA, Toyota (JP)

(72) Inventors: Kenji Senda, Okazaki (JP); Masahiro Mori, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/891,648

(22) Filed: Jun. 3, 2020

(65) Prior Publication Data

US 2021/0088019 A1     Mar. 25, 2021

(30) Foreign Application Priority Data

Sep. 24, 2019   (JP) .............................. JP2019-173169

(51) Int. Cl.
| | | |
|---|---|---|
| *F02P 5/152* | (2006.01) | |
| *F02P 5/06* | (2006.01) | |
| *G06N 3/04* | (2006.01) | |
| *F02P 5/10* | (2006.01) | |
| *G06N 3/08* | (2006.01) | |

(52) U.S. Cl.
CPC .................. *F02P 5/152* (2013.01); *F02P 5/06* (2013.01); *F02P 5/106* (2013.01); *G06N 3/0454* (2013.01); *G06N 3/08* (2013.01)

(58) Field of Classification Search
CPC ... F02P 5/152; F02P 5/06; F02P 5/106; G06N 3/0454; G06N 3/06

USPC ............. 123/406.58, 406.29, 406.21, 406.22
See application file for complete search history.

(56) References Cited

U.S. PATENT DOCUMENTS

| 4,633,835 A | 1/1987 | Akasu | |
|---|---|---|---|
| 4,899,710 A * | 2/1990 | Takahashi | G01L 23/225 |
| | | | 123/406.35 |
| 6,012,425 A * | 1/2000 | Unland | G01L 23/225 |
| | | | 123/406.38 |
| 2006/0185422 A1* | 8/2006 | Iwade | G01L 23/225 |
| | | | 73/35.09 |

FOREIGN PATENT DOCUMENTS

| JP | 8-26838 B2 | 3/1996 |
|---|---|---|
| JP | 2006-226967 A | 8/2006 |
| JP | 4367529 B2 | 11/2009 |

* cited by examiner

*Primary Examiner* — Mahmoud Gimie

(74) *Attorney, Agent, or Firm* — Oblon, McClelland, Maier & Neustadt, L.L.P.

(57) ABSTRACT

An ignition timing control device for an internal combustion engine includes a storage device and a processor. The storage device stores a first learned neural network and a second learned neural network. The processor is configured to perform, in a next cycle where ignition timing is delayed, control to delay the ignition timing in a cycle after the next cycle based on a difference between a predictive value of an estimate of a value representing knocking intensity calculated with use of the second learned neural network and the estimate of the value representing the knocking intensity calculated with use of the first learned neural network. When the difference is larger than a predetermined set value, the processor is configured not to perform the control to delay the ignition timing in the cycle after the next cycle.

14 Claims, 38 Drawing Sheets

FIG. 9

| No. | $x_1$ | $x_2$ | ........... | $x_{n-1}$ | $x_n$ | $y_t$ |
|---|---|---|---|---|---|---|
| 1 | $x_{11}$ | $x_{21}$ | ........... | $x_{n-11}$ | $x_{n1}$ | $y_{t1}$ |
| 2 | $x_{12}$ | $x_{22}$ | ........... | $x_{n-12}$ | $x_{n2}$ | $y_{t2}$ |
| ... | ... | ... | ... | ... | ... | ... |
| m-1 | $x_{1m-1}$ | $x_{2m-1}$ | ........... | $x_{n-1m-1}$ | $x_{nm-1}$ | $y_{tm-1}$ |
| m | $x_{1m}$ | $x_{2m}$ | ........... | $x_{n-1m}$ | $x_{nm}$ | $y_{tm}$ |

| | INPUT PARAMETER |
|---|---|
| $xx_1$ | ENGINE SPEED NE |
| $xx_2$ | ENGINE LOAD L |
| $xx_3$ | EGR RATE ER |
| $xx_4$ | DELAY AMOUNT $\alpha$ OR ADVANCE AMOUNT $\beta$ |
| $xx_5$ | ESTIMATE yeo |

FIG. 28

| CYCLE NUMBER | NE | L | ER | ye | α OR β | Δye |
|---|---|---|---|---|---|---|
| 1 | $NE_1$ | $L_1$ | $ER_1$ | $ye_1$ | | |
| 2 | $NE_2$ | $L_2$ | $ER_2$ | $ye_2$ | | |
| ⋮ | ⋮ | ⋮ | ⋮ | ⋮ | ⋮ | ⋮ |
| $k_{n-1}$ | $NE_{n-1}$ | $L_{n-1}$ | $ER_{n-1}$ | $ye_{n-1}$ | | |
| $k_n$ | $NE_n$ | $L_n$ | $ER_n$ | $ye_n$ | | |
| $k_{n+1}$ | $NE_{n+1}$ | $L_{n+1}$ | $ER_{n+1}$ | $ye_{n+1}$ | α | $\Delta ye_{n+1} = ye_n - ye_{n+1}$ |
| $k_{n+2}$ | $NE_{n+2}$ | $L_{n+2}$ | $ER_{n+2}$ | $ye_{n+2}$ | α | $\Delta ye_{n+2} = ye_{n+1} - ye_{n+2}$ |
| $k_{n+3}$ | $NE_{n+3}$ | $L_{n+3}$ | $ER_{n+3}$ | $ye_{n+3}$ | β2 | |
| $k_{n+4}$ | $NE_{n+4}$ | $L_{n+4}$ | $ER_{n+4}$ | $ye_{n+4}$ | β2 | |
| ⋮ | ⋮ | ⋮ | ⋮ | ⋮ | ⋮ | ⋮ |

FIG. 29

| No. | $xx_1$ | $xx_2$ | $xx_3$ | $xx_4$ | $xx_5$ | $y_t$ |
|---|---|---|---|---|---|---|
| 1 | $xx_{11}$ | $xx_{21}$ | $xx_{31}$ | $xx_{41}$ | $xx_{51}$ | $y_{t1}$ |
| 2 | $xx_{12}$ | $xx_{22}$ | $xx_{32}$ | $xx_{42}$ | $xx_{52}$ | $y_{t2}$ |
| ⋮ | ⋮ | ⋮ | ⋮ | ⋮ | ⋮ | ⋮ |
| m−1 | $xx_{1m-1}$ | $xx_{2m-1}$ | $xx_{3m-1}$ | $xx_{4m-1}$ | $xx_{5m-1}$ | $y_{tm-1}$ |
| m | $xx_{1m}$ | $xx_{2m}$ | $xx_{3m}$ | $xx_{4m}$ | $xx_{5m}$ | $y_{tm}$ |

FIG. 36

| | INPUT VALUE |
|---|---|
| $x_1^t$ | ESTIMATE ye AT TIME t |
| $x_2^t$ | DELAY AMOUNT α OR ADVANCE AMOUNT β AT TIME t |

| | OUTPUT VALUE |
|---|---|
| $y^{t+1}$ | PREDICTIVE VALUE yee OF ESTIMATE ye AT TIME t + 1 |

FIG. 37

| CYCLE NUMBER | $x_1^t$ | $x_2^t$ | $y_t$ |
|---|---|---|---|
| 1 | $ye_1$ | | $ye_2$ |
| 2 | $ye_2$ | | $ye_3$ |
| ⋮ | ⋮ | ⋮ | ⋮ |
| $k_n$ | $ye_n$ | α | $ye_{n+1}$ |
| $k_{n+1}$ | $ye_{n+1}$ | α | $ye_{n+2}$ |
| $k_{n+2}$ | $ye_{n+2}$ | β2 | $ye_{n+3}$ |
| $k_{n+3}$ | $ye_{n+3}$ | β2 | $ye_{n+4}$ |
| ⋮ | ⋮ | ⋮ | ⋮ |

FIG. 45A

| | L | | |
|---|---|---|---|
| | $NN_{31}$ | $NN_{32}$ | $NN_{33}$ |
| | $NN_{21}$ | $NN_{22}$ | $NN_{23}$ |
| | $NN_{11}$ | $NN_{12}$ | $NN_{13}$ |

| | L | | |
|---|---|---|---|
| | $DS_{31}$ | $DS_{32}$ | $DS_{33}$ |
| | $DS_{21}$ | $DS_{22}$ | $DS_{23}$ |
| | $DS_{11}$ | $DS_{12}$ | $DS_{13}$ |

| | L | | |
|---|---|---|---|
| | $M_{31}$ | $M_{32}$ | $M_{33}$ |
| | $M_{21}$ | $M_{22}$ | $M_{23}$ |
| | $M_{11}$ | $M_{12}$ | $M_{13}$ |

| No. | $x_1$ | $x_2$ | ... | $xx_{n-1}$ | $xx_n$ | $y_t$ |
|---|---|---|---|---|---|---|
| 1 | $x_{11}$ | $x_{21}$ | ... | $xx_{n-11}$ | $xx_{n1}$ | $y_{t1}$ |
| 2 | $x_{12}$ | $x_{22}$ | ... | $xx_{n-12}$ | $xx_{n2}$ | $y_{t2}$ |
| ... | ... | ... | ... | ... | ... | ... |
| m-1 | $x_{1m-1}$ | $x_{2m-1}$ | ... | $xx_{n-1m-1}$ | $xx_{nm-1}$ | $y_{tm-1}$ |
| m | $x_{1m}$ | $x_{2m}$ | ... | $xx_{n-1m}$ | $xx_{nm}$ | $y_{tm}$ |

IGNITION TIMING CONTROL DEVICE FOR INTERNAL COMBUSTION ENGINE

INCORPORATION BY REFERENCE

The disclosure of Japanese Patent Application No. 2019-173169 filed on Sep. 24, 2019 including the specification, drawings and abstract is incorporated herein by reference in its entirety.

BACKGROUND

1. Technical Field

The present disclosure relates to an ignition timing control device for an internal combustion engine.

2. Description of Related Art

In an internal combustion engine, when air-fuel mixture is ignited in a combustion chamber, and then end gas ignites by itself, a pressure wave is generated and knocking occurs. With the occurrence of knocking, an engine body vibrates. In this case, as knocking intensity becomes higher, the engine body vibrates harder. Accordingly, there is a publicly known internal combustion engine (see Japanese Unexamined Patent Application Publication No. 2006-226967) in which a knocking sensor for detecting vibration of the engine body is attached to an engine body, and based on the intensity of the vibration of the engine body detected by the knocking sensor, knocking intensity is detected. When the knocking intensity exceeds a threshold, it is determined that knocking occurs, and ignition timing is delayed. However, the engine body also vibrates due to mechanical movements, such as seating actions of intake valves and exhaust valves, and seating actions of the needles of fuel injection valves. Therefore, when the vibration intensity of the engine body increases because of such mechanical movements, using the knocking sensor made to detect vibration of the engine body may lead to erroneous determination that the knocking intensity is high, even if the knocking intensity is not high in actuality.

SUMMARY

Meanwhile, when knocking occurs, the pressure inside the combustion chamber shows sharper fluctuations, as the knocking intensity becomes higher. Therefore, when the pressure sensor that can detect the combustion pressure of the air-fuel mixture generated by ignition is used, knocking intensity can be detected from the sharp fluctuations in output value of the pressure sensor. In this case, for example, when the knocking intensity becomes high, the output values from the pressure sensor have a high peak value. Therefore, it can be said that the peak value of the output values of the pressure sensor is one of the values representing the knocking intensity. This means that the knocking intensity can be detected from such a value that represents the knocking intensity. In this case, the vibration of the engine body based on the mechanical movements does not influence the output values of the pressure sensor. Therefore, since the vibration does not influence the value representing the knocking intensity either, using the pressure sensor allows detection of accurate knocking intensity.

However, the pressure sensor is very expensive. Moreover, when the pressure sensor is used for a long time, deposits gradually adhere to the pressure sensor. The adhering deposits causes deformation of a combustion form of the air-fuel mixture in the combustion chamber. For that reason, it is difficult to use such a pressure sensor for commercial vehicles. Accordingly, it is considered to estimate the value representing the knocking intensity, calculated from the output values of the pressure sensor, based on the output values of the knocking sensor with use of a neural network. More specifically, it is considered that a weight of the neural network is learned such that when output values of the knocking sensor are input, an estimate representing the knocking intensity is output, and with use of the learned neural network that has completed the learning of the weight, a value representing the knocking intensity is estimated from the output values of the knocking sensor.

However, a problem arises if such a learned neural network is installed in the controller of commercial vehicles and the installed learned neural network is used to estimate the value representing the knocking intensity from the output values of the knocking sensor. More specifically, component parts of an engine have tolerance, and the dimensions of the component parts of the engine vary for every commercial vehicle. Accordingly, every commercial vehicle generates different engine vibration. However, the learned neural network does not accomplish learning of the weight relating to engine vibration different in every commercial vehicle. Therefore, when the engine vibration, the weight of which has not been learned, is generated, i.e., when unlearned engine vibration is generated, the learned neural network may incorrectly determine that the vibration of the engine body is caused by knocking.

When such incorrect determination is made, ignition timing may be delayed excessively. More specifically, when a value representing the knocking intensity exceeds a threshold because knocking is generated, and ignition timing is thereby delayed, combustion pressure is lowered due to an action to delay the ignition timing, which results in lowering of the value representing the knocking intensity. As a result, the value representing the knocking intensity becomes the threshold or below, and the action to delay the ignition timing is stopped. Meanwhile, when unlearned engine vibration is generated and thereby the value representing the knocking intensity exceeds the threshold, the ignition timing is similarly delayed. However, in this case, when unlearned engine vibration which is not influenced by the ignition timing is generated, the unlearned engine vibration is not restrained even with the ignition timing being delayed. Therefore, in this case, when the unlearned engine vibration which is not influenced by the ignition timing is continuously generated even after the ignition timing is delayed, the value representing the knocking intensity continuously exceeds the threshold. This leads to continuation of the action to delay the ignition timing. As a result, the ignition timing is excessively delayed, which causes a problem in that engine output is substantially lowered.

An ignition timing control device for an internal combustion engine according to one aspect of the present disclosure includes a storage device and a processor. The storage device is configured to store a first learned neural network and a second learned neural network. The first learned neural network is configured to calculate an estimate of a value representing knocking intensity, calculated from output values of a pressure sensor for detecting combustion pressure of an air-fuel mixture generated with ignition, based on output values of a knocking sensor for detecting vibration of an engine body. The second learned neural network is configured to calculate a predictive value or a predictive decrease amount of the estimate of the value representing the knocking intensity when ignition timing of the internal combustion engine is delayed. When the estimate of the value representing the knocking intensity, calculated with use of the first learned neural network, exceeds a predetermined threshold, the processor is configured to delay the ignition timing in a next cycle. The processor is configured to perform, in the next cycle where the ignition timing is delayed, control to delay the ignition timing in a cycle after the next cycle based on a difference between the predictive value of the estimate of the value representing the knocking intensity calculated with use of the second learned neural network and the estimate of the value representing the knocking intensity calculated with use of the first learned neural network. The processor is configured to perform the control to delay the ignition timing in the cycle after the next cycle when the difference is smaller than a predetermined set value and the estimate of the value representing the knocking intensity is larger than a preset threshold, and when the difference is larger than the predetermined set value, the processor is configured not to perform the control to delay the ignition timing in the cycle after the next cycle even if the estimate of the value representing the knocking intensity is larger than the preset threshold.

In the ignition timing control device for the internal combustion engine according to one aspect of the present disclosure, the second learned neural network may be configured such that when an operating state of the internal combustion engine, a delay amount of the ignition timing, and the estimate of the value representing the knocking intensity in a previous cycle are input, the predictive decrease amount of the estimate of the value representing the knocking intensity when the ignition timing is delayed is calculated, and the predictive value of the estimate of the value representing the knocking intensity when the ignition timing is delayed is output based on the predictive decrease amount.

In the ignition timing control device for the internal combustion engine according to one aspect of the present disclosure, the operating state of the internal combustion engine may include an engine speed, an engine load, and an EGR rate. In the ignition timing control device for the internal combustion engine according to one aspect of the present disclosure, the second learned neural network may be configured from a recurrent neural network, the recurrent neural network being configured such that when the estimate of the value representing the knocking intensity in each cycle from a cycle where ignition is performed predetermined number of times before to a current cycle, and a delay amount or an advance amount of the ignition timing are input, the predictive value of the estimate of the value representing the knocking intensity in the current cycle is output.

In the ignition timing control device for the internal combustion engine according to one aspect of the present disclosure, when the control to delay the ignition timing is performed, and then the estimate of the value representing the knocking intensity becomes equal to the predetermined threshold or below, the processor may be configured to start control to advance the ignition timing. When the difference in the control to delay the ignition timing is larger than the set value, the processor may be configured to make the advance amount of the ignition timing smaller than the advance amount when the difference is equal to the set value or below.

In the ignition timing control device for the internal combustion engine according to one aspect of the present disclosure, the first learned neural network may be configured such that when a value indicating vibration of the engine body that is detected by the knocking sensor within a preset period is input, the estimate of the value representing the knocking intensity is output.

In the ignition timing control device for the internal combustion engine according to one aspect of the present disclosure, the value representing the knocking intensity may be a peak value of the output values of the pressure sensor. In the ignition timing control device for the internal combustion engine according to one aspect of the present disclosure, the value representing the knocking intensity may be an integral value of the output values of the pressure sensor. In the ignition timing control device for the internal combustion engine according to one aspect of the present disclosure, the value indicating vibration of the engine body may be an output value of the knocking sensor within the preset period. In the ignition timing control device for the internal combustion engine according to one aspect of the present disclosure, the value indicating vibration of the engine body may be an integral value of the output values of the knocking sensor in equally divided sections within the preset period. In the ignition timing control device for the internal combustion engine according to one aspect of the present disclosure, the preset period may be a fixed crank angle range. In the ignition timing control device for the internal combustion engine according to one aspect of the present disclosure, the preset period may be fixed time.

In the ignition timing control device for the internal combustion engine according to one aspect of the present disclosure, the storage device may be configured to store the first learned neural network and the second learned neural network for each of a plurality of divided operation regions of the internal combustion engine. The processor may be configured to perform the control to delay the ignition timing in the cycle after the next cycle in each of the divided operation regions, based on the difference between the predictive value of the estimate of the value representing the knocking intensity calculated with use of the second learned neural network and the estimate of the value representing the knocking intensity calculated with use of the first learned neural network.

In the ignition timing control device for the internal combustion engine according to one aspect of the present disclosure, the internal combustion engine may include a plurality of the knocking sensors that detect vibration of the engine body. The first learned neural network may be configured such that when values indicating vibration of the engine body that are detected by the knocking sensors are input, the value representing the knocking intensity is output.

In the ignition timing control device for the internal combustion engine according to one aspect of the present disclosure, when the ignition timing in a next cycle is delayed because unlearned engine vibration is generated and thereby an estimate of a value representing the knocking intensity exceeds a threshold, a difference between a predictive value of the estimate of the value representing the knocking intensity and the estimate of the value representing the knocking intensity becomes larger than a predetermined set value. Therefore, in this case, even when the estimate of the value representing the knocking intensity is larger than the preset threshold, the action to delay the ignition timing in a cycle after the next cycle is not performed. Therefore, excessive delay of the ignition timing can be prevented, while the value representing the knocking intensity can be acquired with high accuracy without using a pressure sensor.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 9 shows a training dataset;
FIG. 22A shows the relationship between an ignition delay amount or an ignition delay speed and an increase ratio of combustion pressure or the like;
FIG. 22B shows the relationship between the ignition delay amount or the ignition delay speed and the increase ratio of combustion pressure or the like;
FIG. 28 shows a table of data;
FIG. 29 shows a training dataset;
FIG. 36 shows a table of input values and output values;
FIG. 37 shows a training dataset;
FIG. 45A shows operation regions;
FIG. 45B shows operation regions;
FIG. 45C shows operation regions;
FIG. 48 shows a training dataset.

DETAILED DESCRIPTION OF EMBODIMENTS

Figure 1:
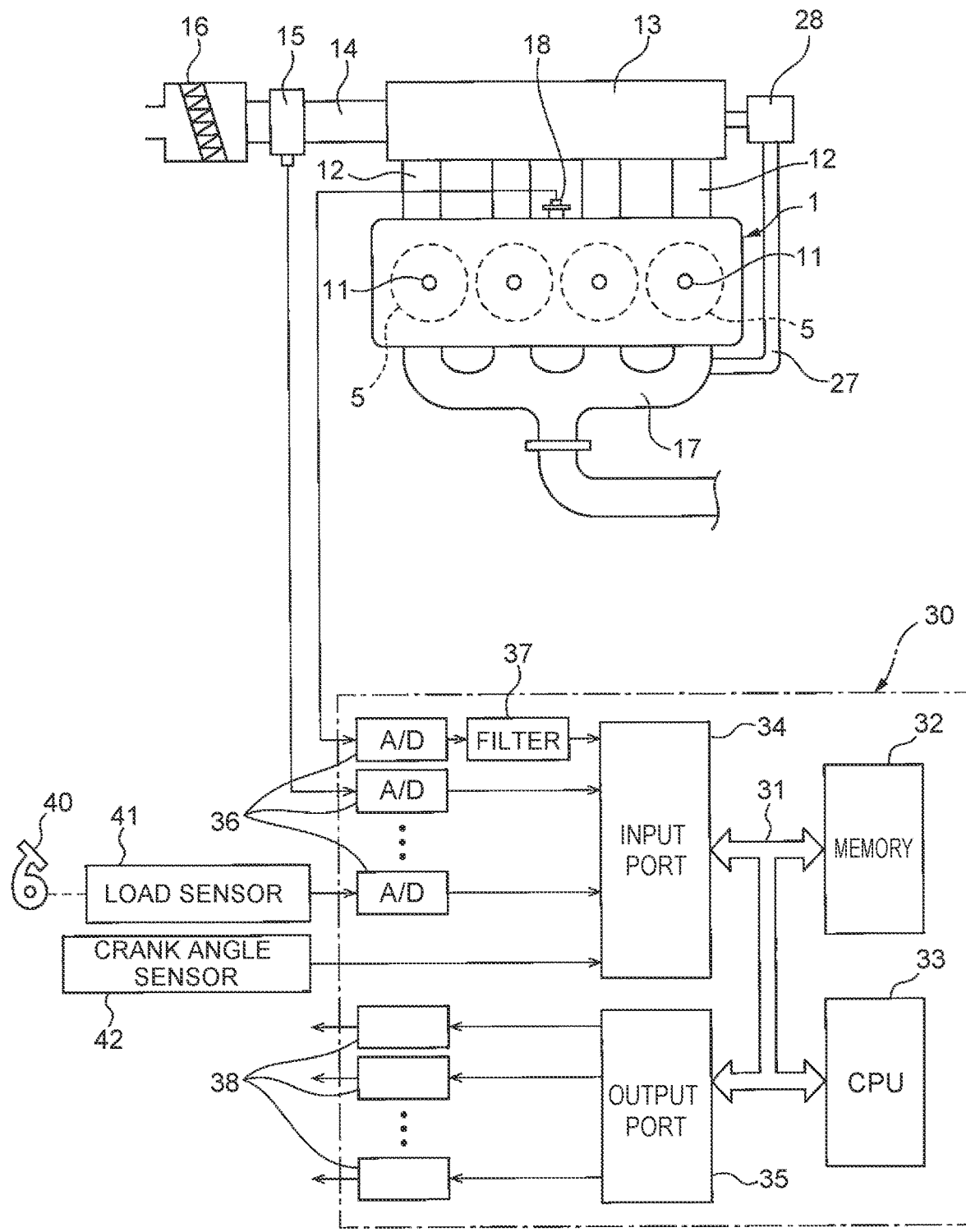
FIG. 1 is a general view of an internal combustion engine.
Figure 2:
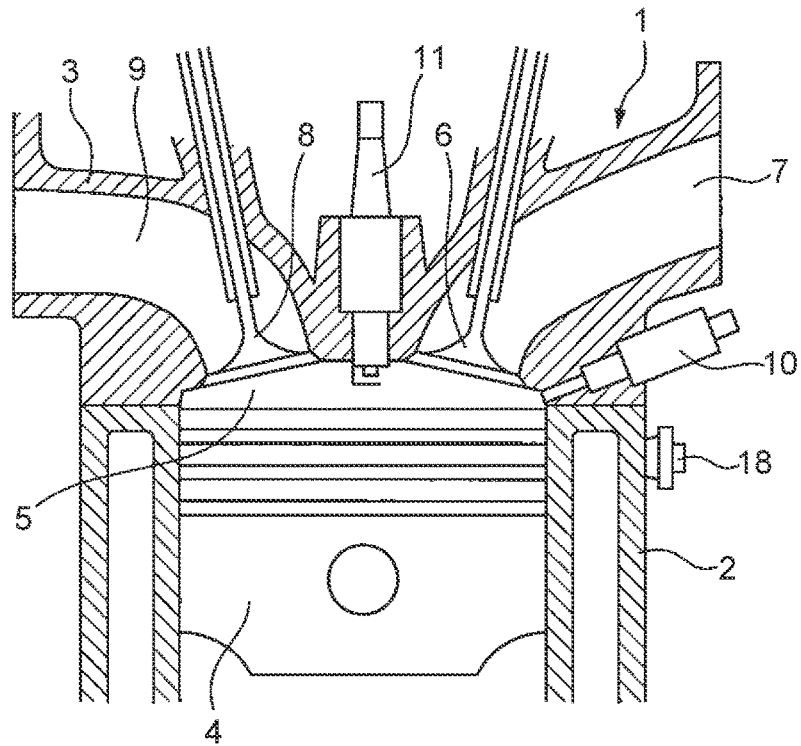
FIG. 2 is a sectional side view of the internal combustion engine shown in FIG. 1.

Overall Configuration of Internal Combustion Engine
FIGS. 1 and 2 show general views of an internal combustion engine. With reference to FIG. 2, there are shown an engine body 1, a cylinder block 2, a cylinder head 3, a piston 4, a combustion chamber 5, an intake valve 6, an intake port 7, an exhaust valve 8, an exhaust port 9, a fuel injection valve 10, and a spark plug 11. The piston 4 reciprocates in the cylinder block 2. The fuel injection valve 10 supplies fuel, for example, gasoline, into each of the combustion chambers 5. The spark plug 11 is disposed in each of the combustion chambers 5. With reference to FIGS. 1 and 2, the intake ports 7 are coupled with a surge tank 13 through corresponding intake branch pipes 12, respectively. The surge tank 13 is coupled with an air cleaner 16 through an intake duct 14 and an intake air amount detector 15.

The exhaust ports 9 are coupled with an exhaust manifold 17. The exhaust manifold 17 is coupled with the surge tank 13 through an exhaust gas recirculation (hereinafter referred to as EGR) passage 27. The EGR passage 27 recirculates the exhaust gas in the exhaust manifold 17 into the surge tank 13. In the EGR passage 27, an EGR control valve 28 is disposed. In an embodiment shown in FIG. 1, an EGR rate corresponding to the operating state of the engine (=recirculated exhaust gas amount/(recirculated exhaust gas amount+intake air amount)) is set in advance. The EGR control valve 28 is controlled such that the EGR rate coincides with the preset EGR rate.

As shown in FIGS. 1 and 2, the cylinder block 2 is equipped with a knocking sensor 18 in the embodiment shown in FIG. 1. The knocking sensor 18 detects vibration of the cylinder block 2, i.e., vibration of the engine body 1. In the example shown in FIG. 1, the knocking sensor 18 is formed with a piezoelectric element as a detection element of the vibration. The knocking sensor 18 generates an output voltage proportional to the vibration of the engine body 1. When knocking occurs, vibration with frequencies of about 5 kHz to 25 kHz is generated in the engine body 1. At the time, the output voltage of the knocking sensor 18 fluctuates with frequencies of about 5 kHz to 25 kHz. Therefore, the occurrence of knocking is detectable from the fluctuation in output voltage of the knocking sensor 18, i.e., fluctuation in output value of the knocking sensor 18.

In FIG. 1, there is shown an electronic control unit 30 for controlling operation of the engine. As shown in FIG. 1, the electronic control unit 30 is formed of a digital computer including a memory 32, a processor (CPU) 33, an input port 34, and an output port 35. The memory 32 is a storage device. The memory 32, the CPU 33, the input port 34, and the output port 35 are connected each other through a bidirectional bus 31. The input port 34 receives an output signal of the knocking sensor 18 through a corresponding AD converter 36 and a corresponding digital band pass filter 37. The digital band pass filter 37 passes only an input signal with frequencies of about 5 kHz to 25 kHz. The input port 34 also receives an output signal of the intake air amount detector 15 through the corresponding AD converter 36. An accelerator pedal 40 is connected to a load sensor 41. The load sensor 41 generates output voltage proportional to a depression amount of the accelerator pedal 40. The output voltage of the load sensor 41 is input into the input port 34 through the corresponding AD converter 36. The input port 34 is further connected to a crank angle sensor 42. The crank angle sensor 42 generates an output pulse whenever a crankshaft rotates 30°. In the CPU 33, engine speed is calculated based on the output signal of the crank angle sensor 42. Meanwhile, the output port 35 is connected to the fuel injection valves 10, the spark plugs 11, and the EGR control valves 28 of the cylinders through corresponding drive circuits 38.

Outline of Neural Network

Figure 3:
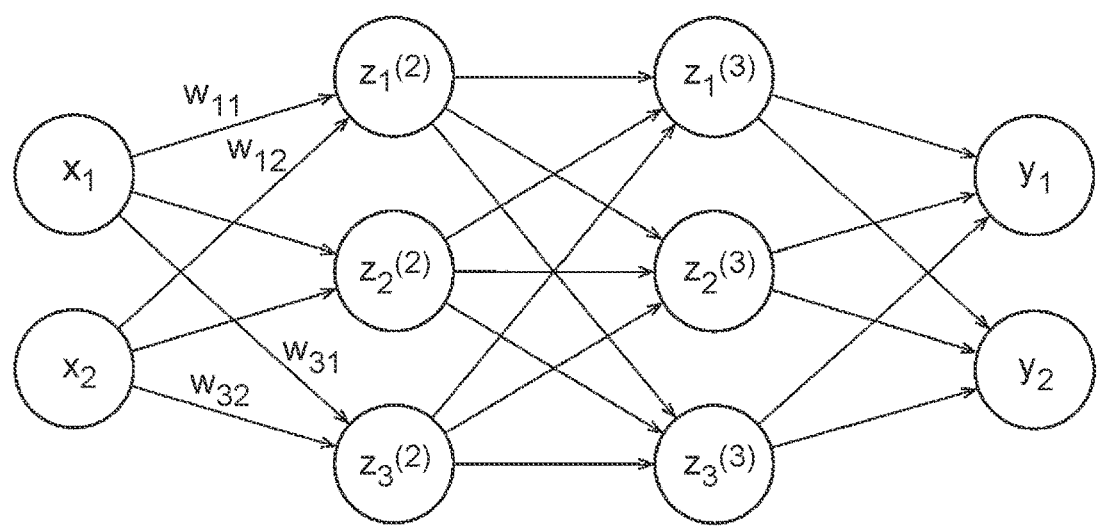
FIG. 3 is an explanatory view of a neural network.

In the embodiment according to the present disclosure, a value representing the knocking intensity is estimated with use of a neural network. Accordingly, a brief description is first given of the neural network. FIG. 3 shows a simple neural network. Circles in FIG. 3 represent artificial neurons. In the neural network, the artificial neurons are generally referred to as nodes or units (referred to as nodes in this application). In FIG. 3, L=1 indicates an input layer, L=2 and L=3 indicate hidden layers, and L=4 indicates an output layer. In FIG. 3, numerals $x_1$, $x_2$ indicate output values from nodes of the input layer (L=1), respectively. Numerals $y_1$, $y_2$ indicate output values from nodes of the output layer (L=4), respectively. Numerals $z^{(2)}_1$, $z^{(2)}_2$, $z^{(2)}_3$ indicate output values from nodes of the hidden layer (L=2), respectively. Numerals $z^{(3)}_1$, $z^{(3)}_2$, $z^{(3)}_3$ indicate output values from nodes of the hidden layer (L=3), respectively. The number of the hidden layers may be one or any number. The number of nodes in the input layer and the number of nodes in the hidden layers may also be any number. The number of nodes in the output layer may also be one, and may be two or more.

In each node of the input layer, an input value is output as it is. Meanwhile, the output values $x_1$, $x_2$ of the nodes in the input layer are input into each of the nodes of the hidden layer (L=2). In the nodes of the hidden layer (L=2), a total input value u is calculated using each corresponding weight w and bias b. For example, a total input value $u_k$ calculated in the node denoted by $z^{(2)}_k$ (k=1, 2, 3) of the hidden layer (L=2) in FIG. 3 is expressed by the following expression:

$$u_k = \sum_{m=1}^{n} (x_m \cdot w_{km}) + b_k$$

Next, the total input value $u_k$ is converted by an activation function f, and is output as an output value $z^{(2)}_k$ ($=f(u_k)$) from the node denoted by $z^{(2)}_k$ of the hidden layer (L=2). Meanwhile, the output values $z^{(2)}_1$, $z^{(2)}_2$, $z^{(2)}_3$ of the nodes of the hidden layer (L=2) are input into each of the nodes of the hidden layer (L=3). In each of the nodes of the hidden layer (L=3), a total input value u ($\Sigma z \cdot w + b$) is calculated using each corresponding weight w and bias b. The total input value u is similarly converted by an activation function, and is output as output values $z^{(3)}_1$, $z^{(3)}_2$, and $z^{(3)}_3$ from the nodes of the hidden layer (L=3). As the activation function, sigmoid function σ is used, for example.

Meanwhile, the output values $z^{(3)}_1$, $z^{(3)}_2$, $z^{(3)}_3$ of the nodes of the hidden layer (L=3) are input into each of the nodes of the output layer (L=4). In each of the nodes of the output layer, a total input value u ($\Sigma z \cdot w + b$) is calculated using each corresponding weight w and bias b, or a total input value u ($\Sigma z \cdot w$) is calculated using only each corresponding weight w. In the embodiment according to the present disclosure, an identity function is used as an activation function in the node of the output layer. Therefore, from the node of the output layer, the total input value u calculated in the node of the output layer is directly output as the output value y.

Learning in Neural Network

Now, when teacher data that indicates a correct answer value of the output value y of the neural network is $y_t$, the weight w and bias b in the neural network are learned using an error backpropagation method so as to decrease a difference between the output value y and the teacher data $y_t$. The error backpropagation method is well-known, and therefore the outline of the error backpropagation method will briefly be described below. Since the bias b is a kind of the weight w, hereinafter the weight w including the bias b will be simply referred to as the weight w. Now, in the neural network as shown in FIG. 3, a weight in the input value $u^{(L)}$ input into the node of the layers L=2, L=3, or L=4 is expressed as $w^{(L)}$. In this case, an error function E differentiated by weight $w^{(L)}$, i.e., gradient $\partial E/\partial w^{(L)}$, can be rewritten into a following expression:

$$\partial E/\partial w^{(L)} = (\partial E/\partial u^{(L)})(\partial u^{(L)}/\partial w^{(L)}) \quad (1)$$

Here, $z^{(L-1)} \cdot \partial w^{(L)} = \partial u^{(L)}$. Therefore, when $(\partial E/\partial u^{(L)}) = \delta^{(L)}$, the expression (1) can also be expressed with a following expression:

$$\partial E/\partial w^{(L)} = \delta^{(L)} \cdot z^{(L-1)} \quad (2)$$

Here, when $u^{(L)}$ fluctuates, it causes fluctuation of the error function E through change in total input value $u^{(L+1)}$ of the next layer. Therefore, $\delta^{(L)}$ can be expressed by a following expression:

$$\delta^{(L)} = (\partial E/\partial u^{(L)}) = \sum_{k=1}^{k}(\partial E/\partial u^{(L+1)}_k)(\partial u^{(L+1)}_k/u^{(L)})(k=1, 2 \ldots) \quad (3)$$

Here, when $z^{(L)}$ is expressed as $z^{(L)}=f(u^{(L)})$, an input value $u_k^{(L+1)}$ that appears on the right-hand side of the expression (3) can be expressed by a following expression:

$$u_k^{(L+1)} = \sum_{k=1}^{k} w_k^{(L+1)} \cdot z^{(L)} = \sum_{k=1}^{k} w_k^{(L+1)} \cdot f(u^{(L)}) \quad (4)$$

Here, a first term on the right-hand side $(\partial E/\partial u^{(L+1)})$ in the expression (3) is $\delta^{(L+1)}$. Therefore, a second term in the right-hand side $(\partial u_k^{(L+1)}/\partial u^{(L)})$ in the expression (3) can be expressed by a following expression:

$$\partial(w_k^{(L+1)} \cdot z^{(L)})/\partial u^{(L)} = w_k^{(L+1)} \cdot \partial f(u^{(L)})/\partial u^{(L)} = w_k^{(L+1)} \cdot f'(u^{(L)}) \quad (5)$$

Therefore, $\delta^{(L)}$ is expressed by a following expression:

$$\delta^{(L)} = \sum_{k=1}^{k} w_k^{(L+1)} \cdot \delta^{(L+1)} \cdot f'(u^{(L)}) \quad (6)$$

i.e., $\delta^{(L+1)} = \sum_{k=1}^{k} w_k^{(L)} \cdot \delta^{(L)} \cdot f'(u^{(L-1)})$ In short, when $\delta^{(L+1)}$ is obtained, $\delta^{(L)}$ is also obtained.

Now, assume the case where there is one node in the output layer (L=4), teacher data $y_t$ is obtained with respect to a given input value, and the output layer outputs an output value y with respect to the input value. In this case, when a square error is used as an error function, a square error E is calculated by $E=\frac{1}{2}(y-y_t)^2$. In this case, in the node of the output layer (L=4), the output value $y=f(u^{(L)})$. Therefore, in this case, the value of $\delta^{(L)}$ in the node of the output layer (L=4) is expressed by a following expression:

$$\delta^{(L)} = \partial E/\partial u^{(L)} = (\partial E/\partial y)(\partial y/\partial u^{(L)}) = (y-y_t) \cdot f'(u^{(L)}) \quad (7)$$

In this case, in the embodiment according to the present disclosure, $f(u^{(L)})$ is an identity function as described above, and therefore $f'(u^{(L)})=1$. Therefore, $\delta^{(L)}=y-y_t$, by which $\delta^{(L)}$ is obtained.

When $\delta^{(L)}$ is obtained, $\delta^{(L-1)}$ of the previous layer is obtained using the expression (6). Thus, $\delta$ of the previous layer is sequentially obtained. With use of these values of $\delta$, the error function E differentiated by each weight w, i.e., gradient $\partial E/\partial w^{(L)}$, is obtained by the expression (2). When the gradient $\partial E/\partial w^{(L)}$ is obtained, the weight w is updated with use of the gradient $\partial E/\partial w^{(L)}$ such that the value of the error function E decreases. In short, learning of the weight w is performed. When the output layer (L=4) has a plurality of nodes as shown in FIG. 3, a following square sum error E is used as the error function E, provided that the output values from the nodes are $y_1, y_2, \ldots$, and corresponding teacher data is $y_{t1}, y_{t2}, \ldots$:

$$E = \frac{1}{2}\sum_{k=1}^{n}(y_k - y_{tk})^2 \quad (8)$$

Here, n indicates the number of the nodes in the output layer.

Also in this case, the value of $\delta^{(L)}$ in each of the nodes of the output layer (L=4) becomes $\delta^{(L)}=y-y_t$ (k=1, 2, ..., n). From these values of $\delta^{(L)}$, $\delta^{(L-1)}$ of the previous layer is obtained with use of the expression (6).

Embodiments According to Present Disclosure

In the internal engine, as the knocking intensity becomes higher, the engine body 1 vibrates more intense. Therefore, as shown in FIGS. 1 and 2, the engine body 1 is equipped with the knocking sensor 18, and the knocking intensity is detectable from the intensity of the vibration of the engine body detected by the knocking sensor 18. However, as described before, the engine body 1 also vibrates due to mechanical movements, such as seating actions of the intake valves 6 and the exhaust valves 8, and seating actions of the needles of fuel injection valves 10. Therefore, when the vibrational intensity of the engine body increases because of such mechanical movements, using the knocking sensor 18 made to detect the vibration of the engine body 1 may lead to erroneous determination that the knocking intensity is high, even if the knocking intensity is not high in actuality.

On the contrary, when the pressure sensor that can detect the combustion pressure of the air-fuel mixture generated by ignition is used as described before, the knocking intensity can be detected from the sharp fluctuations in output value of the pressure sensor. In this case, for example, when the knocking intensity becomes high, the output values from the pressure sensor have a high peak value. Therefore, it can be said that the peak value of the output values from the pressure sensor is one of the values representing the knocking intensity. This means that the knocking intensity can be detected from such a value that represents the knocking intensity. In this case, the vibration of the engine body based on the mechanical movements does not influence the output values of the pressure sensor. Therefore, since the vibration does not influence the value representing the knocking intensity either, using the pressure sensor allows detection of accurate knocking intensity.

However, the pressure sensor is expensive. In addition, deposits that gradually adhere to the pressure sensor causes deformation of a combustion form of the air-fuel mixture in the combustion chamber 5. For that reason, it is difficult to use such a pressure sensor for commercial vehicles. Accordingly, in the present disclosure, the value representing the knocking intensity, calculated from the output values of the pressure sensor, is estimated based on the output values of the knocking sensor with use of a neural network. For description of the present disclosure, FIGS. 4, 5, 6A to 6C, and FIGS. 7A to 7C will be referred to describe the output values of the knocking sensor, the output values of the pressure sensor, and the value representing the knocking intensity calculated from the output values of the pressure sensor.

Figure 4:
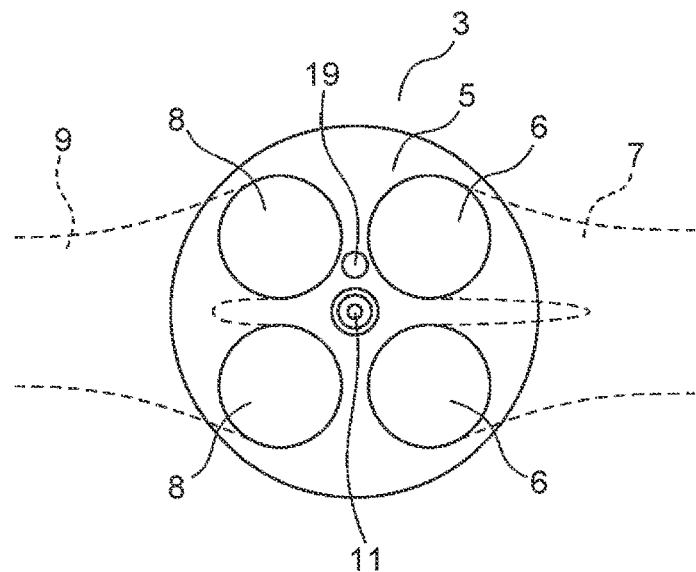
FIG. 4 is a bottom view of a cylinder head.
Figure 5:
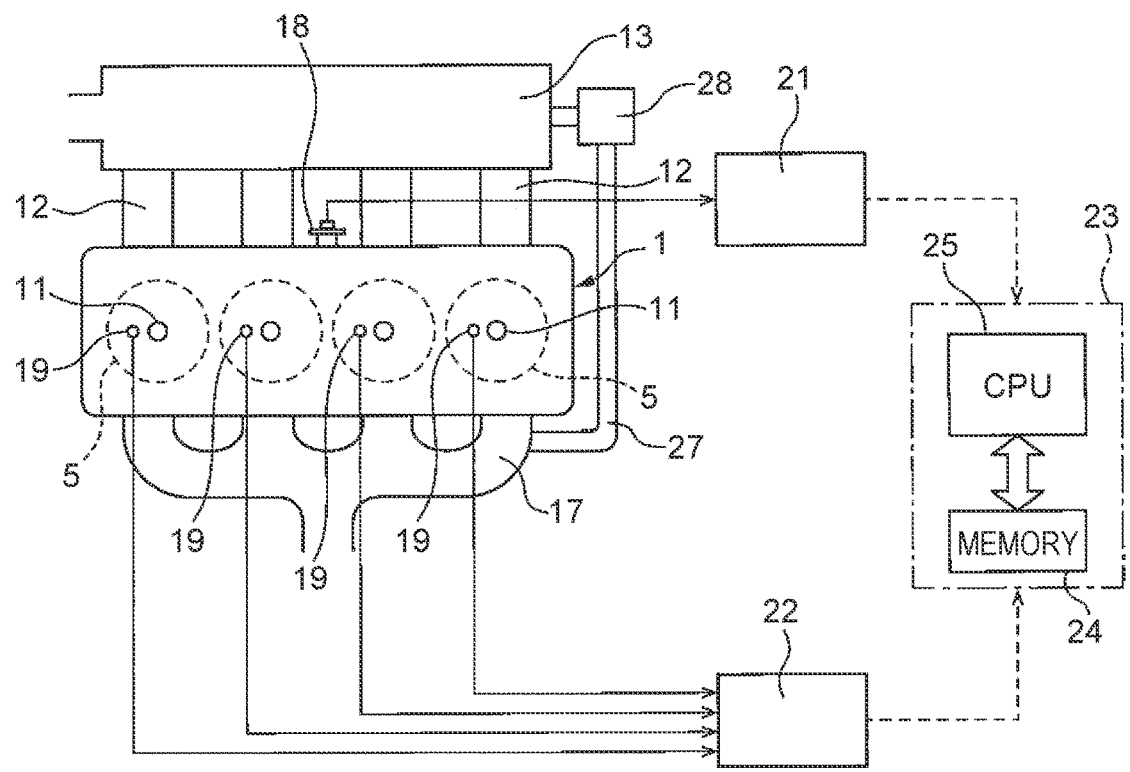
FIG. 5 is a general view of the internal combustion engine.

FIGS. 4 and 5 show a bottom view of the cylinder head 3 used only for acquiring data necessary for learning the weight of the neural network, and a partial view of the engine body 1, respectively. Referring to FIGS. 4 and 5, a pressure sensor 19 is disposed on an inner wall surface of the cylinder head 3 in each of the cylinders, in order to estimate from the output values of the knocking sensor 18 the value representing the knocking intensity obtained from the output values of the pressure sensor. Each of the pressure sensors 19 outputs an output voltage proportional to the pressure in each corresponding combustion chamber 5, i.e., the output value indicating the combustion pressure of the air-fuel mixture generated with ignition. In this case, the pressure in the combustion chamber 5 can also be measured by using a pressure sensor integrated with the spark plug. These pressure sensors 19 are used only for acquiring the data necessary for learning the weight of the neural network.

Now, knocking generally occurs during a period from a compression top dead center to 90° after the compression top dead center. When knocking occurs, the pressure in the combustion chamber 5 fluctuates with frequencies of about 5 kHz to 25 kHz, and the engine body 1 vibrates with frequencies of about 5 kHz to 25 kHz. Therefore, in order to extract only the vibration of the engine body 1 caused by knocking, the output values of the knocking sensor 18 are generally AD-converted, and then fed to a digital band pass filter. The digital band pass filter passes only an input signal with frequencies of about 5 kHz to 25 kHz, for example. The intensity of knocking is determined based on the output values of the knocking sensor 18 after being filtered with the digital band pass filter.

Similarly, in order to extract only the pressure fluctuation in the combustion chamber 5 caused by knocking, the output values of the pressure sensor 19 are generally AD-converted, and then fed to a digital band pass filter. The digital band pass filter passes only the input signal with frequencies of about 5 kHz to 25 kHz, for example. The knocking intensity is determined based on the output values of the pressure sensor 19 after being filtered with the digital band pass filter. Hereinafter, such an output values of the knocking sensor 18 after being filtered with the digital band pass filter are simply referred to as filtered output values of the knocking sensor 18. Hereinafter, the output values of the pressure sensor 19 after being filtered with the digital band pass filter are simply referred to as filtered output values of the pressure sensor 19.

Figure 6A:
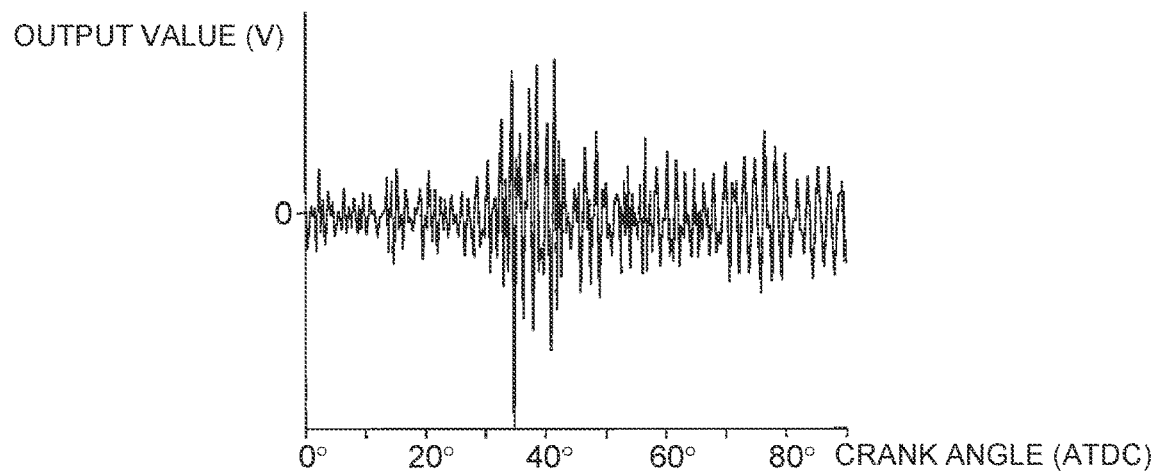
FIG. 6A shows output values of a knocking sensor.
Figure 7A:
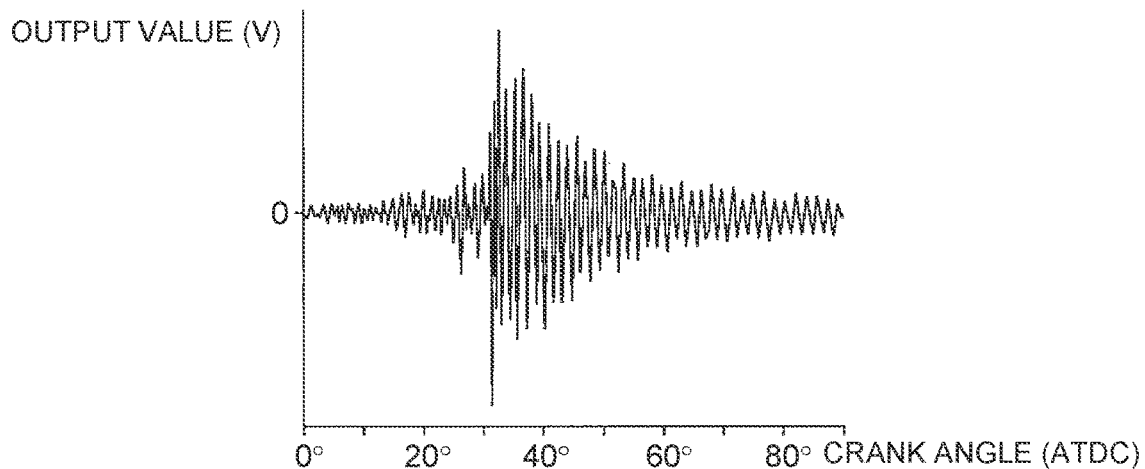
FIG. 7A shows output values of a pressure sensor.

FIG. 6A and FIG. 7A show change in filtered output value (V) of the knocking sensor 18, and change in filtered output value (V) of the pressure sensor 19 at the occurrence of the same knocking, respectively. Both the horizontal axis of FIG. 6A and the horizontal axis of FIG. 7A represent a crank angle (from a compression top dead center to 90° after the compression top dead center) expressed as ATDC.

As is clear from comparison between FIG. 6A and FIG. 7A, the vibration intensity of the filtered output values of the pressure sensor 19 shown in FIG. 7A increases rapidly when knocking occurs, and then decreases gradually. In short, since the output values of the pressure sensor 19 are not influenced by the vibration of the engine body based on mechanical movements, the occurrence of knocking clearly appears in the output values of the pressure sensor 19. In comparison, the vibration intensity of the filtered output values of the knocking sensor 18 shown in FIG. 6A also increases when knocking occurs. However, since the output values of the knocking sensor 18 are largely influenced by the vibration of the engine body based on mechanical movements, the intensity of vibration in the output value of the knocking sensor 18 also becomes a large value before and after the occurrence of the knocking. In short, since the vibration of the engine body based on the mechanical movements appears as a noise in the output values of the knocking sensor 18, the occurrence of knocking does not clearly appear in the output values of the knocking sensor 18.

Figure 7B:
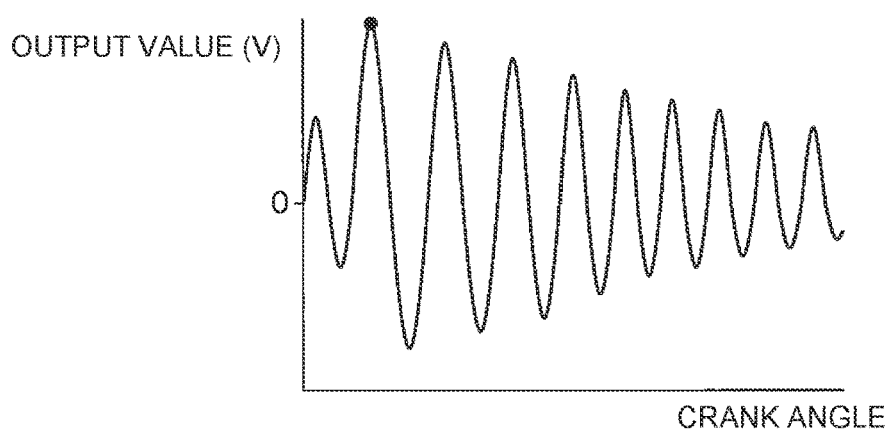
FIG. 7B shows output values of the pressure sensor.
Figure 7C:
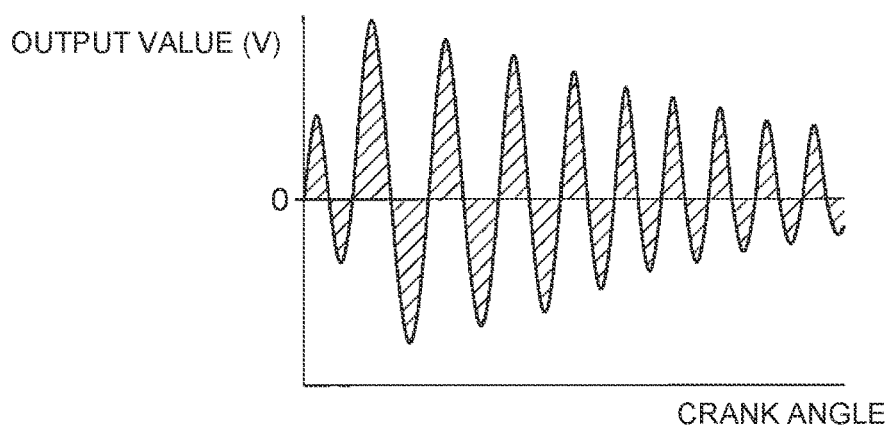
FIG. 7C shows output values of the pressure sensor.

Therefore, whether knocking has occurred or not can clearly be distinguished based on the output values of the pressure sensor 19. In this case, the intensity of the knocking that has occurred also clearly appears in the output values of the pressure sensor 19. This will be described with reference to FIG. 7B and FIG. 7C below. FIG. 7B and FIG. 7C schematically show some of the waveforms of the filtered output values of the pressure sensor 19 shown in FIG. 7A, the waveforms being stretched in a lateral axis direction.

Now, when the intensity of knocking that has occurred becomes high, the peak value of the filtered output values of the pressure sensor 19 becomes high. This means that the peak value of the filtered output values of the pressure sensor 19 indicated with a circle mark in FIG. 7B represents the value representing the knocking intensity. Meanwhile, when the intensity of knocking that has occurred becomes high, a sum total of an area surrounded with an output value waveform and a line representing an output value of 0(V), shown with a hatched line in FIG. 7C, increases. In short, an integral value of the filtered output values of the pressure sensor 19 (negative-side integral value being also regarded as positive value) becomes high. This means that an integral value of the filtered output values of the pressure sensor 19 (negative-side integral value being also regarded as positive value) also indicates the value representing the knocking intensity. Thus, the value representing the knocking intensity can be acquired from the output values of the pressure sensor 19.

Meanwhile, it is difficult to extract such a value representing the knocking intensity from the output values of the knocking sensor 18. Accordingly, a neural network is used in the present disclosure. More specifically, a weight of the neural network is learned such that the value representing the knocking intensity calculated from the output values of the pressure sensor 19 can be acquired based on the output values of the knocking sensor 18. Hence, the value representing the knocking intensity, calculated from the output values of the pressure sensor 19, is estimated based on the output values of the knocking sensor 18 with use of the learned neural network. Accordingly, a method of learning the weight of the neural network such that the value representing the knocking intensity calculated from the output values of the pressure sensor 19 can be acquired based on the output values of the knocking sensor 18 will be described next.

Figure 8:
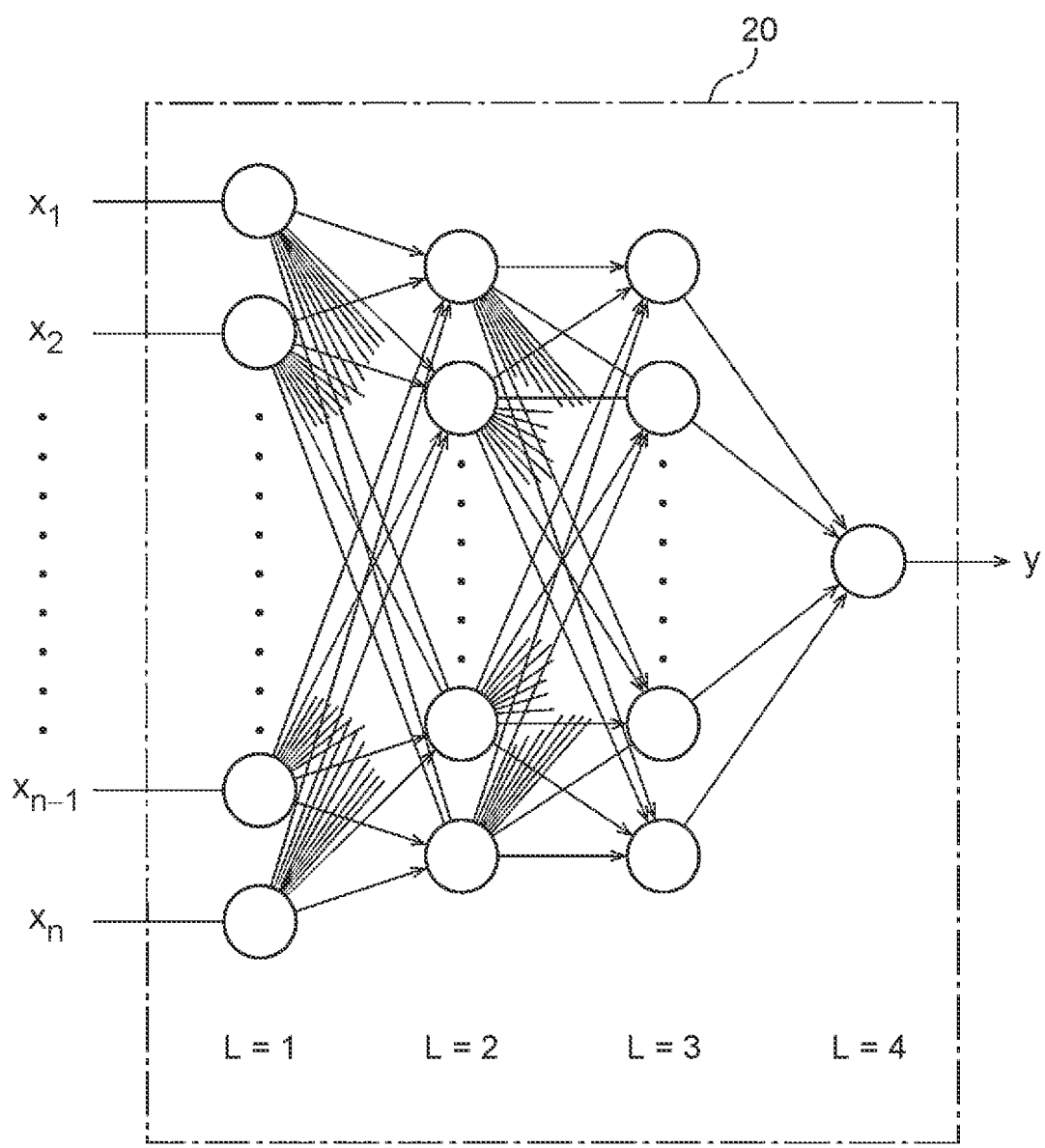
FIG. 8 shows a first neural network used in an embodiment according to the present disclosure.

First, a first neural network used herein will be described with reference to FIG. 8. With reference to FIG. 8, also in the first neural network 20, L=1 indicates an input layer, L=2 and L=3 indicate hidden layers, and L=4 indicates an output layer as in the neural network shown in FIG. 3. As shown in FIG. 8, the input layer (L=1) is made up of n nodes; n input values $x_1, x_2 \ldots x_{n-1}, x_n$ are input into the nodes of the input layer (L=1), respectively. While the hidden layer (L=2) and the hidden layer (L=3) are illustrated in FIG. 8, the number of layers of these hidden layers may be one or may be any number, and the number of nodes in these hidden layers may also be any number. There is one node in the output layer (L=4), and an output value from the node of the output layer is expressed with y.

Figure 6B:
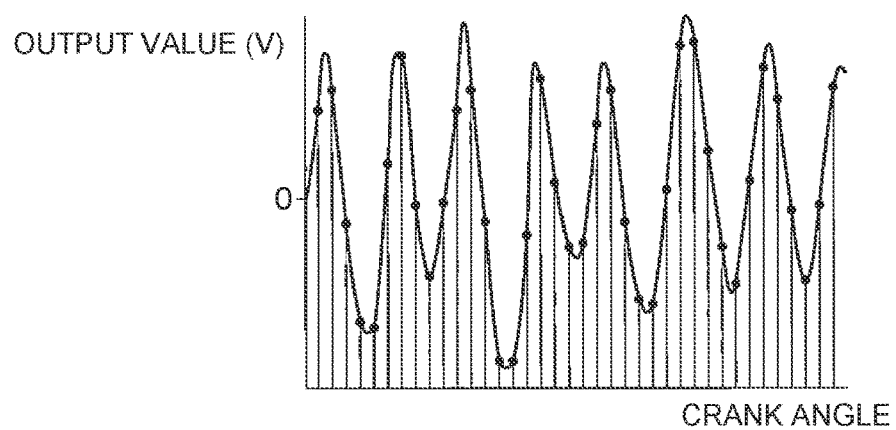
FIG. 6B shows output values of the knocking sensor.
Figure 6C:
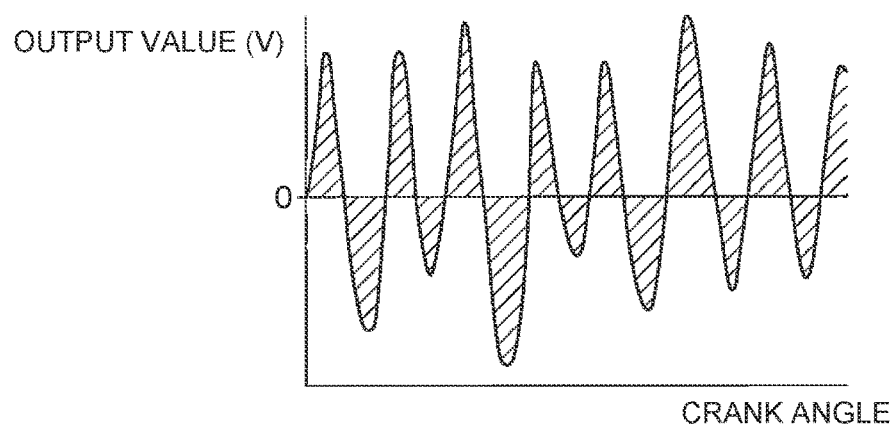
FIG. 6C shows output values of the knocking sensor.

Next, the input values $x_1, x_2 \ldots x_{n-1}, x_n$ and the output value y in FIG. 8 will be described. First, the input values $x_1, x_2 \ldots x_{n-1}, x_n$ will be described with reference to FIGS. 6B and 6C. FIG. 6B and FIG. 6C schematically show some of the output value waveforms of the knocking sensor 18 shown in FIG. 6A, the output value waveforms being stretched in a lateral axis direction. In the embodiment according to the present disclosure, the values shown in FIG. 6B or values shown in FIG. 6C are used as input values $x_1, x_2 \ldots x_{n-1}, x_n$.

More specifically, in the example shown in FIG. 6B, the filtered output values of the knocking sensor 18 are used as the input values $x_1, x_2 \ldots x_{n-1}, x_n$. In this case, as shown by black dots in FIG. 6B, the output values of the knocking sensor 18 at each fixed time or at each fixed crank angle are used as the input values $x_1, x_2 \ldots x_{n-1}, x_n$. Meanwhile, in the example shown in FIG. 6C, an integral value of the filtered output values of the knocking sensor 18 (negative-side integral value being also regarded as positive value) is used. For example, the integral value of the filtered output values of the knocking sensor 18 within fixed crank angles is used as the input values $x_1, x_2 \ldots x_{n-1}, x_n$.

In the embodiment of the present disclosure, the value representing the knocking intensity calculated from the output values of the pressure sensor 19 is set as the output value y shown in FIG. 8. In this case, the peak value of the output values of the pressure sensor 19 shown by a circle mark in FIG. 7B represents the knocking intensity. An integral value of the output values of the pressure sensor 19 (negative-side integral value being also regarded as positive value) shown in FIG. 7C also indicates the knocking intensity. Therefore, in the embodiment of the present disclosure, the peak value of the output values of the pressure sensor 19 shown with a round mark in FIG. 7B is set as the output value y, or an integral value of the output values of the pressure sensor 19 (negative-side integral value being also regarded as positive value) shown in FIG. 7C is set as the output value y. In this case, an actual measurement value of the value representing the knocking intensity, calculated from the output values of the pressure sensor 19, is set as the teacher data Vt.

FIG. 9 shows a training dataset prepared by using input values $x_1, x_2 \ldots x_{m-1}, x_m$ and an actual measurement value of the value representing the knocking intensity calculated from the output values of the pressure sensor 19 when the input values are $x_1, x_2 \ldots x_{m-1}, x_m$, the actual measurement value being teacher data $y_t$. As shown in FIG. 9, for the training dataset, m pieces of data indicating the relationship between the input values $x_1, x_2 \ldots x_{n-1}, x_n$ and the teacher data $y_t$ are acquired. For example, listed in second data (No. 2) are acquired input values $x_{12}, x_{22} \ldots x_{m-12}, x_{m2}$ and teacher data $y_{t2}$. Listed in m−1st data (No. $_{m-1}$) are input values of acquired input parameters $x_{1m-1}, x_{2m-1} \ldots x_{n-1m-1}, x_{nm-1}$ and teacher data $y_{tm-1}$.

In the case of using the filtered output values of the knocking sensor 18 as the input values $x_1, x_2 \ldots x_{n-1}, x_n$, the filtered output values of the knocking sensor 18 acquired at each fixed crank angle during a period from a compression top dead center to 90° after the compression top dead center are set as the input values $x_1, x_2 \ldots x_{n-1}, x_n$, for example. In this case, the number n of the input values is hundreds or more. Therefore, the number n of the nodes of the input layer (L=1) shown in FIG. 8 is hundreds or more.

In the embodiment of the present disclosure, in the case where the integral value of the filtered output values of the knocking sensor 18 (negative-side integral value being also regarded as positive value) is used as the input values $x_1, x_2 \ldots x_{n-1}, x_n$, the period from a compression top dead center to 90° after the compression top dead center is divided into 18 sections at every 5° crank angle. An integral value (negative-side integral value being also a positive value) of the filtered output values of the knocking sensor 18 in each divided section is set as the input values $x_1, x_2 \ldots x_{n-1}, x_n$. In this case, the number n of the input values are 18. Therefore, the number n of the nodes of the input layer (L=1) shown in FIG. 8 is 18.

The teacher data $y_t$ in the training dataset shown in FIG. 9 is an actual measurement value of the value representing the knocking intensity calculated from the output values of the pressure sensor 19. As the teacher data $y_t$, the peak value of the output values of the pressure sensors 19 shown with a round mark in FIG. 7B is used, or an integral value (negative-side integral value being also regarded as positive value) of the output values of the pressure sensor 19 shown in FIG. 7C is used. Incidentally, in the embodiment according to the present disclosure, learning of the weight of the first neural network 20 shown in FIG. 8 is performed using the training dataset shown in FIG. 9. Accordingly, a preparation method of the training dataset shown in FIG. 9 will be described next with reference to FIGS. 4 and 5.

An example of the preparation method of the training dataset shown in FIG. 9 is shown in FIGS. 4 and 5. Referring to FIGS. 4 and 5, the pressure sensor 19 is disposed on the inner wall surface of the cylinder head 3 which faces the combustion chamber 5 of each cylinder, in order to acquire the value representing the knocking intensity. These pressure sensors 19 are provided only in order to acquire data necessary for learning as described before. In the example shown in FIG. 5, the knocking sensor 18 is connected to a detector 21, for example, an oscilloscope, capable of detecting an output value waveform of the knocking sensor 18. The pressure sensors 19 are each connected to a detector 22, for example, an oscilloscope, capable of detecting an output value waveform of each of the pressure sensors 19.

In the detector 21, in order to extract only the vibration of the engine body 1 caused by knocking, the output values of the knocking sensor 18 are AD-converted, and then fed to a digital band pass filter. The digital band pass filter passes only the input signals with frequencies of about 5 kHz to 25 kHz, for example. Then, the waveform of the output value of the knocking sensor 18 after being filtered with the digital band pass filter is detected. In the detector 22, in order to extract only the pressure fluctuation in each of the combustion chambers 5 caused by knocking, the output values of each of the pressure sensors 19 are AD-converted, and then fed to a digital band pass filter. The digital band pass filter passes only the input signal with frequencies of about 5 kHz to 25 kHz, for example. The waveform of the output values of the pressure sensor 19 after being filtered with the digital band pass filter is detected.

When the training dataset is prepared, an engine is made to operate such that both an operating state where knocking occurs and an operating state where knocking does not occur are generated in various combinations of an engine load, an engine speed, and an EGR rate. Based on the waveform data of filtered output values of the knocking sensor 18 obtained from the detector 21 and the waveform data of filtered output values of the pressure sensors 19 obtained from the detector 22, a training dataset as shown in FIG. 9 is prepared. In this case, the training dataset can be prepared manually based on the waveform data obtained from the detectors 21, 22, and can be prepared electronically based on electronic data obtained from the detectors 21, 22. With use of the thus-prepared electronic data of the training dataset, learning of the weight of the first neural network 20 shown in FIG. 8 is performed.

In the example shown in FIG. 5, a learning apparatus 23 for learning the weight of the neural network is provided. As shown in FIG. 5, the learning apparatus 23 includes a storage device 24, i.e., a memory 24, and a microprocessor (CPU) 25. In the example shown in FIG. 5, the number of nodes of the first neural network 20 shown in FIG. 8 and the prepared electronic data of the training dataset are stored in the memory 24 of the learning apparatus 23, and learning of the weight of the neural network 20 is performed in the CPU 25.

Description is now given of a learning method of the weight of the first neural network 20 performed by the learning apparatus 23. In learning the weight of the first neural network 20, as the input values $x_1, x_2 \ldots x_{n-1}, x_n$, an integral value of the filtered output values of the knocking sensor 18 (negative-side integral value being also regarded as positive value) in each divided section, formed by dividing a section from a compression top dead center to 90° after the compression top dead center at every 5° crank angle, is used. As the teacher data $y_t$, an actual measurement value of the peak value of the output values of the pressure sensor 19 is used.

Figure 10:
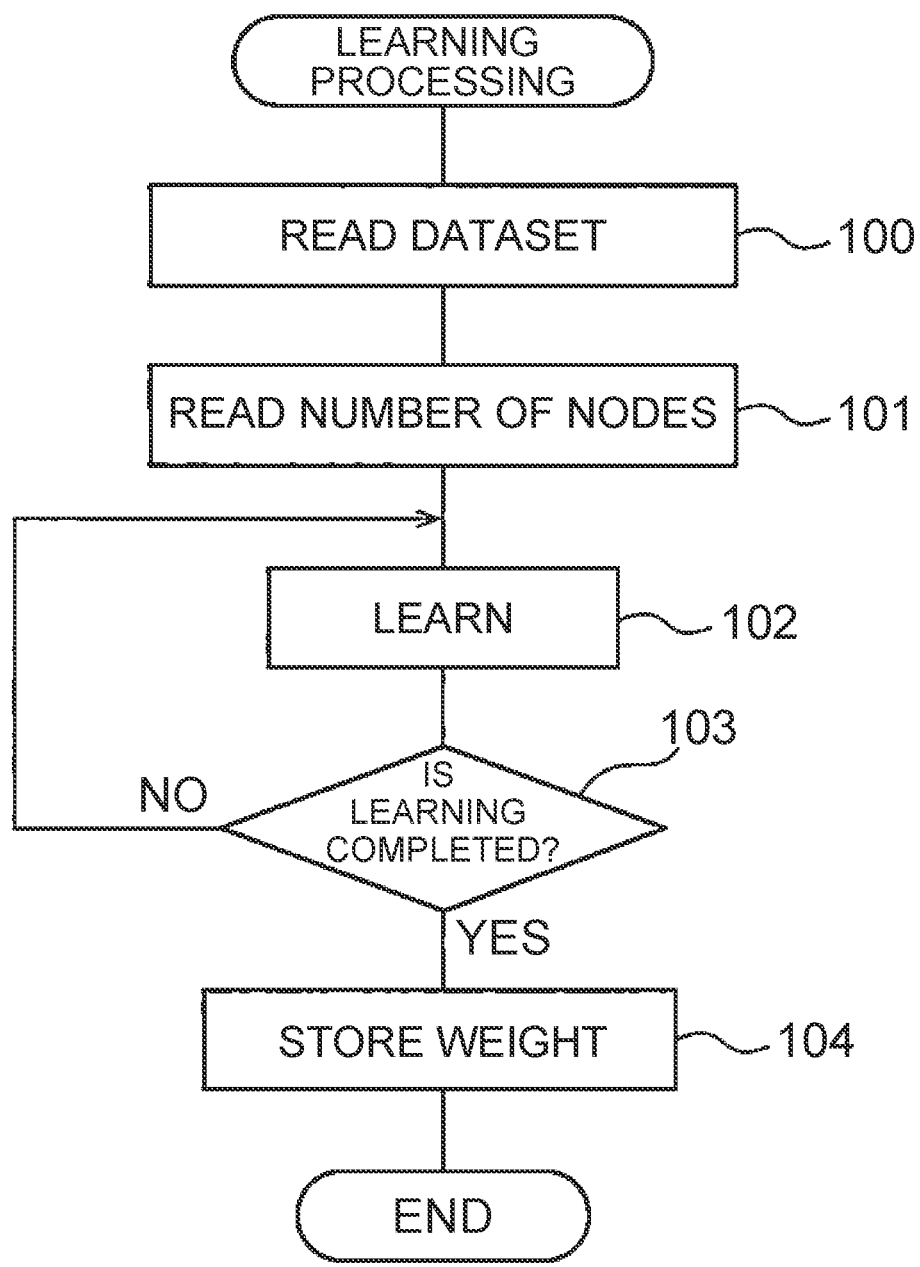
FIG. 10 is a flowchart showing a learning process routine.

FIG. 10 shows a learning process routine of the weight of the first neural network performed in the learning apparatus 23. Referring to FIG. 10, each piece of data in the training dataset stored in the memory 24 of the learning apparatus 23 is read first in step 100. Next, in step 101, the number of nodes in the input layer (L=1), the number of nodes in the hidden layer (L=2) and the hidden layer (L=3), and the number of nodes in the output layer (L=4) of the first neural network 20 are read. Based on the number of nodes, the first neural network 20 as shown in FIG. 8 is prepared. In this case, the number of nodes in the input layer (L=1) is 18, and the number of nodes in the output layer (L=4) is one in this example.

Next, in step 102, learning of the weight of the first neural network 20 is performed. At first, first (No. 1) input values $x_1, x_2 \ldots x_{n-1}, x_n$ of FIG. 9, that is, input values $x_1, x_2 \ldots x_{17}, x_{18}$, are input into 18 nodes of the input layer (L=1) in the first neural network 20, respectively. Next, a square error $E=\frac{1}{2}(y-y_{t1})^2$ between the output value y and the first (No. 1) teacher data $y_t$ of the first neural network 20 at the time is calculated. Then, learning of the weight of the first neural network 20 is performed using the error backpropagation method described before, so as to decrease the square error E.

Once learning of the weight of the first neural network 20 based on the first (No. 1) data of FIG. 9 is completed, then learning of the weight of the first neural network 20 based on the second (No. 2) data of FIG. 9 is performed with the error backpropagation method. Similarly, learning of the weight of the first neural network 20 is sequentially performed up to m-th (No. m) data of FIG. 9. When learning of the weight of the first neural network 20 with all the data from the first (No. 1) to the m-th (No. m) data of FIG. 9 is completed, the process proceeds to step 103.

In step 103, for example, square sum errors E between all the output values y of the first neural network from the first (No. 1) to the m-th (No. m) data of FIG. 9 and the teacher data $y_t$ are calculated. Then, it is determined whether or not the square sum errors E become equal to or less than a preset setting error. When it is determined that the square sum errors E are not equal to or less than the preset setting error, the process returns to step 102, where learning of the weight of the first neural network is performed again based on the training dataset shown in FIG. 9. The learning of the weight of the first neural network 20 is continued until the square sum errors E become equal to or less than the preset setting error. In step 103, when it is determined that the square sum errors E become equal to or less than the preset setting error, the process proceeds to step 104, where the learned weight of the first neural network 20 is stored in the memory 24 of the learning apparatus 23. Thus, an estimation model of the value representing the knocking intensity is prepared.

Figure 11:
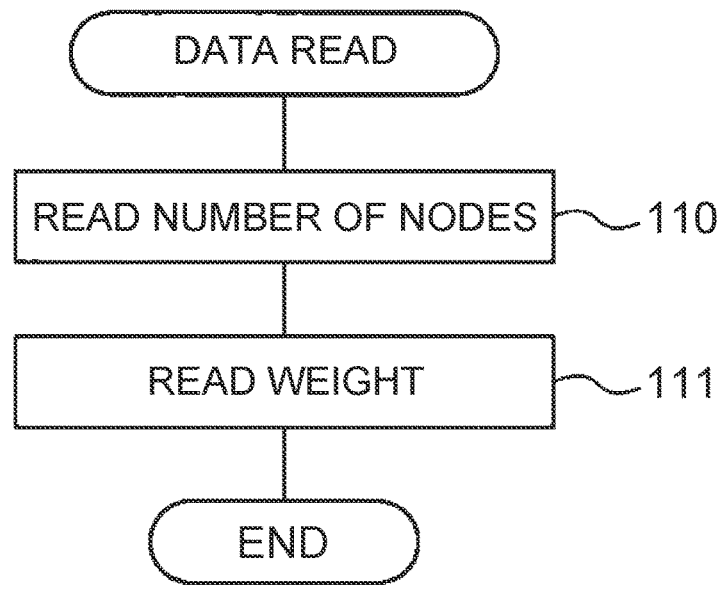
FIG. 11 is a flowchart showing a routine for reading data into an electronic control unit.

In the embodiment according to the present disclosure, a knocking process is performed in an engine by using the thus-prepared estimation model of the value representing the knocking intensity. Accordingly, the estimation model of the value representing the knocking intensity is stored in the electronic control unit 30 shown in FIG. 1. FIG. 11 shows a routine to read data into the electronic control unit 30 performed in the electronic control unit 30 in order to store in the electronic control unit 30 the estimation model of the value representing the knocking intensity.

More specifically, as shown in FIG. 11, in step 110, the number of nodes in the input layer (L=1) of the first neural network 20 shown in FIG. 8, the number of nodes in the hidden layer (L=2) and the hidden layer (L=3), and the number of nodes in the output layer (L=4) are read into the memory 32 of the electronic control unit 30. Based on the read number of nodes, the first neural network 20 as shown in FIG. 8 is prepared. Next, in step 111, the learned weight of the first neural network 20 is read into the memory 32 of the electronic control unit 30. Hence, the first learned neural network 20, i.e., the estimation model of the value representing the knocking intensity, is stored in the electronic control unit 30 of the engine.

Since the first learned neural network 20 is prepared in the electronic control unit 30, the first learned neural network 20 outputs an estimate of the value representing the knocking intensity calculated from the output values of the pressure sensor 19, when an integral (negative-side integral value being also regarded as positive value) of the filtered output values of the knocking sensor 18 in each divided section divided at every 5° crank angle is input into the first learned neural network 20. The estimate of the value representing the knocking intensity is extremely close to an actual measurement value of the value representing the knocking intensity. Therefore, the knocking intensity can correctly be estimated from the output values of the knocking sensor 18.

Thus, in the embodiment according to the present disclosure, the knocking sensor 18 for detecting the vibration of the engine body 1, the pressure sensor 19 for detecting the pressure in each of the combustion chambers 5 of the internal combustion engine, and the learning apparatus 23 for estimating the value representing the knocking intensity of the internal combustion engine with use of the first neural network 20 are provided. The value representing the knocking intensity is acquired from the output values of the pressure sensor 19. The learning apparatus 23 learns the weight of the first neural network 20. At the time, the value indicating vibration of the engine body 1 detected by the knocking sensor 18 is set as input values of the first neural network 20. The acquired value representing the knocking intensity is set as the teacher data. With use of the learned first neural network 20, the value representing the knocking intensity is estimated from the output values of the knocking sensor 18.

In the embodiment according to the present disclosure, the knocking intensity of the internal combustion engine is estimated using the neural network 20, based on the output values of the knocking sensor 18 for detecting vibration of the engine body 1, and the output values of the pressure sensor 19 for detecting the pressure in each of the combustion chambers 5 of the internal combustion engine. The value representing the knocking intensity is calculated from the output values of the pressure sensor 19. Then, the training dataset indicating the relationship between the value indicating vibration of the engine body 1 detected by the knocking sensor 18 and the value representing the knocking intensity is prepared. The weight of the first neural network 20 is learned. At the time, the value indicating vibration of the engine body 1 detected by the knocking sensor 18 is set as the input value of the first neural network 20. Moreover, the acquired value representing the knocking intensity is set as the teacher data. With use of the learned first neural network 20, the value representing the knocking intensity is estimated from the output values of the knocking sensor 18.

In this case, in the embodiment according to the present disclosure, the value representing the knocking intensity is a peak value of the output values of the pressure sensor 19 in a preset period, or the value representing the knocking intensity is an integral value of the output values of the pressure sensor 19 in the preset period. In this case, the preset period is in a fixed crank angle range, for example, a range from a compression top dead center to 90° after the compression top dead center.

Meanwhile, in the embodiment according to the present disclosure, the value indicating vibration of the engine body 1 is an output value of the knocking sensor 18 in a preset period. The value indicating vibration of the engine body 1 is an integral value of the output values of the knocking sensor 18 in equally divided sections within a preset period. In this case, the preset period is in a fixed crank angle range, for example, a range from a compression top dead center to 90° after the compression top dead center. As for the integral value of the output values of the knocking sensor 18, examples of the integral value of the output values of the knocking sensor 18 include an integral value of the filtered output values of the knocking sensor 18 (negative-side integral values being also regarded positive values) in respective divided sections equally divided at every 5° crank angle.

Figure 12:
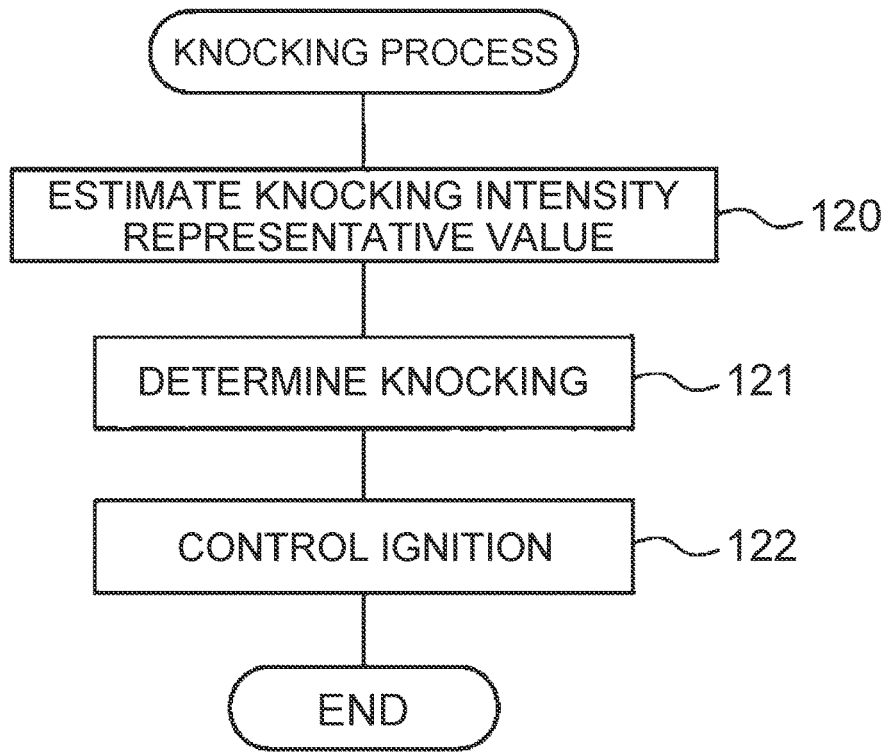
FIG. 12 is a flowchart showing a knocking process routine.

Description is now given of the knocking process executed at the time of engine operation with use of the first learned neural network 20 formed in the memory 32 of the electronic control unit 30. FIG. 12 shows the knocking process routine executed at the time of the engine operation. As shown in FIG. 12, when the knocking process routine is executed, an estimation process of a value representing the knocking intensity, i.e., a knocking intensity representative value, calculated from the output values of the pressure sensor 19 is performed first in step 120. Next, in step 121, a knocking determination process regarding whether or not knocking occurs is performed. Then, in step 122, ignition control is performed.

Figure 13:
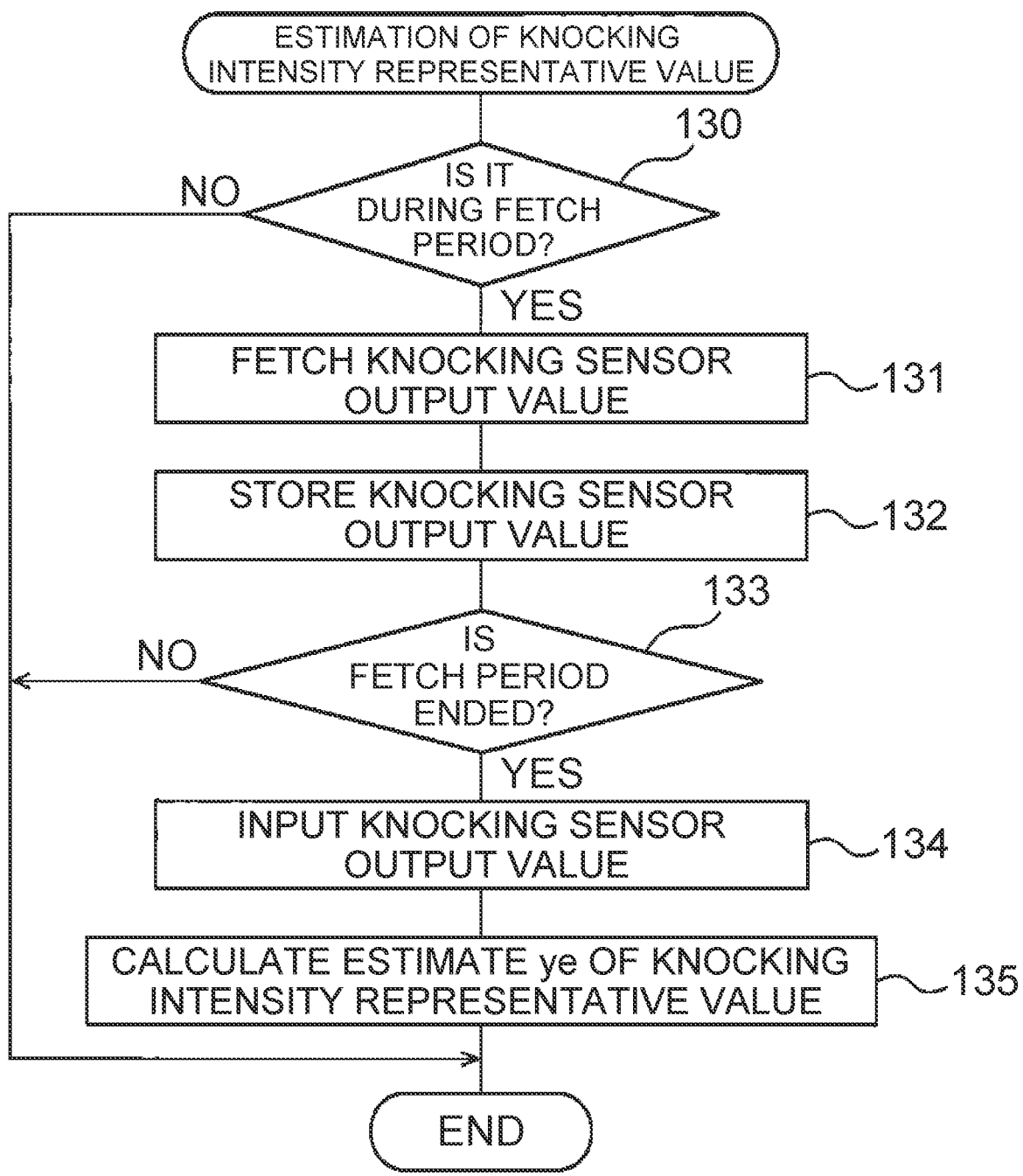
FIG. 13 is a flowchart showing an estimation routine of a knocking intensity representative value.

FIG. 13 shows one example of the estimation process routine of the knocking intensity representative value performed in step 120 of FIG. 12. The routine is executed by interruption at every fixed crank angle or at every fixed time. Referring to FIG. 13, it is first determined whether it is during a fetch period of the output signal of the knocking sensor 18 in step 130. In the embodiment, the fetch period of the output signal of the knocking sensor 18 is the period from a compression top dead center to 90° after the compression top dead center. Therefore, the process cycle is ended when the crank angle is before the compression top dead center. When the crank angle passes the compression top dead center, it is determined that it is during the fetch period of the output signal of the knocking sensor 18, and the process proceeds to step 131.

In the step 131, the output signal of the knocking sensor 18 is fetched through the corresponding AD converter 36 and digital band pass filter 37. In short, the filtered output values of the knocking sensor 18 are fetched. The digital band pass filter 37 passes only the input signal with frequencies of about 5 kHz to 25 kHz, for example. Next, in step 132, the fetched filtered output values of the knocking sensor 18 are stored in the memory 32 of the electronic control unit 30. Next, in step 133, it is determined whether the fetch period of the output signal of the knocking sensor 18 is ended. In short, it is determined whether or not the crank angle reaches 90° after the compression top dead center. In step 133, when it is determined that the fetch period of the output signal of the knocking sensor 18 is not ended, i.e., when it is determined that the crank angle does not reach 90° after the compression top dead center, the process cycle is ended.

Contrary to this, when it is determined in step 133 that the fetch period of the output signal of the knocking sensor 18 is ended, i.e., when it is determined that the crank angle reached 90° after the compression top dead center, the process proceeds to step 134. At the time, the filtered output values of the knocking sensor 18 shown by black dots in FIG. 6B is stored in the memory 32. In step 134, the filtered output values of the knocking sensor 18 stored in the memory 32 are input into the nodes of the input layer (L=1) of the learned first neural network 20, respectively. In this case, an estimate ye of the value representing the knocking intensity is output from the learned first neural network 20. Therefore, as shown in step 135, the estimate ye of the value representing the knocking intensity is calculated.

Figure 14:
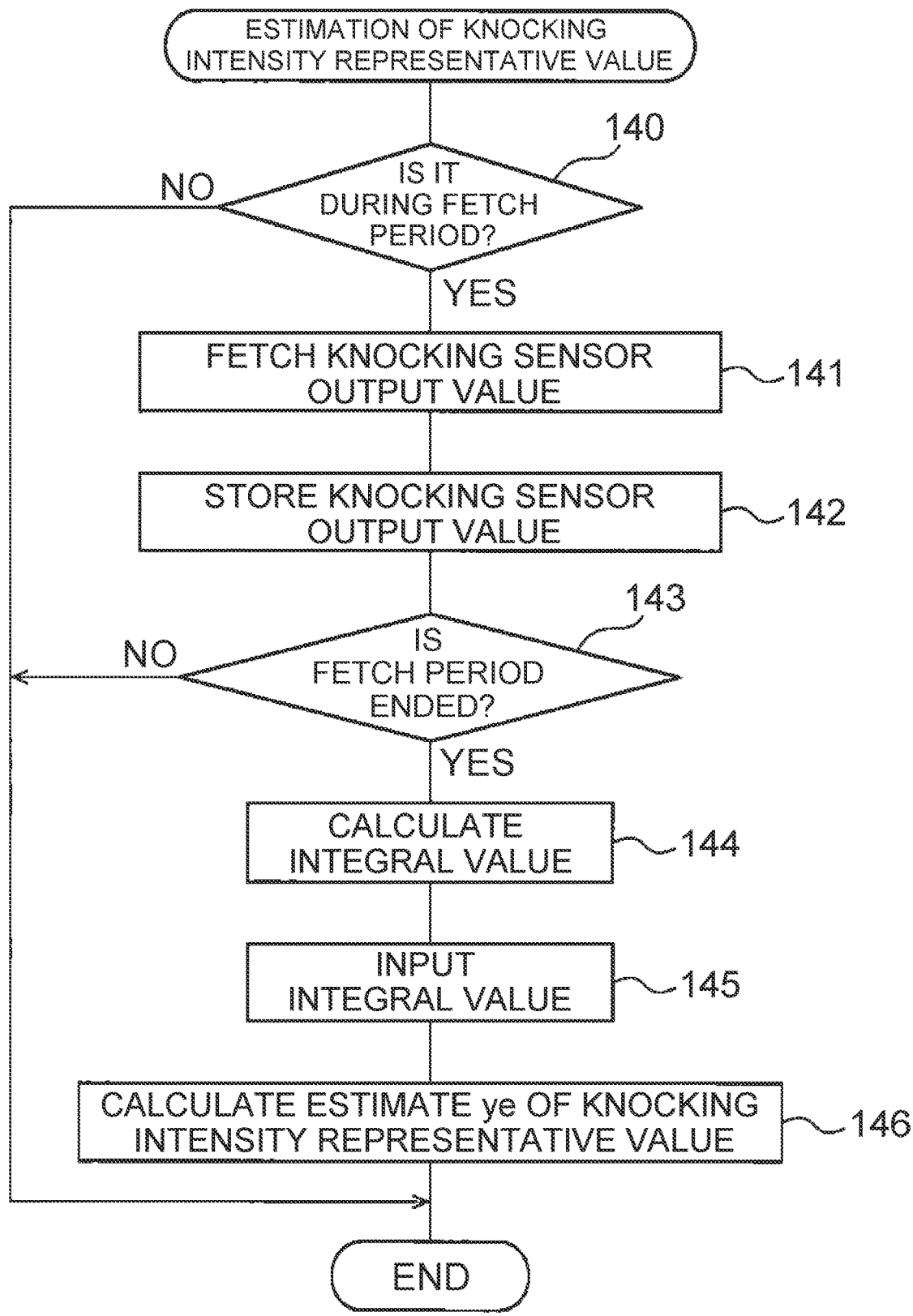
FIG. 14 is a flowchart showing another embodiment of the estimation routine of the knocking intensity representative value.

FIG. 14 shows another example of the estimation process routine of the knocking intensity representative value performed in step 120 of FIG. 12. The routine is also executed by interruption at every fixed crank angle or at every fixed time. The content of steps 140 to 143 of FIG. 14 is the same as the content of steps 130 to 133 of FIG. 13. In short, with reference to FIG. 14, it is first determined whether or not it is during a fetch period of the output signal of the knocking sensor 18 in step 140. In this embodiment, the fetch period of the output signal of the knocking sensor 18 is also during the period from a compression top dead center to 90° after the compression top dead center. Therefore, the process cycle is ended when the crank angle is before the compression top dead center. When the crank angle passes the compression top dead center, it is determined that it is during the fetch period of the output signal of the knocking sensor 18, and the process proceeds to step 141.

In step 141, the output signal of the knocking sensor 18 is fetched through the corresponding AD converter 36 and digital band pass filter 37. In short, the filtered output values of the knocking sensor 18 is fetched. The digital band pass filter 37 passes only the input signal with frequencies of about 5 kHz to 25 kHz, for example. Next, in step 142, the fetched filtered output values of the knocking sensor 18 are stored in the memory 32 of the electronic control unit 30. Next, in step 143, it is determined whether or not the fetch period of the output signal of the knocking sensor 18 is ended. In short, it is determined whether the crank angle reaches 90° after the compression top dead center. In step 143, when it is determined that the fetch period of the output signal of the knocking sensor 18 is not ended, i.e., when it is determined that the crank angle does not reach 90° after the compression top dead center, the process cycle is ended.

Contrary to this, when it is determined in step 143 that the fetch period of the output signals of the knocking sensor 18 is ended, i.e., when it is determined that the crank angle reached 90° after the compression top dead center, the process proceeds to step 144. In step 144, as described with reference to FIG. 6C, based on the filtered output values of the knocking sensor 18 stored in the memory 32, an integral value of the filtered output values of the knocking sensor 18 (negative-side integral value being also regarded as positive value) in each section divided at every 5° crank angle is calculated. Next, in step 145, the calculated integral values of the filtered output values of the knocking sensor 18 are input into the nodes of the input layer (L=1) of the learned first neural network 20, respectively. At the time, the learned first neural network 20 outputs an estimate ye of the value representing the knocking intensity. Therefore, the estimate ye of the value representing the knocking intensity is calculated as indicated in step 146.

Figure 15:
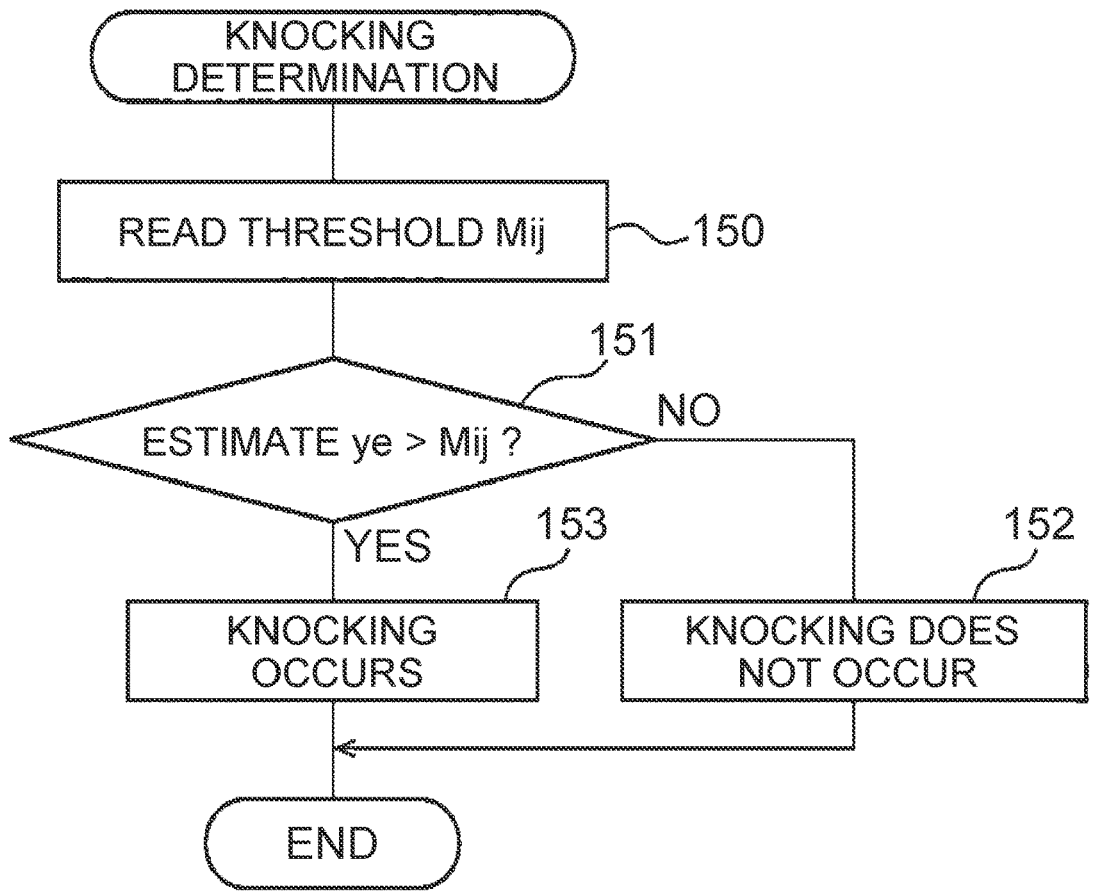
FIG. 15 is a flowchart showing a knocking determination routine.
Figure 16:
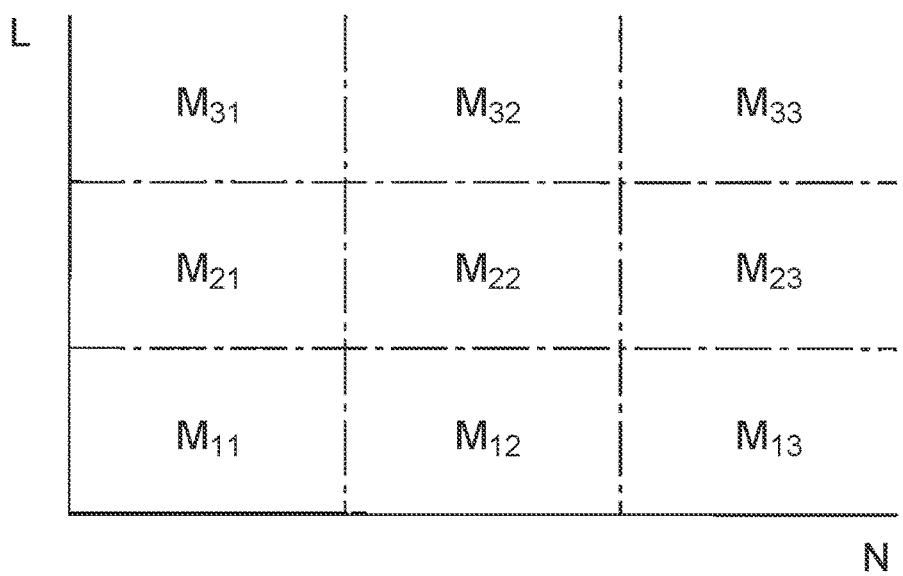
FIG. 16 shows a threshold Mij.

FIG. 15 shows a knocking determination routine executed in the electronic control unit 30, based on the estimate ye of the value representing the knocking intensity calculated in step 135 of FIG. 13, or the estimate ye of the value representing the knocking intensity calculated in step 146 of FIG. 14. The routine is executed by interruption at every fixed crank angle. With reference to FIG. 15, first in step 150, a threshold Mij for the value representing the knocking intensity is read. The threshold Mij is set in advance for each of a plurality of engine operation regions divided in accordance with an engine load L and an engine speed N as shown in FIG. 16.

Next, in step 151, it is determined whether the calculated estimate ye of the value representing the knocking intensity is larger than the threshold Mij. When it is determined that the calculated estimate ye of the value representing the knocking intensity is not larger than the threshold Mij, the process proceeds to step 152, where it is determined that knocking does not occur, and then the process cycle is ended. Hereinafter, when the estimate ye of the value representing the knocking intensity is not larger than the threshold Mij like in the above case, it is stated that knocking does not occur even in the case where weak knocking is occurring, for the convenience of description of the process. Contrary to this, when it is determined that the calculated estimate ye of the value representing the knocking intensity is larger than the threshold Mij, the process proceeds to step 153, where it is determined that knocking occurs, and then the process cycle is ended.

Figure 17:
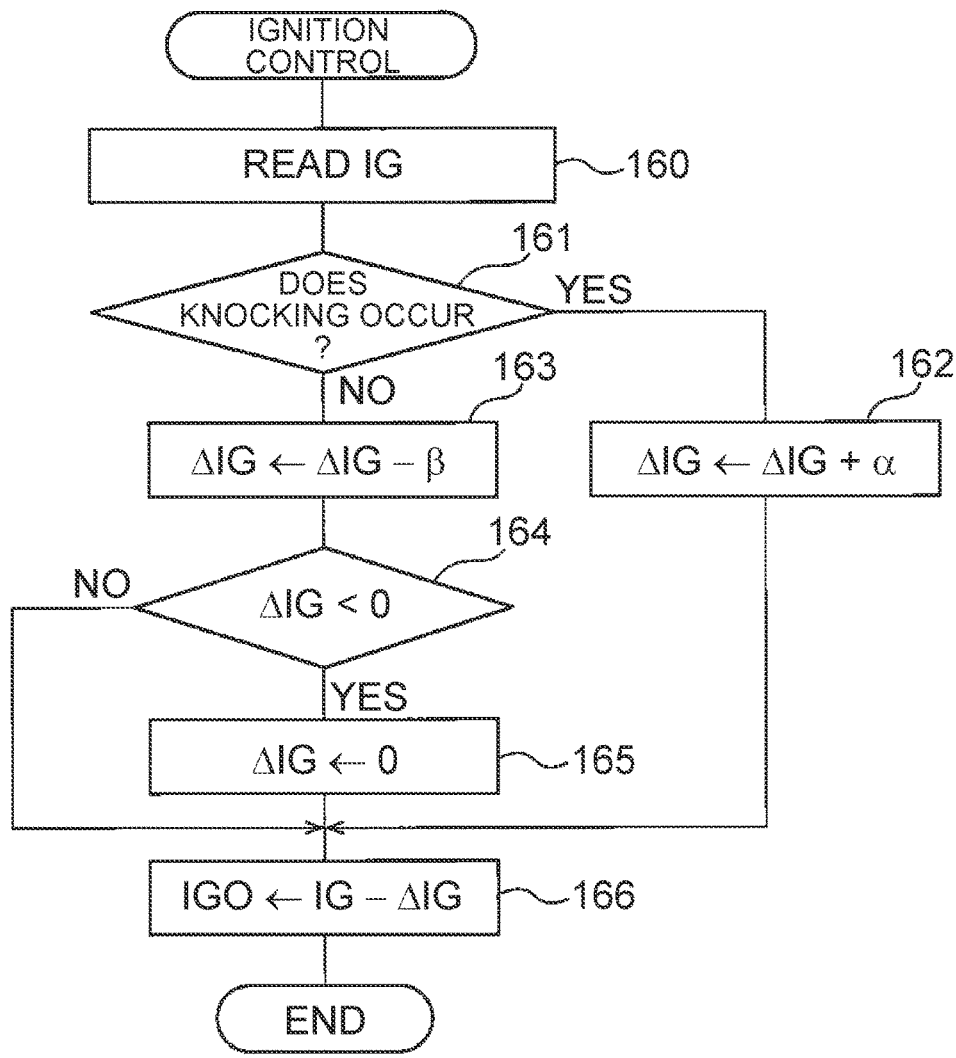
FIG. 17 is a flowchart showing an ignition control routine.
Figure 18:
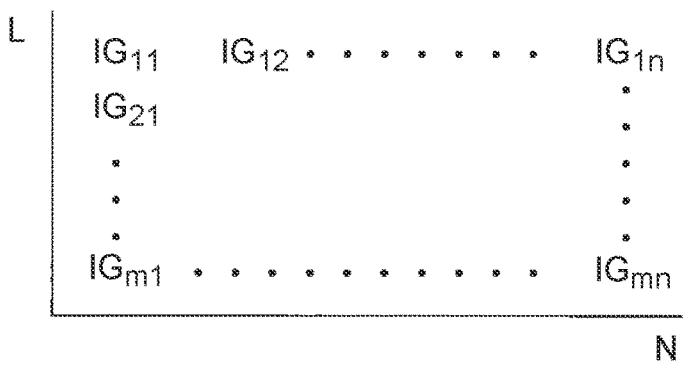
FIG. 18 shows a map of reference ignition timing.

FIG. 17 shows an ignition control routine executed in the electronic control unit 30 based on the determination result in the knocking determination routine shown in FIG. 15. The routine is executed by interruption at every fixed crank angle. With reference to FIG. 17, first in step 160, a reference ignition timing IG (BTDC) is calculated. The reference ignition timing IG is stored in the memory 32 in advance as a function of the engine load L and the engine speed N, in the form of a map as shown in FIG. 18. Next, in step 161, it is determined whether or not knocking has occurred based on the determination result in the knocking determination routine shown in FIG. 15. When it is determined that knocking has occurred, the process proceeds to step 162.

In step 162, a fixed amount α is added to an ignition timing delay amount ΔIG so as to delay the ignition timing. Next, in step 166, the ignition timing delay amount ΔIG is subtracted from a reference ignition timing IG to calculate a final ignition timing IGO. Based on the final ignition timing IGO, an ignition action by the spark plug 11 is controlled. At the time, the ignition timing is delayed by the fixed amount α. Meanwhile, in step 161, when it is determined that knocking does not occur, the process proceeds to step 163, where a fixed amount β is subtracted from the ignition timing delay amount ΔIG so as to advance of the ignition timing.

Next, in step 164, it is determined whether or not the ignition timing delay amount ΔIG becomes negative. When the ignition timing delay amount ΔIG is not negative, the process proceeds to step 166, where the final ignition timing IGO is calculated. In this case, the ignition timing is advanced by the fixed amount β. In the embodiment according to the present disclosure, the fixed amount α is set as a value larger than the fixed amount β. In other words, the delay amount α is set as a value larger than the advance amount β. Meanwhile, when it is determined in step 164 that the ignition timing delay amount ΔIG becomes negative, the process proceeds to step 165, where the ignition timing delay amount ΔIG is set to zero, and then the process proceeds to step 166. In this case, the ignition timing is set to the reference ignition timing IG.

Figure 19:
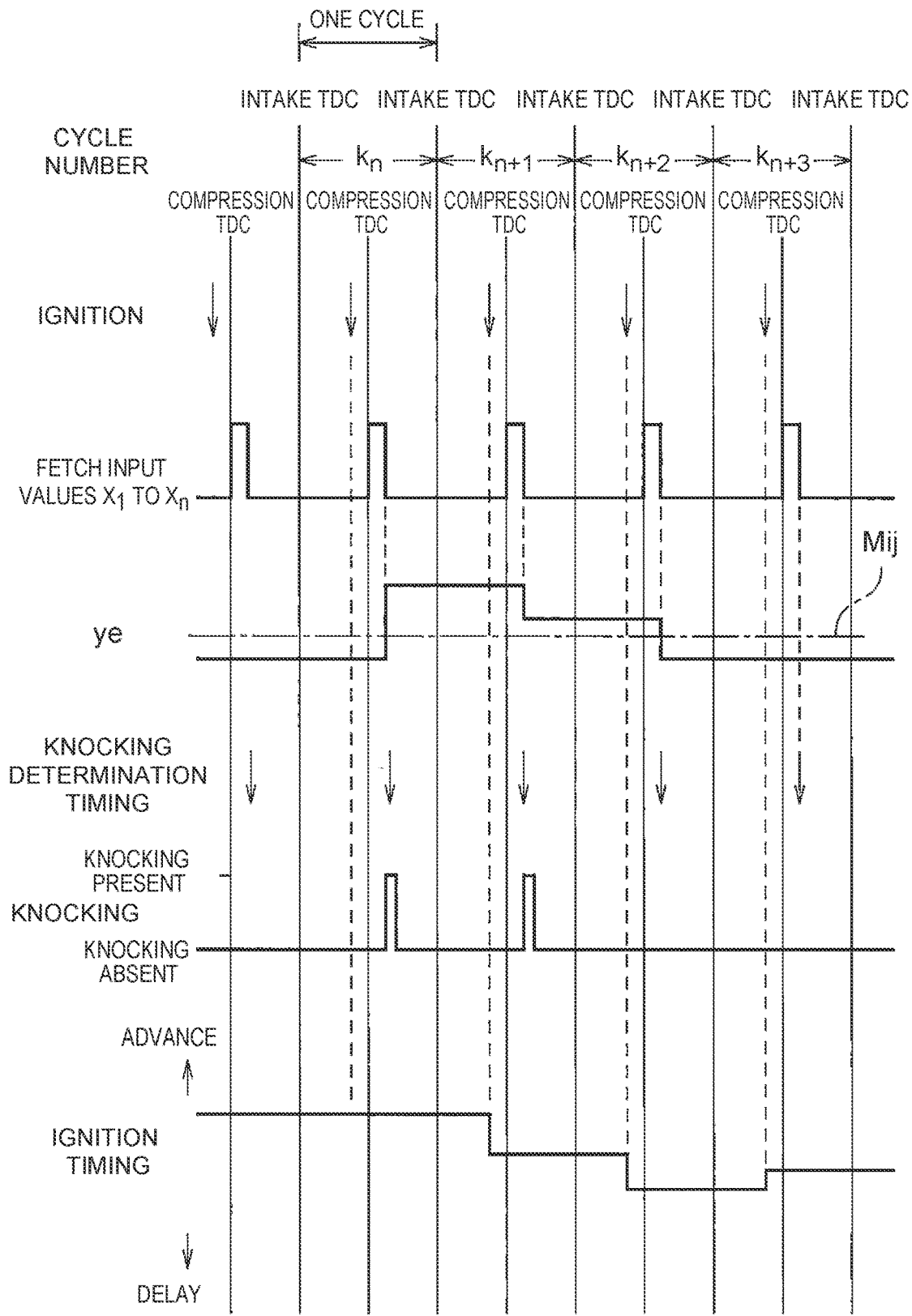
FIG. 19 shows the outline of the knocking process.

The knocking process shown in FIGS. 12 to 15 and in FIG. 17 is independently executed for every cylinder. FIG. 19 shows an example of the knocking process in a given cylinder. FIG. 19 shows a cycle number, timing of ignition, a period of performing an operation to fetch the input values $x_1, x_2 \ldots x_{n-1}, x_n$ into the first learned neural network 20, an estimate ye of the value representing the knocking intensity output from the first learned neural network 20, knocking determination time to determine whether or not knocking has occurred, the result of knocking determination, and ignition timing.

In the embodiment according to the present disclosure, 720 crank angles from an intake top dead center TDC to a next intake top dead center TDC constitute one cycle. The cycle number from the start of engine operation is provided in order of $k_1, k_2, \ldots k_n, k_{n+1}, k_{n+2}, k_{n+3} \ldots$ FIG. 19 shows the situation corresponding to the cycle numbers of $k_n, k_{n+1}, k_{n+2}, k_{n+3}$. Hereinafter, for easy understanding of the knocking process, description will be given with use of these cycle numbers $k_n, k_{n+1}, k_{n+2}, k_{n+3}$. In the embodiment according to the present disclosure, whenever the position of the piston 4 reaches a compression top dead center TDC, the knocking process shown in FIG. 12 is executed. When the knocking process is executed, the estimation routine of the knocking intensity representative value shown in FIG. 13 or 14 is executed, and the operation of fetching the input values $x_1, x_2 \ldots x_{n-1}, x_n$ into the first learned neural network 20 is performed.

When the operation to fetch the input values $x_1, x_2 \ldots x_{n-1}, x_n$ into the first learned neural network 20 is completed, the first learned neural network 20 outputs an estimate ye of the value representing the knocking intensity. When the estimate ye of the value representing the knocking intensity is output from the first learned neural network 20, the knocking determination routine shown in FIG. 15 is executed for determining whether or not knocking has occurred. At the time, when the estimate ye of the value representing the knocking intensity exceeds the threshold Mij, it is determined that knocking has occurred. When determination regarding whether or not knocking has occurred is made, the ignition control routine shown in FIG. 17 is executed.

As shown in FIG. 19, when the estimate ye of the value representing the knocking intensity exceeds the threshold Mij, the ignition timing is delayed in a next cycle. When the ignition timing is delayed, the estimate ye of the value representing the knocking intensity often lowers to or below the threshold Mij. However, there is a case where the estimate ye of the value representing the knocking intensity does not lower to or below the threshold Mij even with the ignition timing being delayed. FIG. 19 shows an example of the case where the estimate ye of the value representing the knocking intensity does not lower to or below the threshold Mij even with the ignition timing being delayed.

More specifically, in the example shown in FIG. 19, it is determined in the cycle with the cycle number $k_n$ that the estimate ye of the value representing the knocking intensity exceeds the threshold Mij, and thereby in a next cycle $k_{n+1}$, the ignition timing is delayed. Next, in the next cycle $k_{n+1}$, it is determined that the estimate ye of the value representing the knocking intensity exceeds the threshold Mij, and thereby, the ignition timing is further delayed in a cycle $k_{n+2}$ after $k_{n+1}$. When the ignition timing is delayed in the cycle $k_{n+2}$, the estimate ye of the value representing the knocking intensity lowers to or below the threshold Mij, and thereby it is determined that knocking does not occur. When it is determined that knocking does not occur, the ignition timing is advanced in a next cycle $k_{n+3}$. Unless knocking occurs, the ignition timing is continuously advanced. As shown in FIG. 19, in the embodiment according to the present disclosure, the advance amount is made smaller than the delay amount.

Now, as described before, the internal combustion engine shown in FIG. 5 is an internal combustion engine, formed by attaching the pressure sensor 19 to the internal combustion engine shown in FIG. 1, for learning the weight of the first neural network 20. In the internal combustion engine shown in FIG. 1 or 5, when the knocking process described with reference to FIG. 19 is performed using the first learned neural network 20, no problem arises. However, when the knocking process described with reference to FIG. 19 is performed using the first learned neural network 20 in other internal combustion engines, for example, commercial internal combustion engines, problems arise. Accordingly, the details of the problems will be described with reference to FIGS. 20A to 23.

Figure 20A:
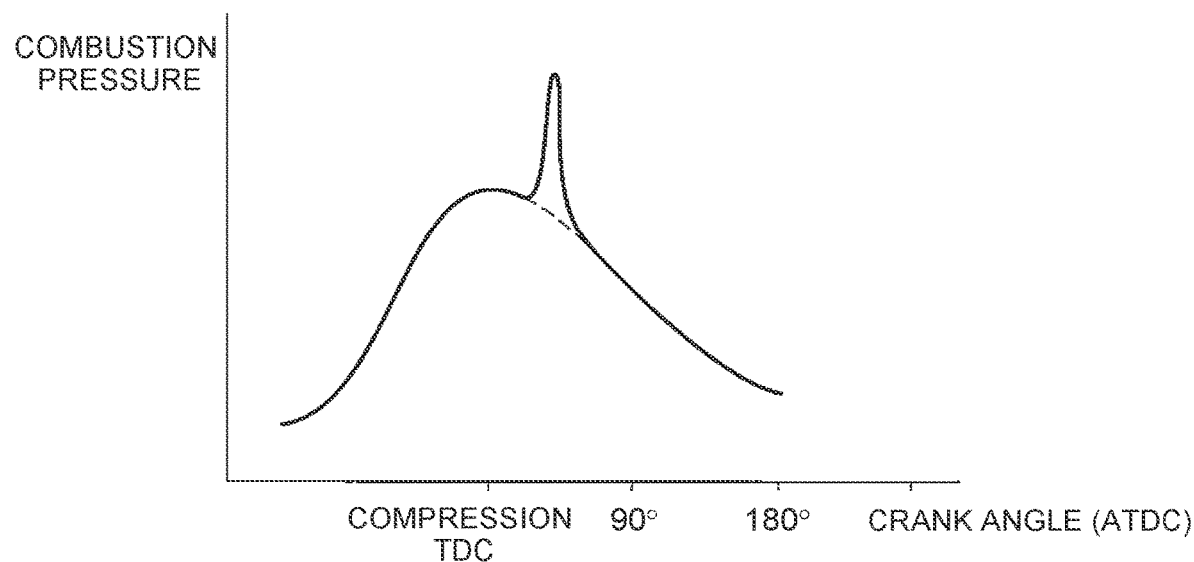
FIG. 20A is an explanatory view about combustion pressure when knocking occurs.
Figure 20B:
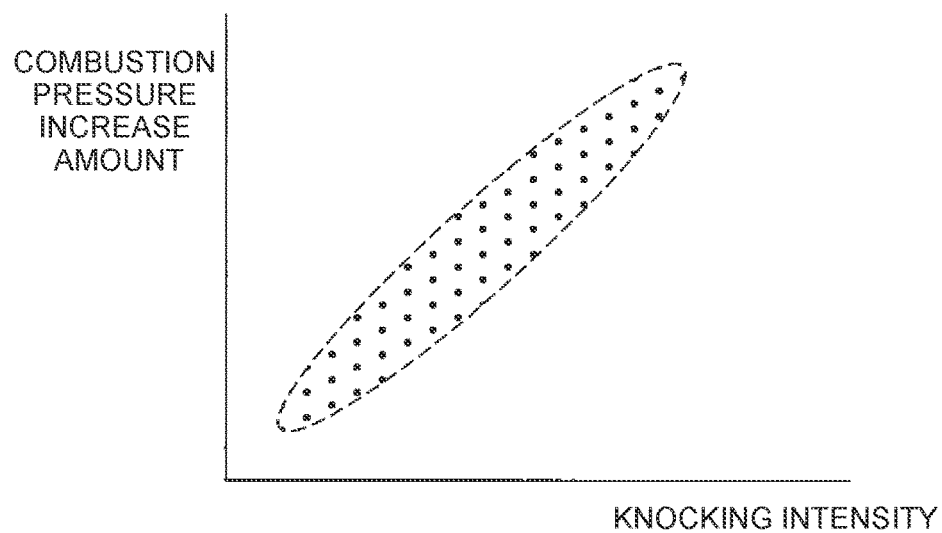
FIG. 20B is an explanatory view about combustion pressure when knocking occurs.

FIG. 20A shows the relationship between the combustion pressure in the combustion chamber 5 and the crank angle (ATDC). In FIG. 20A, a solid line represents a change in combustion pressure in the combustion chamber 5 when knocking occurs, and a broken line represents a change in combustion pressure in the combustion chamber 5 when knocking does not occur. As shown in FIG. 20A, when knocking occurs, the combustion pressure in the combustion chamber 5 rapidly increases after the compression top dead center TDC. In FIG. 20B, the relationship between an increase amount of the combustion pressure in the actual combustion chamber 5 and the knocking intensity at the time is shown with dots. As shown in FIG. 20B, as the increase amount of the combustion pressure in the combustion chamber 5 increases, the knocking intensity becomes larger. In short, as the increase amount of the combustion pressure in the combustion chamber 5 increases, the estimate ye of the value representing the knocking intensity becomes larger. Therefore, the input values and the output value of the first learned neural network 20 shows the relationship between the increase amount of the combustion pressure in the combustion chamber 5 and the knocking intensity.

Figure 21:
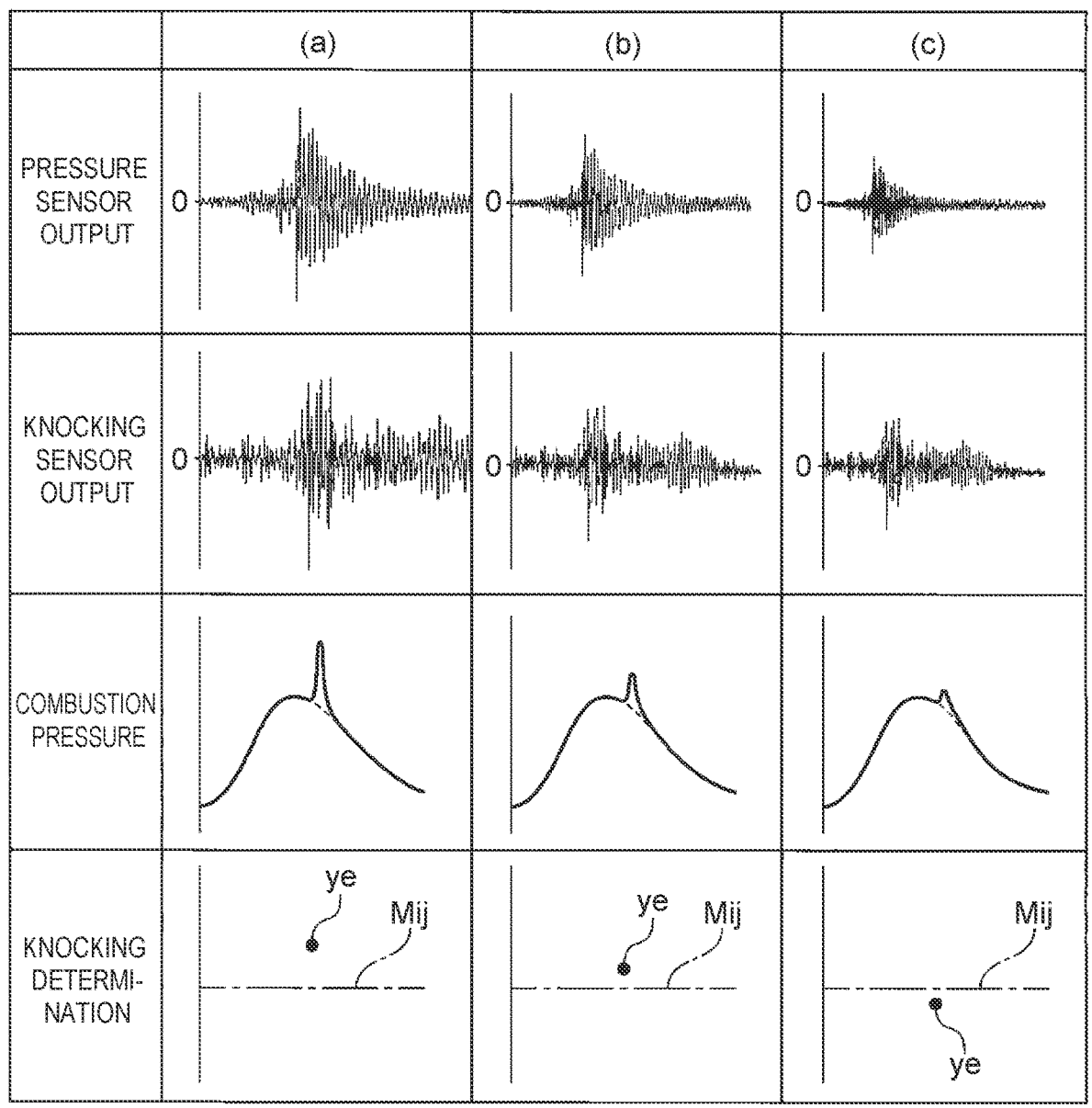
FIG. 21 is an explanatory view about knocking determination.
Figure 22A:
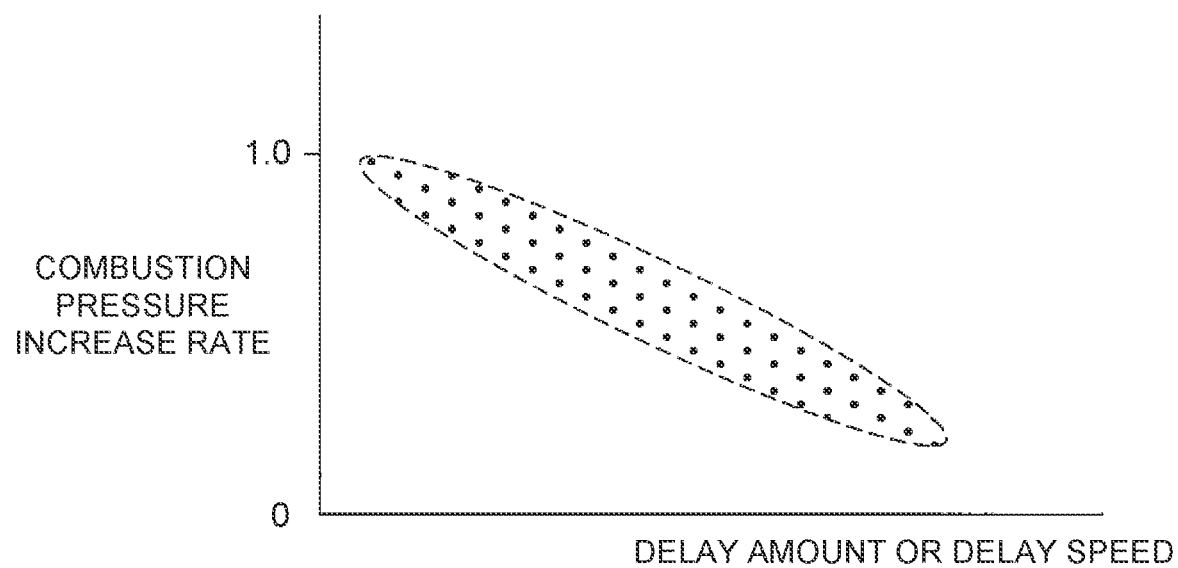
Figure 22B:
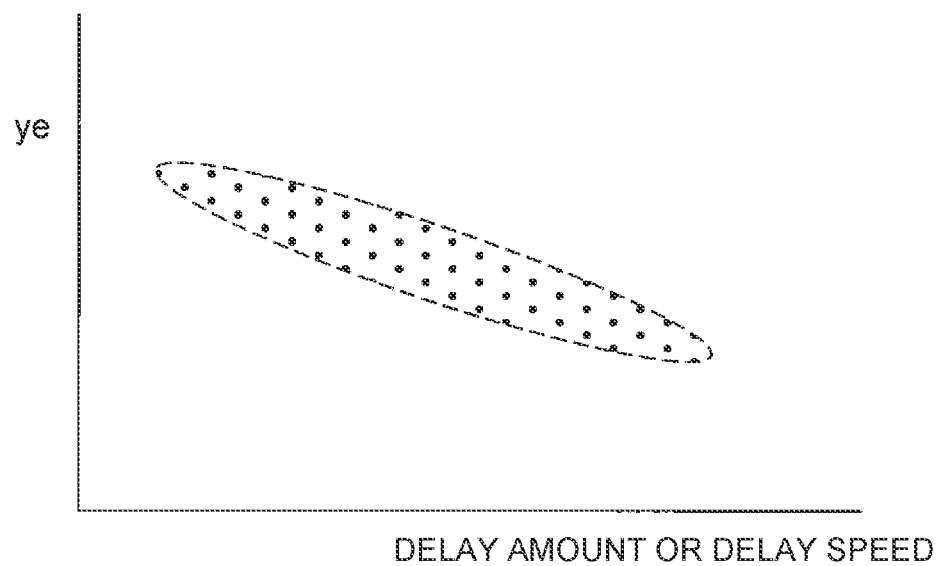

FIG. 21 shows change in values including the output value of the pressure sensor 19, the output value of the knocking sensor 18, the combustion pressure in the combustion chamber 5, and the estimate ye of the value representing the knocking intensity, when the knocking process shown in FIG. 19 is performed in the internal combustion engine shown in FIG. 5 with use of the first learned neural network 20. In FIG. 21, a portion (a) shows change in values in the cycle $k_n$ of FIG. 19, a portion (b) shows change in the values in the cycle $k_{n+1}$ of FIG. 19, and a portion (c) shows change in the values in the cycle $k_{n+2}$ of FIG. 19. As shown in FIG. 19, the ignition timing is gradually delayed as the cycle advances toward $k_{n+1}$, $k_{n+2}$. As shown in FIG. 21, as the cycle advances toward $k_{n+1}$, $k_{n+1}$, the output value of the pressure sensor 19, the output value of the $k_n$ocking sensor 18, the increase amount of the combustion pressure in the combustion chamber 5, and the estimate ye of the value representing the knocking intensity gradually lower.

Thus, FIGS. 19 and 21 indicate that the increase amount of the combustion pressure in the combustion chamber 5 and the estimate ye of the value representing the knocking intensity lower, when the delay amount of ignition timing is increased. In this case, it is known that when a delay speed of ignition timing is increased, the increase amount of the combustion pressure in the combustion chamber 5 and the estimate ye of the value representing the knocking intensity lower. More specifically, it is known that when the delay amount or the delay speed of ignition timing is increased, the increase ratio of the combustion pressure in the combustion chamber 5 lowers as shown by each dot of FIG. 22A, and it is known that when the delay amount or the delay speed of ignition timing is increased, the estimate ye of the value representing the knocking intensity lowers as shown by each dot of FIG. 22B.

Figure 23:
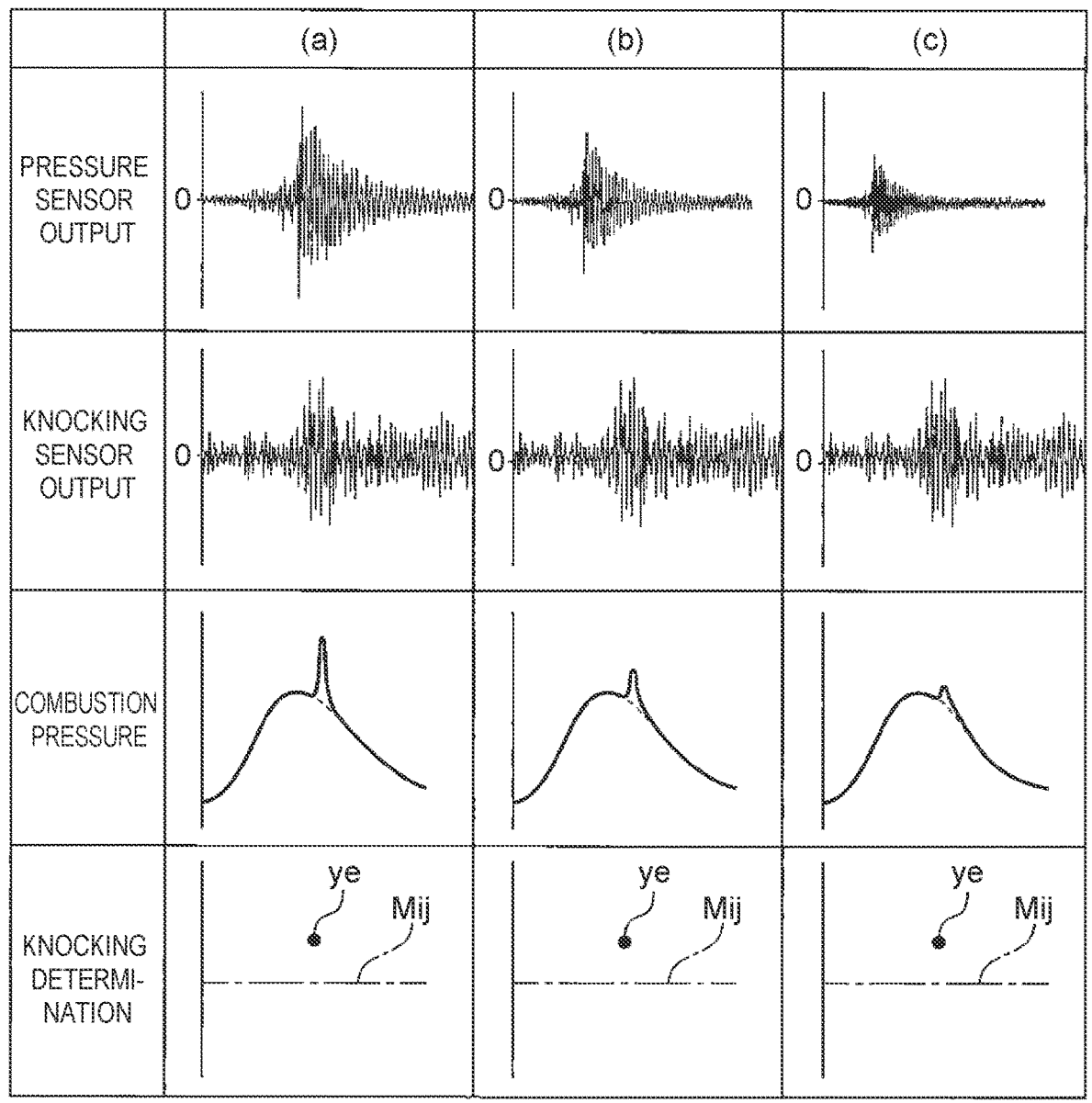
FIG. 23 is an explanatory view about knocking determination.

FIG. 23 shows change in values including the output value of the pressure sensor 19, the output value of the knocking sensor 18, the combustion pressure in the combustion chamber 5, and the estimate ye of the value representing the knocking intensity, in the case where the pressure sensor 19 is attached to other internal combustion engines, other than the internal combustion engine show in FIG. 5, for example, commercial internal combustion engines, and the knocking process described with reference to FIG. 19 is performed using the first learned neural network 20. In FIG. 23, portions (a), (b), and (c) also show change in values in the respective cycles $k_n$, $k_{n+1}$, $k_{n+2}$ of FIG. 19.

Now, as described before, there is tolerance in the component parts of the engine. Therefore, since the dimensions of the component parts of the engine vary for every engine, different engines generate different vibration. However, the first learned neural network 20 does not accomplish learning of the weight relating to such engine specific vibration generated in the engines. Therefore, when an engine vibration, the weight of which has not been learned, is generated, i.e., when unlearned engine vibration is generated, the first learned neural network 20 may incorrectly determine that the vibration of the engine body 1 is generated by knocking. For example, in the portion (a) in FIG. 23, knocking and unlearned engine vibration are generated, and the estimate ye of the value representing the knocking intensity exceeds the threshold Mij in the cycle $k_n$. As a result, it is determined that knocking occurs in this example.

In this case, in a next cycle $k_{n+1}$, the ignition timing is delayed. Accordingly, as shown in the portion (b) in FIG. 23, the increase amount of the combustion pressure in the combustion chamber 5 lowers, and the output value of the pressure sensor 19 also lowers. However, in the case where unlearned engine vibration which is not influenced by the ignition timing is generated, the unlearned engine vibration is not restrained even with the ignition timing being delayed. Therefore, in the example shown in FIG. 23, even after the ignition timing is delayed, the unlearned engine vibration continuously occurs as shown in the portion (b) in FIG. 23. As a result, in the example shown in FIG. 23, the estimate ye of the value representing the knocking intensity becomes the threshold Mij or more due to the unlearned engine vibration as shown in the portion (b) in FIG. 23. As a result, it is determined that knocking is still occurring.

In this case, in a next cycle $k_{n+2}$, the ignition timing is delayed again, and therefore as shown in the portion (c) in FIG. 23, the increase amount of the combustion pressure in the combustion chamber 5 lowers, and the output value of the pressure sensor 19 also lowers. However, even with the ignition timing being delayed in this way, the unlearned engine vibration is not restrained. As a result, in the example shown in FIG. 23, even after the ignition timing is delayed, the unlearned engine vibration continuously occurs as shown in the portion (c) in FIG. 23. As a result, as shown in the portion (c) in FIG. 23, the estimate ye of the value representing the knocking intensity becomes the threshold Mij or more due to the unlearned engine vibration. As a result, it is determined that knocking is still occurring. Thus, when the unlearned engine vibration continuously occurs, the estimate ye of the value representing the knocking intensity may continue to exceed the threshold Mij, and thereby, an action to delay the ignition timing may continuously be performed. In such a case, the ignition timing is excessively delayed, which may result in a problem in that engine output is substantially lowered.

The same problem arises in the case where, although knocking does not occur, the estimate ye of the value representing the knocking intensity exceeds the threshold Mij since unlearned engine vibration has occurred, and thereby it is determined that knocking occurs. In this case, when the unlearned engine vibration continuously occurs, the estimate ye of the value representing the knocking intensity may also continue to exceed the threshold Mij, and an action to delay the ignition timing may continuously be performed. Also in this case, the ignition timing may excessively be delayed, which may cause a problem in that engine output is substantially lowered.

In the present disclosure, when the knocking process is performed using the first learned neural network 20 in other internal combustion engines, other than the internal combustion engine shown in FIG. 5, for example, commercial internal combustion engines, the ignition timing is controlled so as to prevent excessive delay of the ignition timing caused by the occurrence of the unlearned engine vibration. This will be described below with reference to FIGS. 24A to 25B. FIGS. 24A to 25B, like FIG. 19, show change in estimate ye of the value representing the knocking intensity and ignition timing in the case where it is determined that the estimate ye of the value representing the knocking intensity exceeds the threshold Mij in the cycle $k_n$, and thereby the ignition timing is delayed in the next cycle $k_{n+1}$.

Figure 24A:
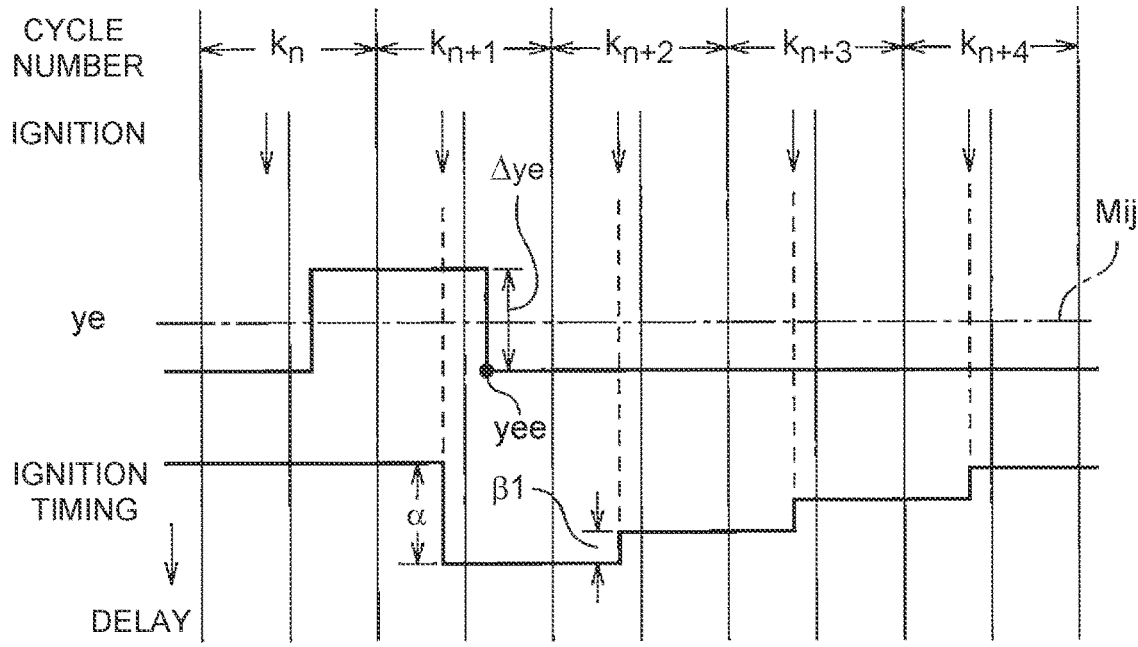
FIG. 24A is an explanatory view about a predictive value or a predictive decrease amount of an estimate ye.

First, with reference to FIG. 24A, FIG. 24A shows change in the estimate ye of the value representing the knocking intensity and the ignition timing, when the knocking process is performed in the internal combustion engine shown in FIG. 1 or 5 based on the output value of the knocking sensor 18 with use of the first learned neural network 20. In the example shown in FIG. 24A, it is determined in the cycle $k_n$ that the estimate ye of the value representing the knocking intensity exceeds the threshold Mij, and thereby the ignition timing is delayed by α in the next cycle $k_{n+1}$. As a result, the estimate ye of the value representing the knocking intensity in the cycle $k_{n+1}$ lowers by Δye and becomes yee. FIG. 24A shows the case where the estimate ye of the value representing the knocking intensity becomes the threshold Mij or below, when the estimate ye of the value representing the knocking intensity becomes yee. In this case, in the next cycle $k_{n+2}$, the ignition timing is advanced by β1.

Figure 24B:
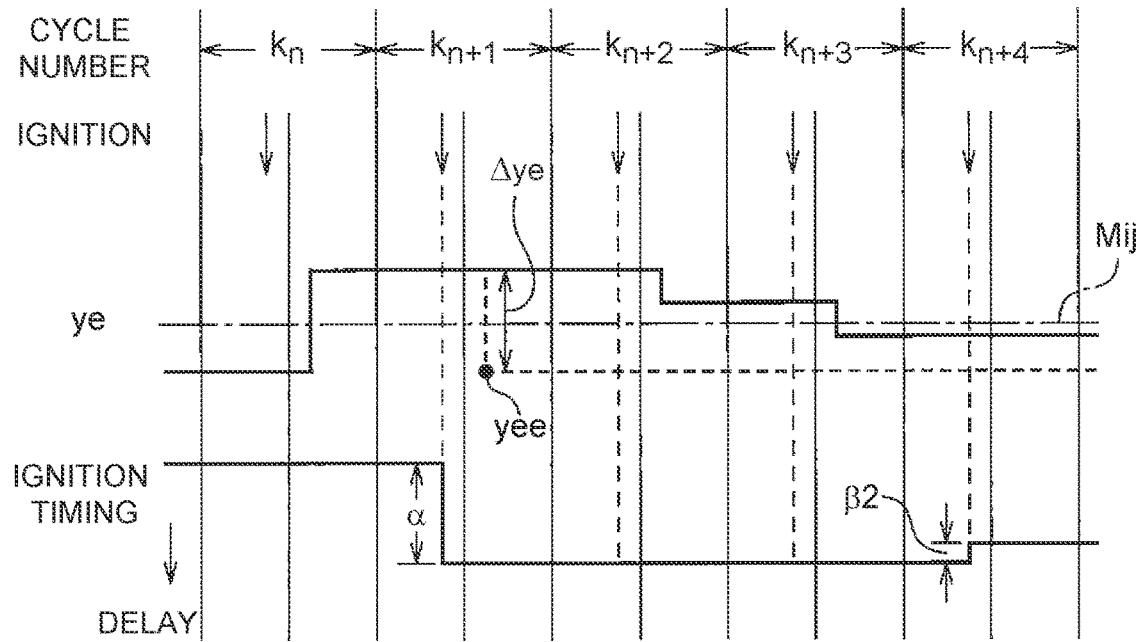
FIG. 24B is an explanatory view about the predictive value or the predictive decrease amount of the estimate ye.

FIG. 24B is an explanatory view about a new knocking process method according to the present disclosure for performing the knocking process based on the output value of the knocking sensor 18 using the first learned neural network 20 in other internal combustion engines, other than the internal combustion engine shown in FIG. 5, for example, commercial internal combustion engines. As shown by a solid line in FIG. 24B, in the cycle $k_n$, the estimate ye of the value representing the knocking intensity exceeds the threshold Mij due to occurrence of both the knocking and the unlearned engine vibration, and after the cycle $k_{n+1}$, the estimate ye of the value representing the knocking intensity continues to exceed the threshold Mij for a while due to the unlearned engine vibration. In short, in an actual internal combustion engine, unlearned engine vibration is generated in specific operating states, and is gradually eliminated with the change in operating state of the engine.

Therefore, as shown in FIG. 24B, even when the estimate ye of the value representing the knocking intensity temporarily continues to exceed the threshold Mij, the estimate ye gradually lowers after a while. However, in a case where the knocking process is performed according to the routine shown in FIGS. 12 to 18 when the estimate ye of the value representing the knocking intensity continues to exceed the threshold Mij as shown in FIG. 24B, the ignition timing continues to be delayed. This results in excessive delay of the ignition timing. Accordingly, in the present disclosure, in order to prevent the excessive delay of the ignition timing, it is determined, when ignition timing is delayed, whether or not the estimate ye of the value representing the knocking intensity exceeds the threshold Mij due to the occurrence of knocking. When it is determined that the estimate ye of the value representing the knocking intensity does not exceed the threshold Mij due to the occurrence of knocking, the ignition timing is not delayed in the next cycle.

As shown in FIG. 24B, when the knocking process is performed using the first learned neural network 20 in other internal combustion engines, other than the internal combustion engine shown in FIG. 5, for example, commercial internal combustion engines, it is unknown whether the estimate ye of the value representing the knocking intensity exceeded the threshold Mij due to the occurrence of only the knocking, whether the estimate ye of the value representing the knocking intensity exceeded the threshold Mij due to the occurrence of only the unlearned engine vibration, and whether the estimate ye of the value representing the knocking intensity exceeded the threshold Mij due to the occurrence of both the knocking and the unlearned engine vibration.

However, when the estimate ye of the value representing the knocking intensity exceeded the threshold Mij due to the occurrence of the knocking, and the ignition timing is thereby delayed by α as shown in FIG. 24A, it is known that the estimate ye of the value representing the knocking intensity in the next cycle lowers by Δye and becomes yee.

Therefore, as shown in FIG. 24B, in the case where, for example, the knocking process is performed using the first learned neural network 20 in commercial internal combustion engines, when the estimate ye of the value representing the knocking intensity exceeds the threshold Mij due to the occurrence of only the knocking, and the ignition timing is thereby delayed by α, the estimate ye of the value representing the knocking intensity in the next cycle $k_{n+1}$ is predicted to lower by Δye and become yee as shown by a broken line. Therefore, when the ignition timing is delayed by α, and the estimate ye of the value representing the knocking intensity lowers to the vicinity of the predictive value yee, it can be determined that knocking has occurred. At the time, the estimate ye of the value representing the knocking intensity correctly represents the knocking intensity.

Contrary to this, when ignition timing is delayed by α, but the estimate ye of the value representing the knocking intensity does not lower to the vicinity of the predictive value yee as shown by a solid line in FIG. 24B, it means that the estimate ye of the value representing the knocking intensity exceeds the threshold Mij in the cycle $k_n$ due to the occurrence of the unlearned engine vibration, or the occurrence of both the knocking and the unlearned engine vibration, instead of due to the occurrence of only the knocking. Therefore, in that case, the estimate ye of the value representing the knocking intensity does not represent the correct knocking intensity. More specifically, when a difference between the estimate yee of the value representing the knocking intensity when ignition timing is delayed by α and the estimate ye of the value representing the knocking intensity output from the first learned neural network 20 is smaller than a predetermined set value, the estimate ye of the value representing the knocking intensity correctly represents the knocking intensity. When the difference is larger than the predetermined set value, the estimate ye of the value representing the knocking intensity does not correctly represent the knocking intensity.

Accordingly, in the present disclosure, when the knocking process is performed in commercial internal combustion engines with use of the first learned neural network 20, the control to delay the ignition control is performed as shown in FIG. 24B. More specifically, in the case where it is determined that the estimate ye of the value representing the knocking intensity exceeds the threshold Mij in the cycle $k_n$, the control to delay the ignition timing in the cycle $k_{n+2}$ after the next cycle $k_{n+1}$ is performed in the next cycle $k_{n+1}$, depending on whether the difference between the estimate yee of the value representing the knocking intensity when ignition timing is delayed by α and the estimate ye of the value representing the knocking intensity output from the first learned neural network 20 is smaller or larger than the predetermined set value.

More specifically, when the difference is smaller than the predetermined set value, i.e., when the estimate ye of the value representing the knocking intensity correctly represents the knocking intensity, the control to delay the ignition timing is performed based on the estimate ye of the value representing the knocking intensity. In this case, when the estimate ye of the value representing the knocking intensity is larger than the threshold Mij, an action to delay the ignition timing is performed, and when the estimate ye of the value representing the knocking intensity is smaller than the threshold Mij, the action to delay the ignition timing is not performed. When the estimate ye of the value representing the knocking intensity is smaller than the threshold Mij, the ignition timing is advanced by β1 in the next cycle $k_{n+2}$. On the contrary, when the difference is larger than the predetermined set value, i.e., when the estimate ye of the value representing the knocking intensity does not correctly represent the knocking intensity, the control to delay the ignition timing is not performed, and the ignition timing is maintained as it is as shown by a solid line in FIG. 24B, in order to wait and see the situation. Then, after the estimate ye of the value representing the knocking intensity lowers below the value Mij, the ignition timing starts to be advanced by β1 at a time.

In the embodiment according to the present disclosure, an ignition timing advance amount β2, used in the case where the estimate ye of the value representing the knocking intensity continues to exceed the threshold Mij due to the unlearned engine vibration as shown in FIG. 24B, is made smaller than an ignition timing advance amount β1 used in the case where the estimate ye of the value representing the knocking intensity exceeds the threshold Mij due to the occurrence of only the knocking as shown in FIG. 24A. In short, when the estimate ye of the value representing the knocking intensity continues to exceed the threshold Mij due to the unlearned engine vibration, the ignition timing is slowly advanced.

Figure 25A:
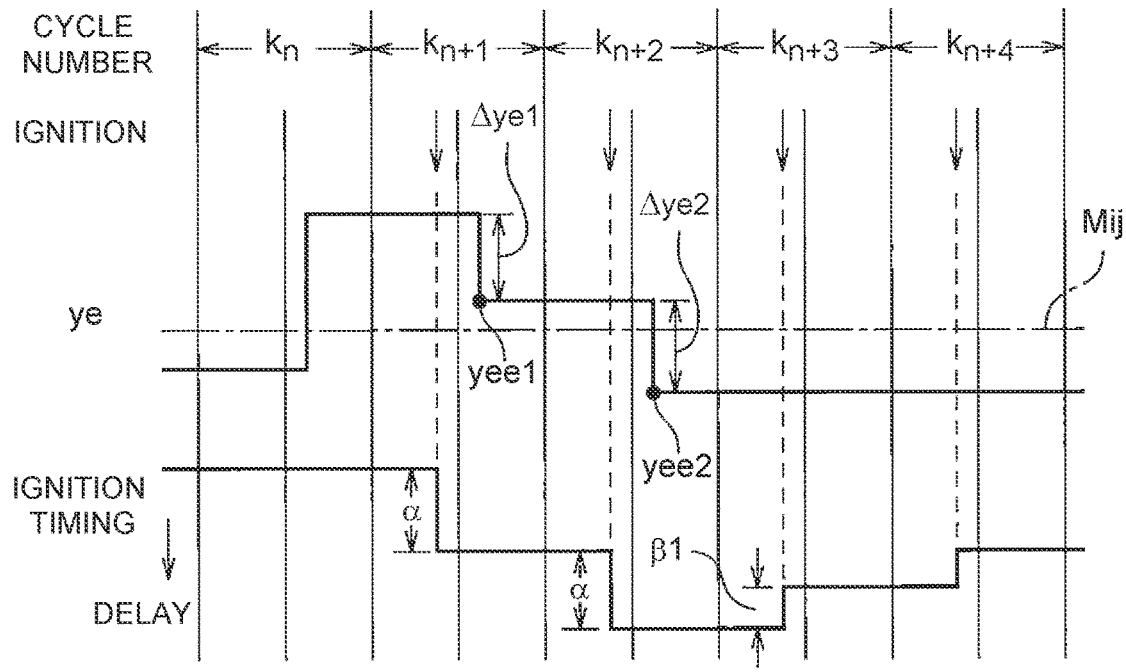
FIG. 25A is an explanatory view about the predictive value or the predictive decrease amount of the estimate ye.
Figure 25B:
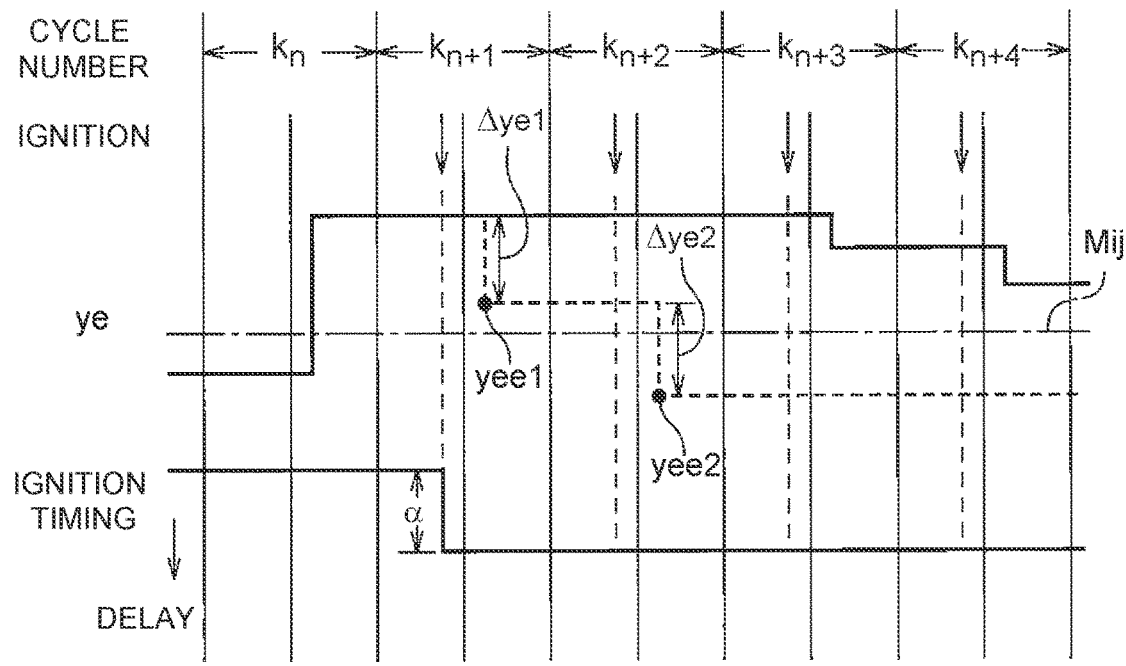
FIG. 25B is an explanatory view about the predictive value or the predictive decrease amount of the estimate ye.

FIG. 25A, like FIG. 24A, shows change in estimate ye of the value representing the knocking intensity and ignition timing when the knocking process is performed in the internal combustion engine shown in FIG. 1 or 5 based on the output value of the knocking sensor 18 with use of the first learned neural network 20. FIG. 25B, like FIG. 25A, shows change in estimate ye of the value representing the knocking intensity and ignition timing when the knocking process is performed based on the output value of the knocking sensor 18 with use of the first learned neural network 20 in other internal combustion engines, other than the internal combustion engine shown in FIG. 5, for example, commercial internal combustion engines. FIGS. 25A and 24B show the case where the ignition timing is delayed by α twice until the estimate ye of the value representing the knocking intensity becomes the threshold Mij or below. FIGS. 25A and 25B show the same situation as in FIG. 24A and FIG. 24B except for the ignition timing being delayed twice.

More specifically, when the estimate ye of the value representing the knocking intensity exceeds the threshold Mij due to the occurrence of the knocking, and the ignition timing is thereby delayed by α as shown in FIG. 25A, the estimate ye of the value representing the knocking intensity in the cycle $k_{n+1}$ lowers by Δye1 and becomes yee1. At the time, the occurrence of knocking is not yet ended, and therefore the estimate ye of the value representing the knocking intensity is still over the threshold Mij, as a result of which the ignition timing is delayed by α again. As a result, the estimate ye of the value representing the knocking intensity in the next cycle $k_{n+2}$ lowers by Δye2 and becomes yee2.

Also in this case, in the present disclosure, as shown by a solid line in FIG. 25B, when the difference between the estimate yee1 of the value representing the knocking intensity when ignition timing is delayed by α and the estimate ye of the value representing the knocking intensity output from the first learned neural network 20 is larger than a predetermined set value, i.e., when the estimate ye of the value representing the knocking intensity does not correctly represent the knocking intensity, the control to delay the ignition timing is not performed, and the ignition timing is maintained as it is as shown by a solid line in FIG. 25B, in order to wait and see the situation. Then, after the estimate ye of the value representing the knocking intensity lowers below the value Mij, the ignition timing starts to be advanced by β1 at a time.

Thus, when the knocking process is performed in a commercial internal combustion engine in the present disclosure using the first learned neural network 20, the control to delay the ignition timing in the next cycle is performed, depending on whether the difference between the predictive value yee of the estimate ye of the value representing the knocking intensity when ignition timing is delayed and the estimate ye of the value representing the knocking intensity output from the first learned neural network 20 is smaller or larger than a predetermined set value. In the embodiment according to the present disclosure, a predictive decrease amount Δye of the estimate ye of the value representing the knocking intensity or the predictive value yee of the estimate ye of the value representing the knocking intensity when ignition timing is delayed is estimated with use of a second neural network.

FIGS. 26 to 33 show a first embodiment according to the present disclosure in which the predictive decrease amount Δye of the estimate ye of the value representing the knocking intensity when ignition timing is delayed is estimated with use of the second neural network. FIGS. 34 to 42 show a second embodiment according to the present disclosure in which the predictive value yee of the estimate ye of the value representing the knocking intensity when ignition timing is delayed is estimated with use of the second neural network.

Accordingly, at first, the first embodiment will be described with reference to FIGS. 26 to 34.

Figures 26, 27:
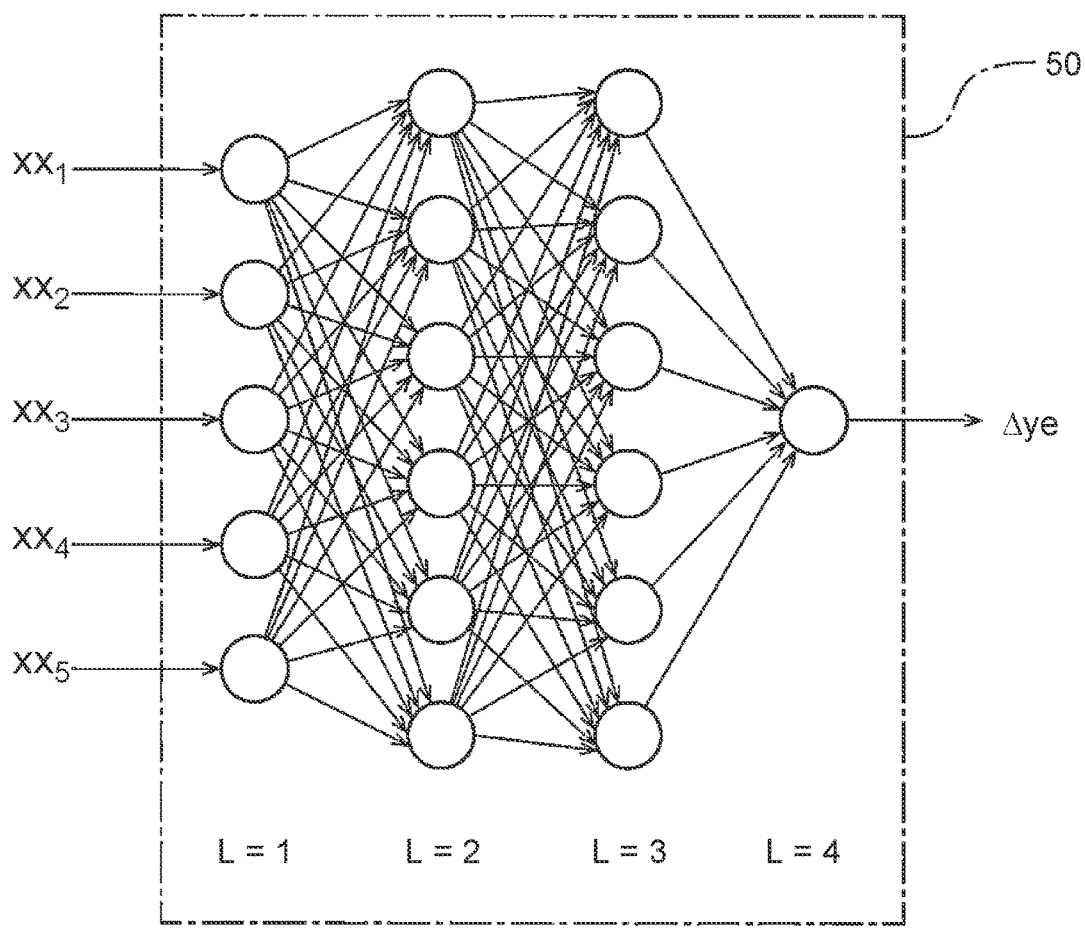
FIG. 26 shows a table of input parameters.
FIG. 27 shows a second neural network used in an embodiment according to the present disclosure.

FIG. 27 shows a second neural network 50 used in the first embodiment. With reference to FIG. 27, in the second neural network 50, L=1 indicates an input layer, L=2 and L=3 indicate hidden layers, and L=4 indicates an output layer as in the neural network shown in FIG. 3. In the first embodiment, as shown in FIG. 27, the input layer (L=1) is made up of five nodes, and five input values $xx_1$, $xx_2$, $xx_3$, $xx_4$, $xx_5$ are input into the nodes of the input layer (L=1), respectively. While the hidden layer (L=2) and the hidden layer (L=3) are described in FIG. 27, the number of layers of these hidden layers may be one or may be any number, and the number of nodes in these hidden layers may also be any number. There is one node in the output layer (L=4), and an output value from the node of the output layer is expressed with $\Delta$ye.

Next, the input values $xx_1$, $xx_2$, $xx_3$, $xx_4$, $xx_5$ and the output value $\Delta$ye in FIG. 27 will be described. First, the output value $\Delta$ye will be described. The output value $\Delta$ye indicates a predictive decrease amount of the estimate ye of the value representing the knocking intensity when ignition timing is delayed due to the occurrence of the knocking only. Meanwhile, the input values $xx_1$, $xx_2$, $xx_3$, $xx_4$, $xx_5$ indicate input parameters which exert strong influence on the decrease amount of the estimate ye of the value representing the knocking intensity. A table of these input parameters is shown in FIG. 26. As shown in FIG. 26, the input parameters include parameters indicating the operating state of the engine, an ignition timing delay amount $\alpha$ or advance amount $\beta$ ($\beta1$ or $\beta2$), and an estimate yeo of the value representing the knocking intensity in a previous cycle.

In the first embodiment, the parameters indicating the operating state of the engine include an engine speed NE, an engine load L, and an EGR rate ER. More specifically, in the first embodiment, the engine speed NE, the engine load L, the EGR rate ER, the delay amount $\alpha$ or advance amount $\beta$ of ignition timing, and the estimate yeo of the value representing the knocking intensity in the previous cycle are used as input values $xx_1$, $xx_2$, $xx_3$, $xx_4$, $xx_5$, respectively. The input values $xx_1$, $xx_2$, $xx_3$, $xx_4$, $xx_5$ are input into the nodes of the input layer in the second neural network 50, respectively.

FIG. 28 shows a table of data acquired in order to prepare a training dataset for the second neural network 50 by using the engine body 1 shown in the FIG. 5 used when the training dataset shown in FIG. 9 is prepared. The data indicates the engine speed NE, the engine load L, the EGR rate ER, the estimate ye of the value representing the knocking intensity, the delay amount $\alpha$ and advance amount $\beta$ of ignition timing for every cycle, when the engine is operated such that both an operating state where knocking occurs and an operating state where knocking does not occur are generated in various combinations of the engine speed NE, the engine load L, the EGR rate ER and the delay amount $\alpha$ and advance amount $\beta$ of ignition timing, while the knocking process is performed by using the routines shown in FIGS. 12 to 18 in the engine body 1 shown in FIG. 5. The data is temporarily stored in the memory 32 of the electronic control unit 30, for example.

In the embodiment according to the present disclosure, when the data is acquired, the ignition timing delay amount $\alpha$ is maintained constant, and the ignition timing advance amount $\beta$ is set to one of the advance amount $\beta1$ or the advance amount $\beta2$. The table shown in FIG. 28 also includes the decrease amount $\Delta$ye of the estimate ye of the value representing the knocking intensity when ignition timing is delayed by the delay amount $\alpha$. The decrease amount $\Delta$ye is calculated based on a difference between the estimate ye of the value representing the knocking intensity when the ignition timing is delayed by the delay amount $\alpha$ and the estimate yeo of the value representing the knocking intensity in the previous cycle. For example, when the ignition timing is delayed by the delay amount $\alpha$ in the cycle $k_{n+1}$, an estimate yen+1 of the value representing the knocking intensity in the cycle $k_{n+1}$ is subtracted from an estimate yen of the value representing the knocking intensity in the cycle $k_n$ to obtain a decrease amount $\Delta$yen+1. The decrease amount $\Delta$ye is calculated in the CPU 33, for example.

Thus, when the ignition timing is delayed by the delay amount $\alpha$, the decrease amount $\Delta$ye of the estimate ye of the value representing the knocking intensity is calculated as shown in FIG. 28, and the calculated decrease amount $\Delta$ye is temporarily stored in the memory 32 of the electronic control unit 30 with the delay amount $\alpha$, for example. The decrease amount $\Delta$ye of the estimate ye of the value representing the knocking intensity indicates an actual decrease amount of the estimate ye of the value representing the knocking intensity. Therefore, the decrease amount $\Delta$ye of the estimate ye of the value representing the knocking intensity is used as a correct answer value i.e., teacher data, at the time of learning the weight of the second learned neural network 50.

FIG. 29 shows a training dataset for learning the weight of the second neural network 50. In the first embodiment, the training dataset is prepared by extracting, from the table shown in FIG. 28, the data relating to the engine speed NE, the engine load L, the EGR rate ER, and the ignition timing delay amount $\alpha$ in a cycle when ignition timing is delayed by the delay amount $\alpha$, and the data relating to the estimate yeo of the value representing the knocking intensity in the cycle immediately before the cycle when the ignition timing is delayed by the delay amount $\alpha$. The training dataset is made up of m pieces of data indicating the relationship between the input values $xx_1$, $xx_2$, $xx_3$, $xx_4$, $xx_5$ and the teacher data $y_t$ extracted from the table shown in FIG. 28. In this case, the engine speed NE, the engine load L, the EGR rate ER, the ignition timing delay amount $\alpha$, and the estimate yeo of the value representing the knocking intensity in the previous cycle shown in FIG. 28 are set as the input values $xx_1$, $xx_2$, $xx_3$, $xx_4$, $xx_5$, respectively. The decrease amount $\Delta$ye of the estimate ye of the value representing the knocking intensity shown in FIG. 28 is set as the teacher data $y_t$.

In the first embodiment, the number of nodes in the input layer (L=1), the number of nodes in the hidden layer (L=2) and the hidden layer (L=3), and the number of nodes in the output layer (L=4) of the second neural network 50 shown in FIG. 27, and the training dataset shown in FIG. 29 are stored in the memory 24 of the learning apparatus 23. In the learning apparatus 23, learning of the weight of the second neural network 50 is performed by the same learning process method as the learning process method already described with reference FIG. 10, with use of the learning process routine shown in FIG. 10. As a result, the second learned neural network 50, i.e., an estimation model of the decrease amount $\Delta$ye of the estimate ye of the value representing the knocking intensity, is prepared.

In the first embodiment according to the present disclosure, the knocking process in the engine of commercial vehicles is performed using the estimation model of the value representing the knocking intensity generated by the first learned neural network 20, and the estimation model of the decrease amount $\Delta$ye of the estimate ye of the value representing the knocking intensity generated by the second learned neural network 50. Therefore, the estimation model of the value representing the knocking intensity and the estimation model of the decrease amount Δye of the estimate ye of the value representing the knocking intensity, i.e., the first learned neural network 20 and the second learned neural network 50, are stored in the electronic control unit 30 of the commercial vehicles. An action to store the estimation models in the electronic control unit 30 of the commercial vehicles is performed by the same method as the method already described with reference to FIG. 11 with use of the routine of data read into the electronic control unit shown in FIG. 11.

Figure 30:
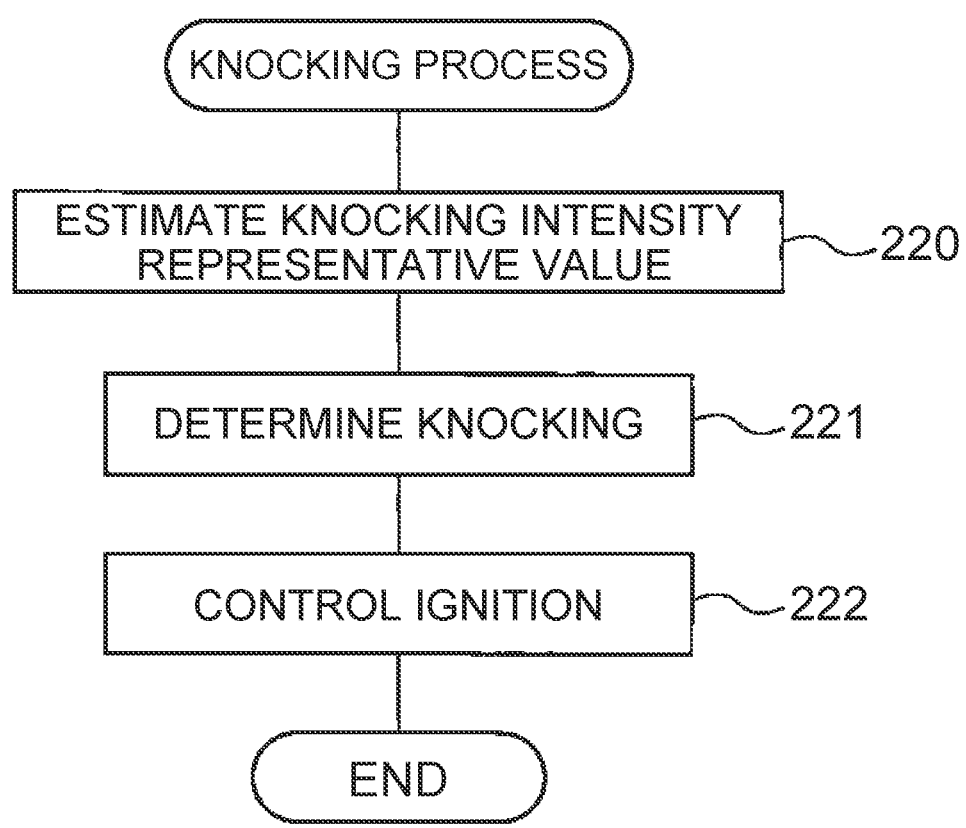
FIG. 30 is a flowchart showing the knocking process routine.

Thus, when the first learned neural network 20 and the second learned neural network 50 are stored in the electronic control unit 30 of the commercial vehicles, the first learned neural network 20 and the second learned neural network 50 are formed in the memory 32 of the electronic control unit 30. FIG. 30 shows a knocking process executed at the time of operating the engine of the commercial vehicles with use of the first learned neural network 20 and the second learned neural network 50 which are formed in the memory 32 of the electronic control unit 30 in the commercial vehicles. The knocking process is executed separately in each cylinder at every cycle. In the first embodiment according to the present disclosure, the knocking process is started, for example, when the crank angle reaches a compression top dead center.

Referring to FIG. 30, first, an estimation process of a value representing the knocking intensity calculated from the output values of the pressure sensor 19, i.e., a knocking intensity representative value, is performed in step 220. Next, in step 221, a knocking determination process regarding whether or not knocking occurs is performed. Then, in step 222, ignition control is performed. The estimation process of the knocking intensity representative value performed in step 220 is performed in accordance with the estimation routine of the knocking intensity representative value shown in one of FIG. 13 and FIG. 14. Since the estimation routines of the knocking intensity representative value have already been described, description of the estimation routines of the knocking intensity representative value will be omitted. When the estimation routines of the knocking intensity representative value are executed, the first learned neural network 20 outputs the estimate ye of the value representing the knocking intensity.

Figure 31:
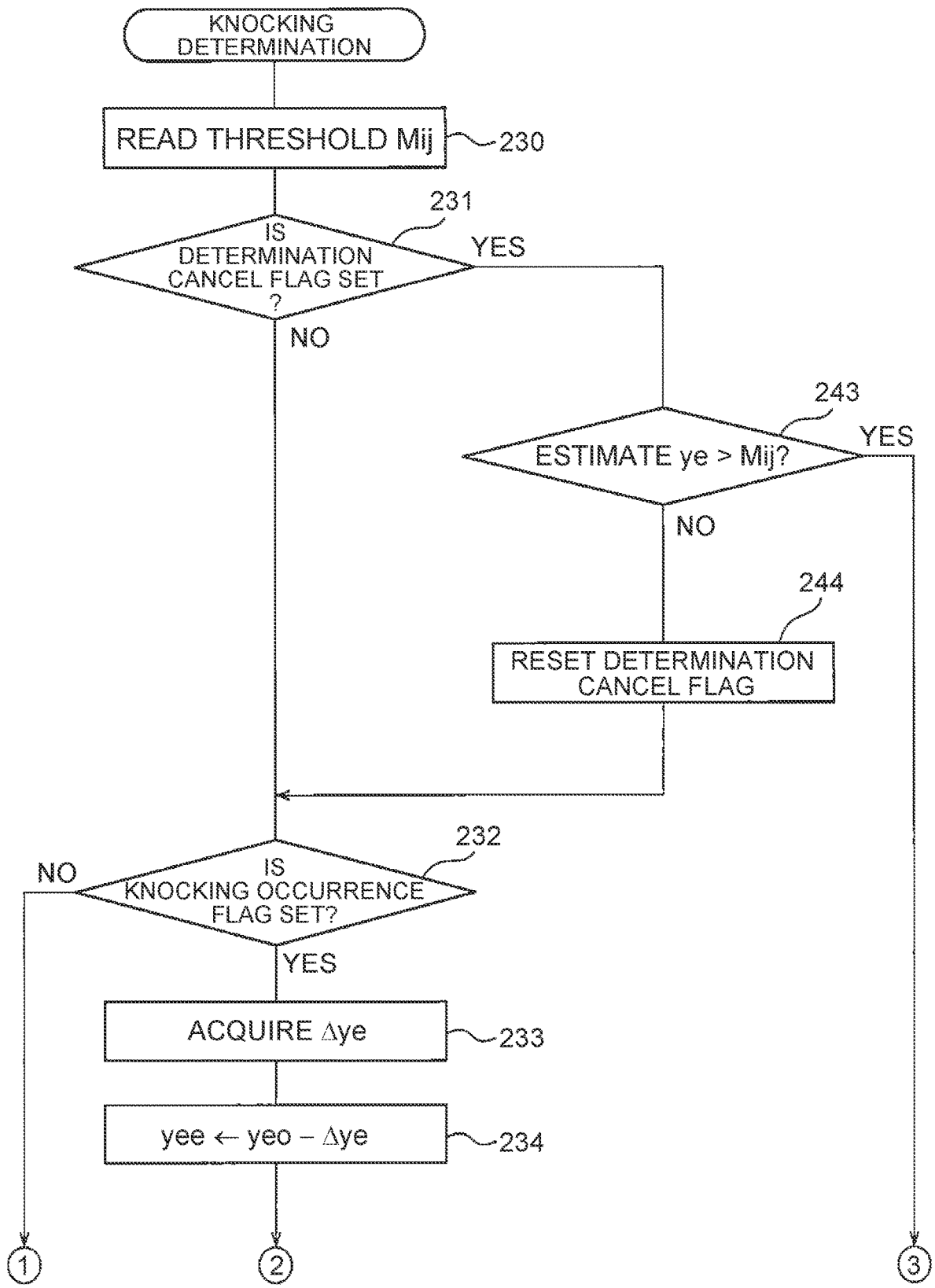
FIG. 31 is a flowchart showing the knocking determination routine.
Figure 32:
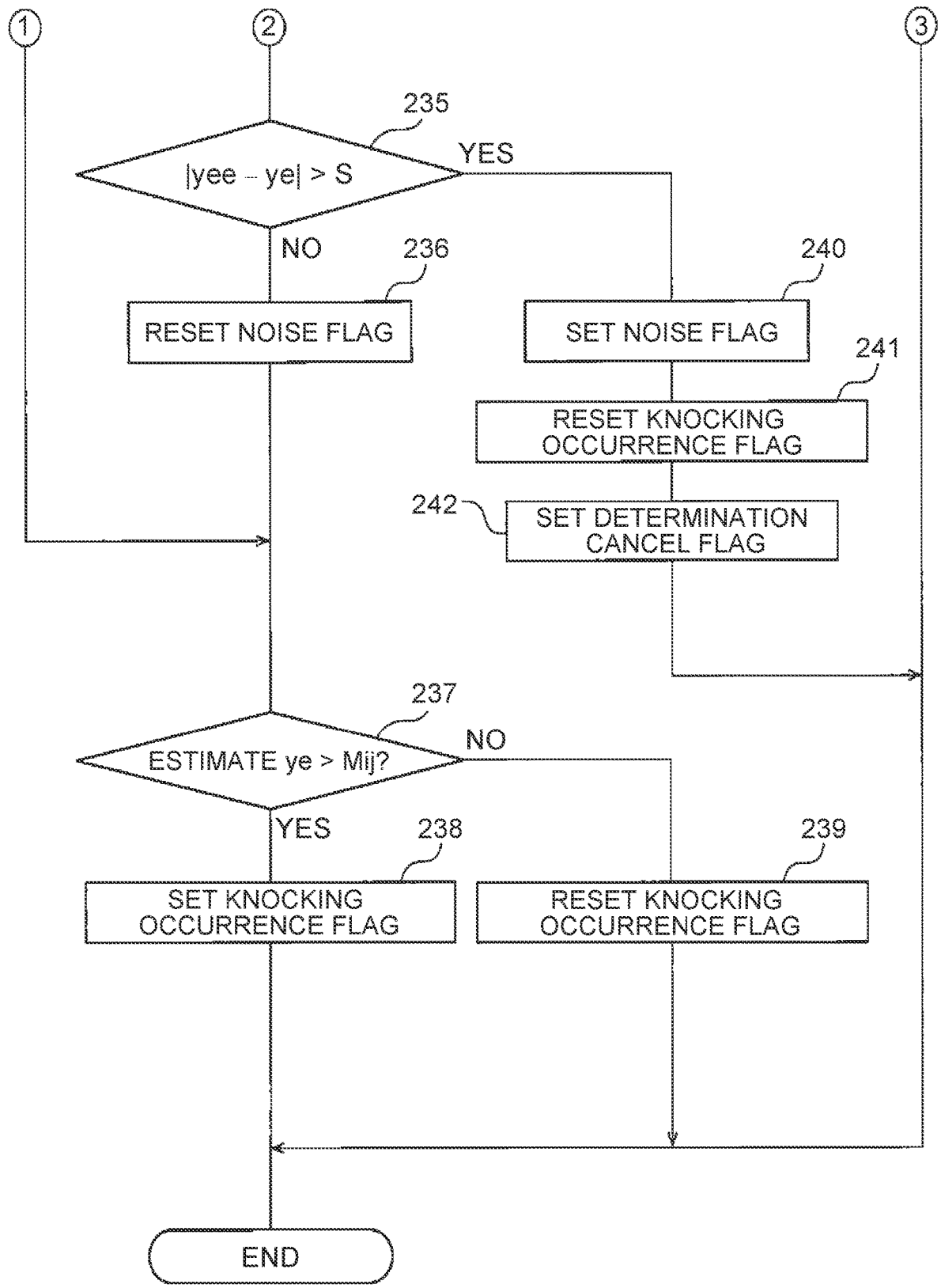
FIG. 32 is a flowchart showing the knocking determination routine.

FIGS. 31 and 32 show a knocking determination routine. When the estimate ye of the value representing the knocking intensity is output from the first learned neural network 20 in step 220 of FIG. 30, the knocking determination routine is performed in step 221 of FIG. 30, based on the estimate ye of the value representing the knocking intensity output from the first learned neural network 20. With reference to FIG. 31, a threshold Mij for the value representing the knocking intensity is read first in step 230. As described before, the threshold Mij is set in advance for each of a plurality of engine operation regions divided in accordance with the engine load L and the engine speed N as shown in FIG. 16.

7 Next, in step 231, it is determined whether or not a determination cancel flag is set, the determination cancel flag being set when determination of whether or not knocking has occurred needs to be canceled. Since the determination cancel flag is generally reset, the process proceeds to step 232. In step 232, it is determined whether or not a knocking occurrence flag is set, the knocking occurrence flag being set when it is determined that knocking has occurred. The knocking occurrence flag is generally reset, and therefore the process jumps to step 237. In step 237, it is determined whether or not the estimate ye of the value representing the knocking intensity output from the first learned neural network 20 is larger than the threshold Mij. When it is determined that the estimate ye of the value representing the knocking intensity is not larger than the threshold Mij, the process proceeds to step 239, where the knocking occurrence flag is reset. Then, the process cycle is ended.

Meanwhile, in step 237, when it is determined that the estimate ye of the value representing the knocking intensity output from the first learned neural network 20 is larger than the threshold Mij, the process proceeds to step 238, where the knocking occurrence flag is set. When the knocking occurrence flag is set, the ignition timing in the next cycle is delayed by α as described later. When the knocking occurrence flag is set, the process proceed from step 232 to step 233 in the next cycle. In step 233, the engine speed NE, the engine load L, the EGR rate ER, the ignition timing delay amount α, and the estimate yeo of the value representing the knocking intensity output from the first learned neural network 20 in the previous cycle are input into the nodes of the input layer in the second learned neural network 50, respectively. Consequently, the second learned neural network 50 outputs a predictive decrease amount Δye of the estimate ye of the value representing the knocking intensity when the ignition timing is delayed.

Next, in step 234, the predictive decrease amount Δye of the estimate ye of the value representing the knocking intensity is subtracted from the estimate yeo of the value representing the knocking intensity output from the first learned neural network 20 in the previous cycle, and thereby a predictive value yee of the estimate ye of the value representing the knocking intensity is calculated. Next in step 235, in order to determine whether or not unlearned engine vibration occurs, it is determined whether the absolute value of a difference (yee−ye) between the predictive value yee of the estimate ye of the value representing the knocking intensity and the estimate ye of the value representing the knocking intensity output from the first learned neural network 20 is larger than a set value S.

More specifically, when only knocking occurs, the predictive value yee of the estimate ye of the value representing the knocking intensity and the estimate ye of the value representing the knocking intensity output from the first learned neural network 20 are practically equal. Therefore, when only the knocking occurs, the absolute value of the difference (yee−ye) becomes smaller than the set value S. Therefore, in this case, the process proceeds to step 236, where a noise flag is reset, the noise flag indicating that the unlearned engine vibrates, i.e., noise is generated. When the noise flag is reset, the ignition timing advance amount is set to β1 as described later.

At the time, the estimate ye of the value representing the knocking intensity output from the first learned neural network 20 indicates correct knocking intensity. Therefore, in this case, the process proceeds to step 237, where it is determined whether or not the estimate ye of the value representing the knocking intensity is larger than the threshold Mij. When it is determined that the estimate ye of the value representing the knocking intensity is larger than the threshold Mij, the process proceeds to step 238, where the knocking occurrence flag is set. At the time, the ignition timing in the next cycle is delayed by α.

When knocking and unlearned engine vibration occur, or when only the unlearned engine vibration occurs, the estimate ye of the value representing the knocking intensity output from the first learned neural network 20 should be larger than the predictive value yee of the estimate ye of the value representing the knocking intensity. Therefore, in this case, the absolute value of the difference (yee−ye) becomes larger than the set value S. At the time, the process proceeds from step 235 to step 240, where the noise flag is set, the noise flag indicating that the unlearned engine vibrates, i.e., noise is generated. When the noise flag is set, the ignition timing advance amount is set to β2 as described late. Then, the process proceeds to step S241.

In step 241, the knocking occurrence flag is reset. At the time, the estimate ye of the value representing the knocking intensity output from the first learned neural network 20 does not correctly indicate the knocking intensity. Therefore, in this case, in order to temporarily cancel the action to advance and the action to delay the ignition timing, the determination cancel flag is set in step 242. Then, the process cycle is ended.

When the knocking cancel flag is set, the process proceeds from step 231 to step 243 in the next cycle. In step 243 and step 244, when the state where the estimate ye of the value representing the knocking intensity output from the first learned neural network 20 is larger than the threshold Mij continues due to the occurrence of the unlearned engine vibration after the estimate ye of the value representing the knocking intensity exceeds the threshold Mij, a process of continuously canceling the action to advance and the action to delay the ignition timing is performed, while a process of continuously canceling determination of whether or not knocking occurs is performed.

More specifically, in step 243, it is determined whether the estimate ye of the value representing the knocking intensity output from the first learned neural network 20 is larger than the threshold Mij. When it is determined that the estimate ye of the value representing the knocking intensity is larger than the threshold Mij, the process cycle is ended. Contrary to this, when it is determined that the estimate ye of the value representing the knocking intensity output from the first learned neural network 20 becomes smaller than the threshold Mij, the process proceeds to step 244, where the process of resetting the determination cancel flag reset is performed. Next, the process proceeds to step 232, where the knocking determination process is resumed.

Figure 33:
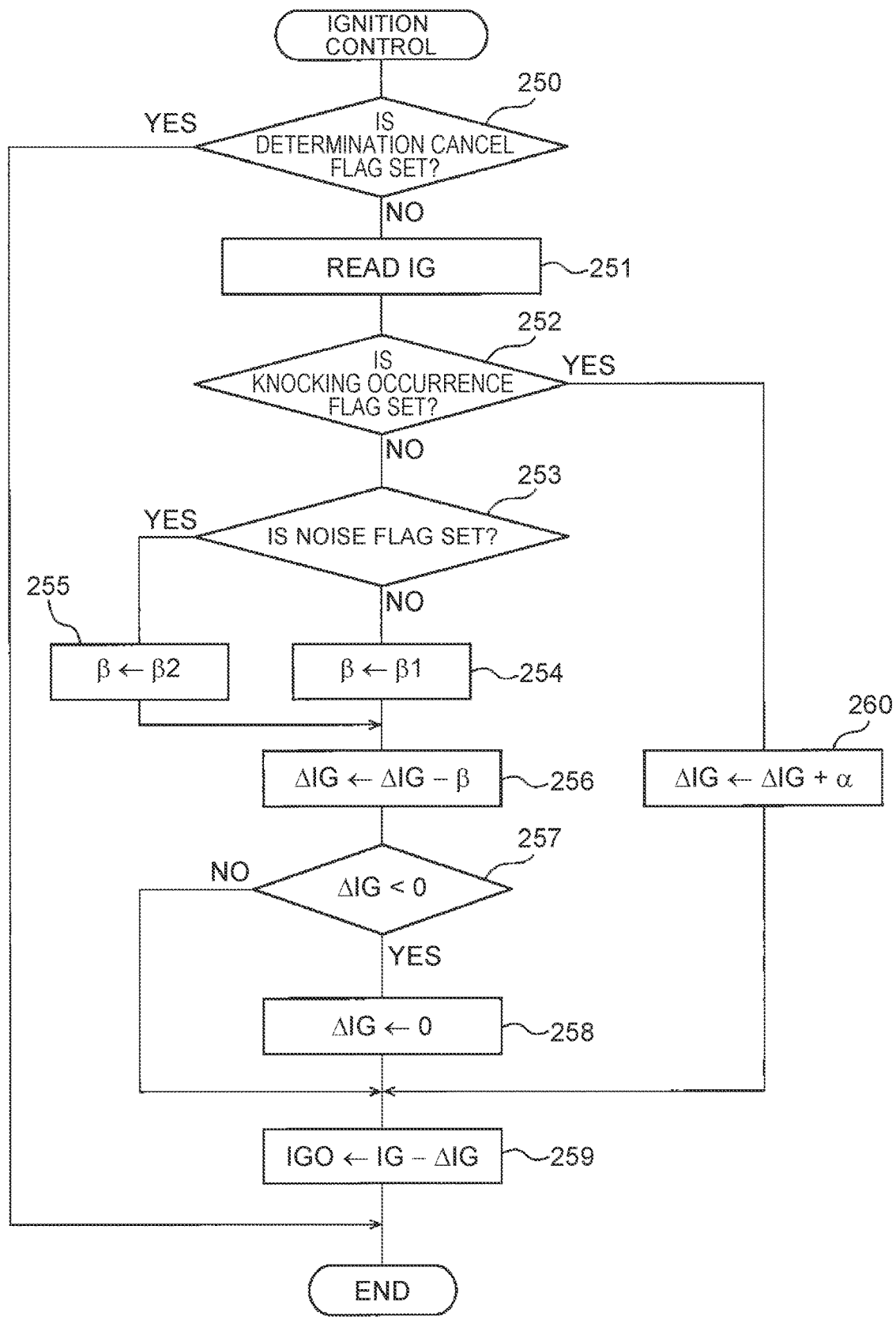
FIG. 33 is a flowchart showing an ignition control routine.

FIG. 33 shows an ignition control routine executed in the electronic control unit 30 based on the determination result in the knocking determination routine shown in FIGS. 31 and 32. Referring to FIG. 33, first, in step 250, it is determined whether or not the determination cancel flag for use in the knocking determination routine is set. When it is determined that the determination cancel flag is set, the process cycle is ended. Contrary to this, when it is determined that the determination cancel flag is not set, the process proceeds to step 251, where reference ignition timing IG (BTDC) is calculated. As described before, the reference ignition timing IG is stored in the memory 32 in advance as a function of the engine load L and the engine speed N, in the form of a map as shown in FIG. 18. Next, in step 252, it is determined whether or not the knocking occurrence flag is set in the knocking determination routine shown in FIGS. 31 and 32. When it is determined that the knocking occurrence flag is set, the process proceeds to step 260.

In step 260, a fixed amount α is added to an ignition timing delay amount ΔIG so as to delay the ignition timing. Next, in step 259, the ignition timing delay amount ΔIG is subtracted from the reference ignition timing IG to calculate a final ignition timing IGO in the next cycle. In the next cycle, an ignition action with the spark plug 11 is performed at the final ignition timing IGO. At the time, the ignition timing is delayed by the fixed amount α. When it is determined that the knocking occurrence flag is reset in step 252, the process proceeds to step 253, and it is determined whether or not the noise flag is set in the knocking determination routine shown in FIGS. 31 and 32.

When it is determined that the noise flag is not set, the process proceeds to step 254, where β is set to the advance amount β1, and then the process proceeds to step 256. Meanwhile, when it is determined that the noise flag is set, the process proceeds to step 255, where β is set to the advance amount β2, and then the process proceeds to step 256. In step 256, β is subtracted from the ignition timing delay amount ΔIG so as to advance the ignition timing. Next, in step 257, it is determined whether or not the ignition timing delay amount ΔIG becomes negative. When the ignition timing delay amount ΔIG does not become negative, the process proceeds to step 259, and the final ignition timing IGO in the next cycle is calculated. In this case, the ignition timing is advanced by β. Meanwhile, when it is determined in step 257 that the ignition timing delay amount ΔIG becomes negative, the process proceeds to step 258, where the ignition timing delay amount ΔIG is set to zero, and then the process proceeds to step 259. In this case, the ignition timing is set to the reference ignition timing IG.

Figure 34:
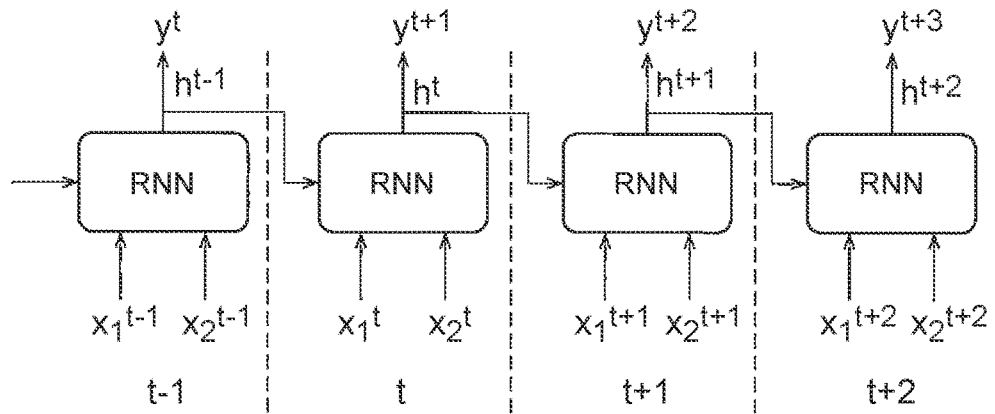
FIG. 34 is an explanatory view of a recurrent neural network.
Figure 35:
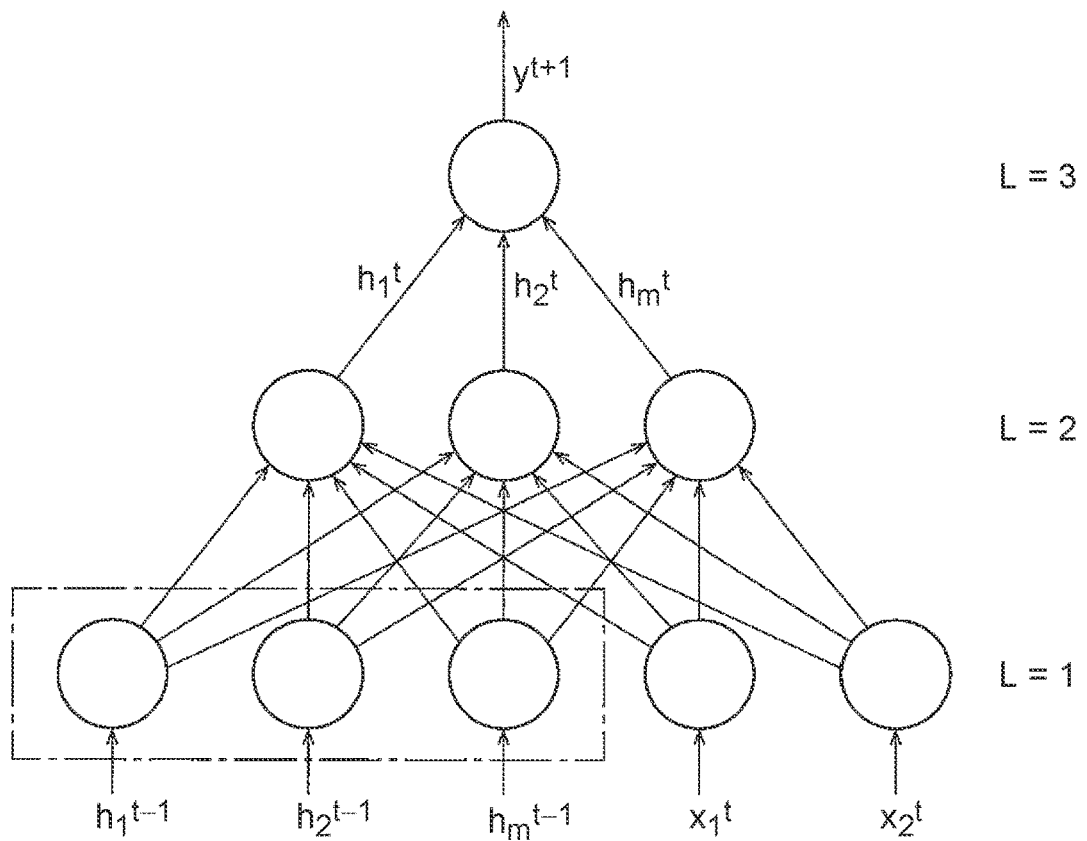
FIG. 35 is an explanatory view of the recurrent neural network.

Next, with reference to FIGS. 34 to 42, the second embodiment according to the present disclosure in which the predictive value yee of the estimate ye of the value representing the knocking intensity when ignition timing is delayed is estimated with use of the second neural network will be described. In the second embodiment, a recurrent neural network is used as the second neural network. FIG. 34 shows an unfolded recurrent neural network (RNN) that is used in the second embodiment. FIG. 35 shows the recurrent neural network. The recurrent neural network is well-known, and therefore, the recurrent neural network will be briefly described below.

In FIG. 34, $x_1^{t-1}$, $x_2^{t-1}$, $x_1^t$, $x_2^t$, $x_1^{t+1}$, $x_2^{t+1}$, $x_1^{t+2}$, $x_2^{t+2}$ indicate time series input values input into the input layer of the recurrent neural network at time t−1, t, t+1, t+2, respectively. The values $y^t$, $y^{t+2}$, $y^{t+2}$, $y^{t+3}$ indicate output values from the output layer of the recurrent neural network at time t−1, t, t+1, t+2, respectively. Values $h^{t-1}$, $h^t$, $h^{t+1}$, $h^{t+2}$ (h is a vector) indicate output values from the hidden layer of the recurrent neural network at time t−1, t, t+1, t+2, respectively. The values $h^{t-1}$, $h^t$, $h^{t+1}$, $h^{t+2}$ are referred to as hidden state vectors.

Meanwhile, referring to FIG. 35, in the recurrent neural network, L=1 indicates an input layer, L=2 indicates a hidden layer, and L=3 indicates an output layer, respectively. In FIG. 35, the nodes within a frame of a chain line are not present in actuality. They are nodes illustrated for the sake of description. Therefore, in the example shown in FIG. 35, the input layers (L=1) is made up of two nodes. In the example shown in FIG. 35, the hidden layer (L=2) is made up of m nodes (only three nodes are illustrated in FIG. 35). Although only one hidden layer (L=2) is illustrated in FIG. 35, the number of the hidden layers can be any number. The number of the nodes in the output layer (L=3) is one.

FIG. 35 shows the input values $x_1^t$, $x_2^t$ and the output value $y^{t+1}$ at time t in FIG. 34. In FIG. 35, $h_1^t$, $h_2^t$ ... $h_m^t$ indicate output values from the nodes of the hidden layer i.e., hidden state vectors, at time t in FIG. 34. As shown in FIG. 35, in the recurrent neural network, the output values from the nodes of the hidden layer at previous time t−1, i.e., the hidden state vectors $h_1^{t-1}$, $h_2^{t-1}$ ... $h_m^{t-1}$, are multiplied by each corresponding weight w, and are input into each node of the hidden layer. Therefore, each node of the hidden layer receives the values obtained by multiplying the input values $x_1^t$, $x_2^t$ by each corresponding weight w, and the values obtained by multiplying the hidden state vectors $h_1^{t-1}$, $h_2^{t-1}$ ... $h_k^{t-1}$ at previous time t−1 by each corresponding weight w. In each of the nodes (k=1, 2 ... m) of the hidden layer (L=2) in FIG. 35, a total input value $u_k$ is calculated as in a following expression:

$$U_k = \sum_{n=1}^{2} x_n^t \cdot w_{kn} + \sum_{n=1}^{m} h_n^{t-1} \cdot w_{kn} + b_k \quad (9)$$

The total input value $u_k$ calculated in each of the nodes of the hidden layer is converted by an activation function, and is output as a hidden state vector $h_k^t$ (k=1, 2 ... m) from each node of the hidden layer. In this case, for example, when a tan h function (hyperbolic tangent function) is used as the activation function, the state vector h output from each of the nodes of the hidden layer becomes $h_k^t$=tan h ($u_k$). These hidden state vectors $h_k^t$ are input into the node of the output layer (L=3). In the node of the output layer, each corresponding weight w is used to calculate a total input value u expressed with a following expression:

$$U = \sum_{n=1}^{m} h_n^t \cdot w_n \quad (10)$$

In the embodiment according to the present disclosure, an identity function is used as the activation function in the node of the output layer. Therefore, from the node of the output layer, the total input value u calculated in the node of the output layer is directly output as an output value y.

Description is now given of the input values $x_1^{t-1}$, $x_2^{t-1}$, $x_1^t$, $x_2^t$, $x_1^{t+1}$, $x_2^{t+1}$, $x_1^{t+2}$, $x_2^{t+2}$ shown in FIG. 34, and the output values $y^t$, $y^{t+1}$, $y^{t+2}$, $y^{t+3}$. In FIG. 34, time t−1, t, t+1, t+2 correspond to continuous cycles of the same cylinder. In the embodiment according to the present disclosure, estimates ye of the values representing the knocking intensity sequentially output from the first learned neural network 20 at time t−1, t, t+1, t+2, i.e., in the continuous cycles of the same cylinder, are the input values $x_1^{t-1}$, $x_1^t$, $x_1^{t+1}$, $x_1^{t+2}$, respectively. Delay amounts α or advance amounts β of the ignition timing at time t−1, t, t+1, t+2, i.e., in the continuous cycles of the same cylinder, are the input value $x_2^{t-1}$, $x_2^t$, $x_2^{t+1}$, $x_2^{t+2}$, respectively.

In this case, the EGR rate ER can also be added as an input value. The output values $y^t$, $y^{t+1}$, $y^{t+2}$, $y^{t+3}$ are predictive values yee of the estimates ye of the values representing the knocking intensity at time t, t+1, t+2, t+3, i.e., in subsequent cycles. FIG. 36 shows a table of the input values and output values at time t as a typical example.

FIG. 37 shows a training dataset for learning the weight of the recurrent neural network shown in FIG. 35. In the second embodiment, the training dataset is prepared by extracting from the table shown in FIG. 28 partial data over all the cycles, i.e., only the estimates ye of the values representing the knocking intensity output from the first learned neural network 20 and the delay amounts α or advance amounts β of the ignition timing. In this case, in the training dataset, the estimate ye of the value representing the knocking intensity output from the first learned neural network 20 in a next cycle is set as a predictive value yee of the estimate ye of the value representing the knocking intensity. The predictive value yee of the estimate ye of the value representing the knocking intensity is used as the teacher data $y^t$.

For example, in a cycle $k_n$ in FIG. 37, an estimate $ye_n$ of the value representing the knocking intensity output from the first learned neural network 20 in the cycle $k_n$, and an ignition timing delay amount α in the cycle $k_n$ are set as the input values $x_1^t$, $x_2^t$ in the cycle $k_n$, and an estimate $ye_{n+1}$ of the value representing the knocking intensity output from the first learned neural network 20 in a cycle $k_{n+1}$ is set as the teacher data $y_t$ in the cycle $k_n$.

In the second embodiment, the number of nodes in the input layer (L=1), the number of nodes in the hidden layer (L=2), and the number of nodes in the output layer (L=3) of the recurrent neural network shown in FIG. 35, and the training dataset shown in FIG. 37 are also stored in the memory 24 of the learning apparatus 23 shown in FIG. 5. In the learning apparatus 23, learning of the weight of the recurrent neural network is performed. Learning of the weight of the recurrent neural network is typically performed using a truncated backpropagation through time (BPTT) method in which a portion of an unfolded recurrent neural network is cut out and error backpropagation is applied.

For example, assuming that FIG. 34 is a portion of the cut out recurrent neural network, input values $x_1^{t-1}$, $x_2^{t-1}$, $x_1^t$, $x_2^t$, $x_1^{t+1}$, $x_2^{t+1}$, $x_1^{t+2}$, $x_2^{t+2}$ at time t−1, t, t+1, t+2 in FIG. 34 are sequentially input into the recurrent neural network, and with the error backpropagation method, learning of the weight of the recurrent neural network is performed such that a square error E (=½ ($y^{t+3}$−$y^t$)²) between the output value $y^{t+3}$ output from the recurrent neural network at time t+2 and the corresponding teacher data $y^t$ decreases. The error backpropagation at the time is performed in the direction of going back in time. Description of the details of error backpropagation will be omitted.

In the second embodiment, in FIG. 37, learning of the weight of the recurrent neural network is performed for the data of, for example, continuous 10 cycles by the error backpropagation method. When learning of the weight of the recurrent neural network for the data of continuous 10 cycles is completed, then learning of the weight of the recurrent neural network is performed for data of next continuous 10 cycles. Thus, learning of the weight of the recurrent neural network is performed until learning of the weight is completed for all pieces of data of continuous 10 cycles.

Figure 38:
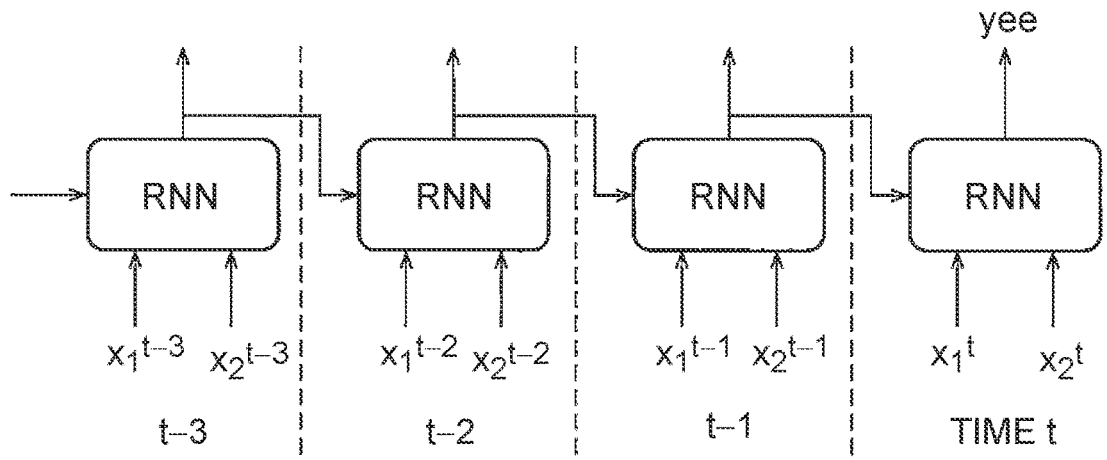
FIG. 38 is an explanatory view of the recurrent neural network.

FIG. 38 shows a learned recurrent neural network which has completed the learning of the weight. In the learned recurrent neural network, when time t is current time in FIG. 38, and input values $x_1^{t-3}$, $x_2^{t-3}$, $x_1^{t-2}$, $x_2^{t-2}$, $x_1^{t-1}$, $x_2^{t-1}$ at past time t−3, t−2, t−1, and input values $x_1^t$, $x_2^t$ at current time t are sequentially input into the recurrent neural network, the recurrent neural network outputs a predictive value yee of the estimate ye of the value representing the knocking intensity at current time t. In short, in the second embodiment, an estimation model of the predictive value yee of the estimate ye of the value representing the knocking intensity when the ignition timing is delayed is generated with use of the learned recurrent neural network.

In the second embodiment of the present disclosure, with use of the estimation model of the value representing the knocking intensity generated by the first learned neural network 20, and the estimation model of the predictive value yee of the estimate ye of the value representing the knocking intensity generated by the learned recurrent neural network, the knocking process in the engine of commercial vehicles is performed. Therefore, the estimation model of the value representing the knocking intensity and the estimation model of the predictive value yee of the estimate ye of the value representing the knocking intensity, i.e., the first learned neural network 20 and the learned recurrent neural network, are stored in the electronic control unit 30 of the commercial vehicles. An action to store the estimation models in the electronic control unit 30 of the commercial vehicles is performed by the same way as the method already described with reference to FIG. 11 with use of the routine of data read into the electronic control unit shown in FIG. 11.

Figure 39:
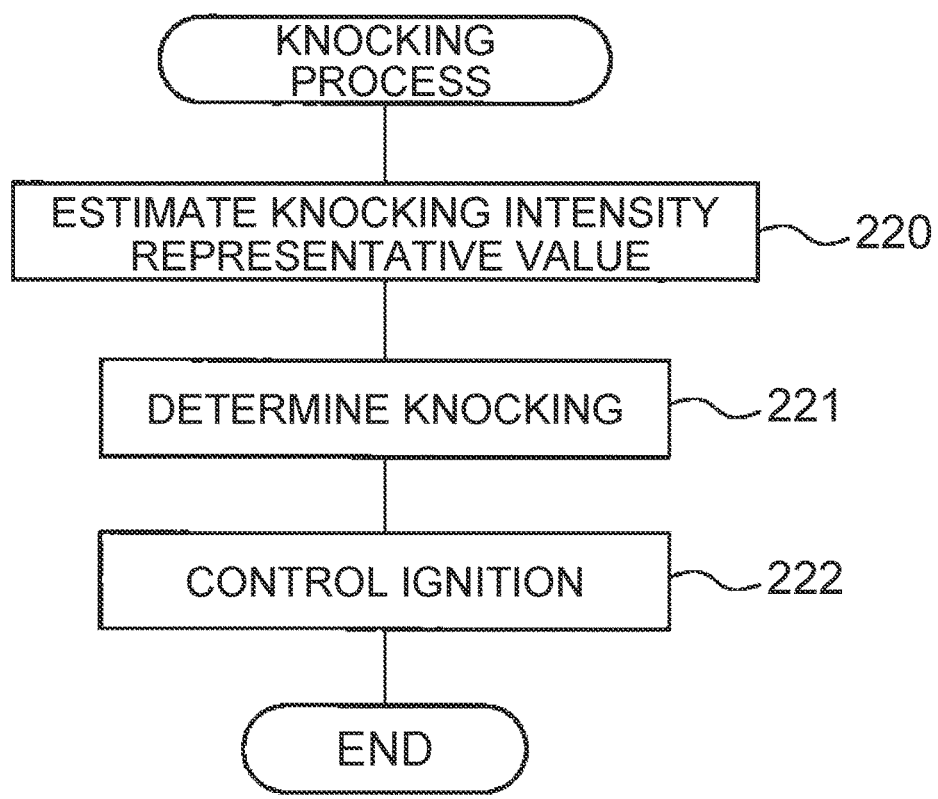
FIG. 39 is a flowchart showing the knocking process routine.

Thus, when the first learned neural network 20 and the learned recurrent neural network are stored in the electronic control unit 30 of the commercial vehicles, the first learned neural network 20 and the learned recurrent neural network are formed in the memory 32 of the electronic control unit 30. FIG. 39 shows a knocking process executed at the time of operating the engine of the commercial vehicles with use of the first learned neural network 20 and the learned recurrent neural network which are formed in the memory 32 of the electronic control unit 30 of the commercial vehicles. The knocking process is executed separately in each cylinder at every cycle. In the second embodiment according to the present disclosure, the knocking process is also started when the crank angle reaches the compression top dead center, for example.

The knocking process shown in FIG. 39 is the same as the knocking process shown in FIG. 30. More specifically, referring to FIG. 39, first, an estimation process of a value representing the knocking intensity calculated from the output values of the pressure sensor 19, i.e., a knocking intensity representative value, is performed in step 220. Next, in step 221, the knocking determination process regarding whether or not knocking occurs is performed. Then, in step 222, ignition control is performed. The estimation process of the knocking intensity representative value performed in step 220 is performed in accordance with the estimation routine of the knocking intensity representative value shown in one of FIG. 13 and FIG. 14. Since the estimation routines of the knocking intensity representative value have already been described, description of the estimation routines of the knocking intensity representative value will be omitted. When the estimation routines of the knocking intensity representative value are executed, the first learned neural network 20 outputs the estimate ye of the value representing the knocking intensity.

Figure 40:
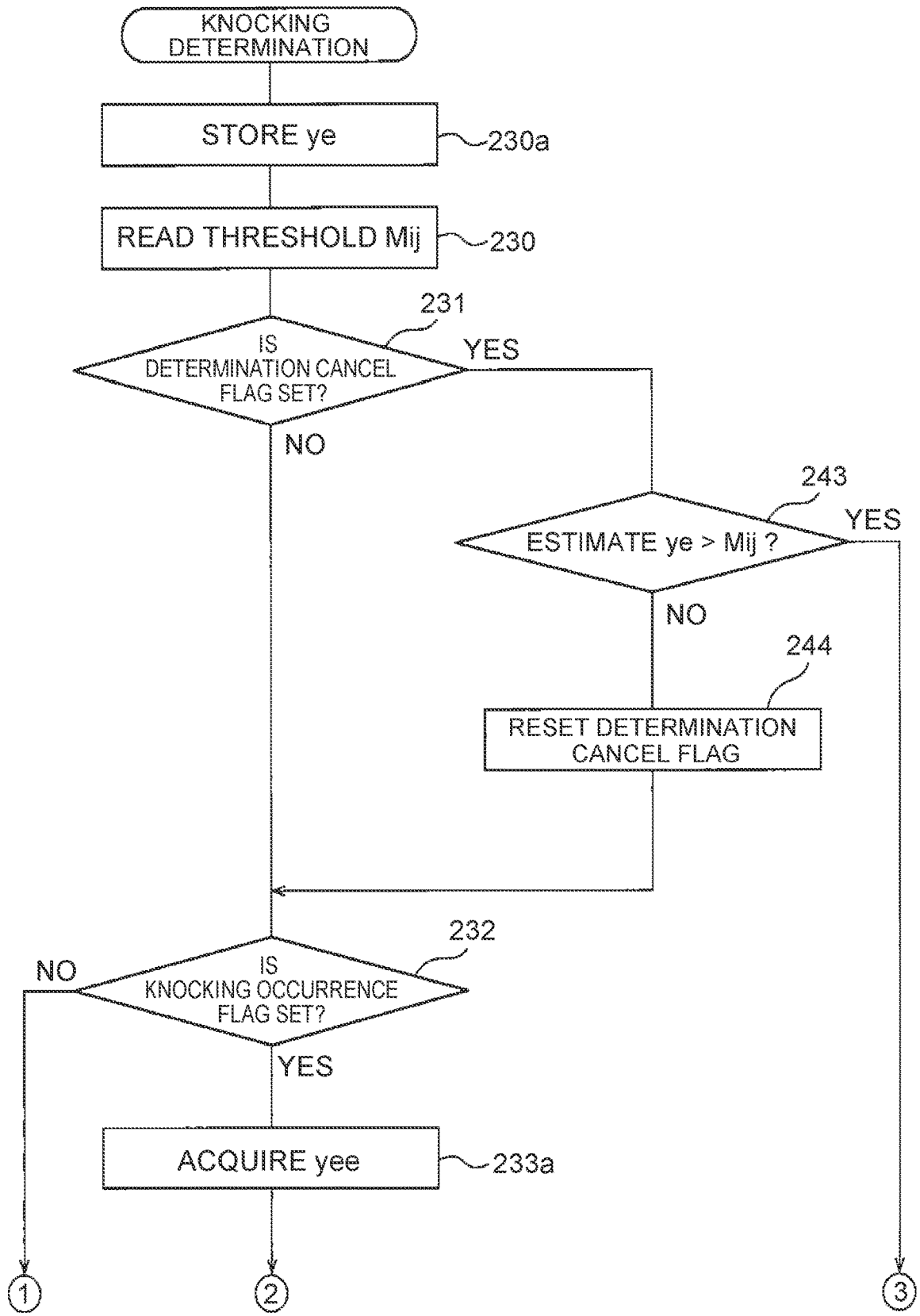
FIG. 40 is a flowchart showing the knocking determination routine.
Figure 41:
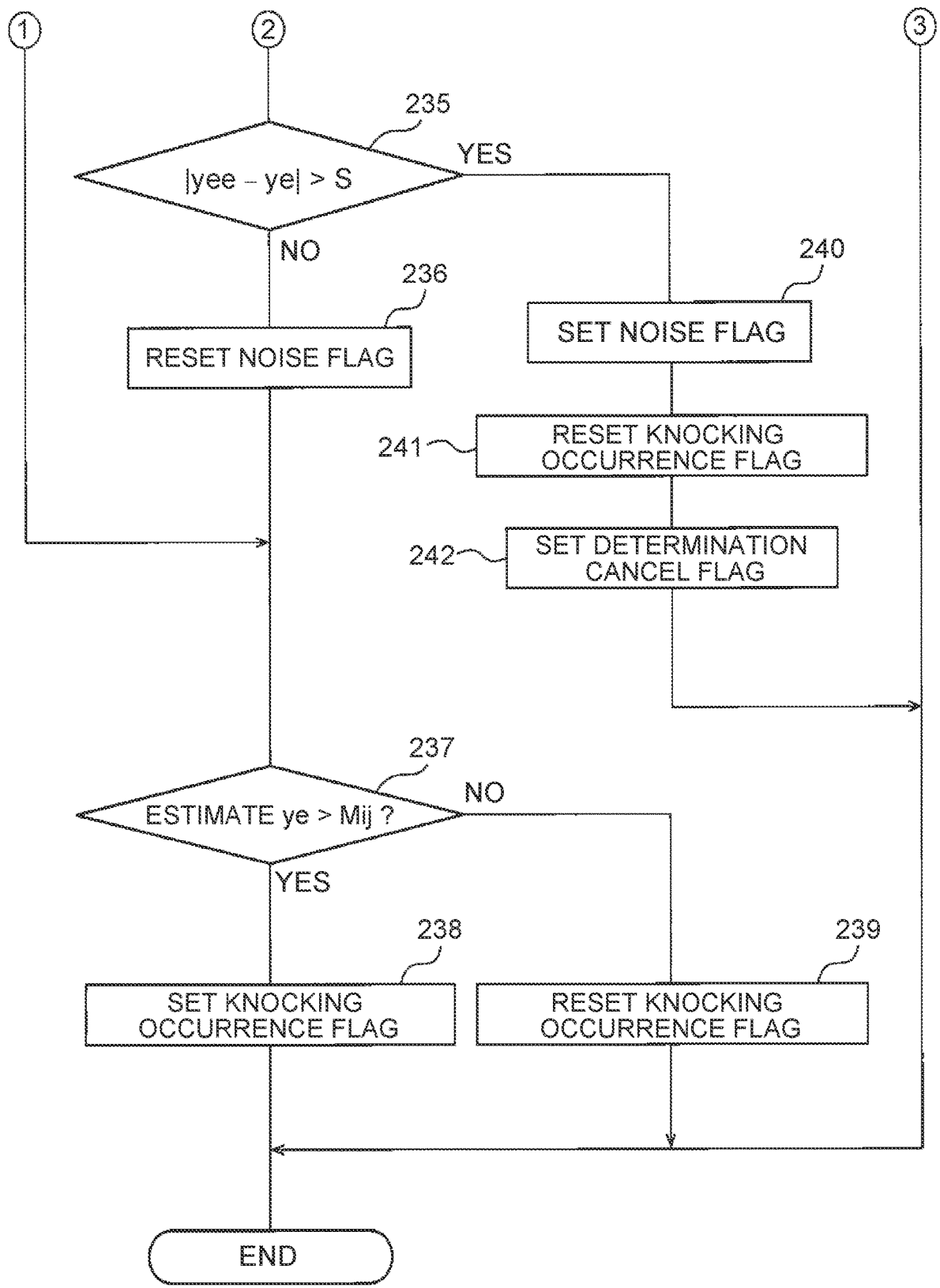
FIG. 41 is a flowchart showing the knocking determination routine.

FIGS. 40 and 41 show a knocking determination routine. The knocking determination routine is performed in step 221 of FIG. 39, based on the estimate ye of the value representing the knocking intensity output from the first learned neural network 20, when the estimate ye of the value representing the knocking intensity is output from the first learned neural network 20 in step 220 of FIG. 39. Steps 230 to 232 and steps 235 to 244 in the knocking determination routine shown in FIGS. 40 and 41 are the same as steps 230 to 232 and steps 235 to 244 in the knocking determination routine shown in FIGS. 31 and 32. The knocking determination routine shown in FIGS. 40 and 41 are different from the knocking determination routine shown in FIGS. 31 and 32 only in that step 230a is added before step 230 in the knocking determination routine shown in FIGS. 40 and 41, and that steps 233 and 234 of the knocking determination routine shown in FIGS. 31 and 32 are replaced with step 233a. Therefore, as for FIGS. 40 and 41, only step 230a and step 233a will be described, and description of the other steps will be omitted.

With reference to FIGS. 40 and 41, in step 230a, the estimate ye of the value representing the knocking intensity output from the first learned neural network 20 is stored until ignition is performed predetermined number of times, for example, five times, in the same cylinder. In step 233a, the estimate ye of the value representing the knocking intensity output from the first learned neural network 20 in each cycle up to the current cycle from the cycle where ignition was performed predetermined number of times before, for example, five times before, and the delay amount $\alpha$ or the advance amount $\beta$ of the ignition timing in each of these cycles are sequentially input into the nodes of the input layer of the recurrent neural network, respectively. As a consequence, the recurrent neural network outputs the predictive value yee of the estimate ye of the value representing the knocking intensity in the current cycle.

In the second embodiment, in order to determine whether or not unlearned engine vibration occurs, it is also determined in step 235 whether or not the absolute value of a difference (yee–ye) between the predictive value yee of the estimate ye of the value representing the knocking intensity and the estimate ye of the value representing the knocking intensity output from the first learned neural network 20 is larger than a set value S. When it is determined that the absolute value of the difference (yee–ye) is smaller than the set value S, the process proceeds to step 236, where the noise flag is reset. Next, the process proceeds to step 239, where it is determined whether or not the estimate ye of the value representing the knocking intensity is larger than the threshold Mij. Meanwhile, when it is determined that the absolute value of the difference (yee–ye) is larger than the set value S, the process proceeds from step 235 to step 240, where the noise flag is set. Then in step 241, the knocking occurrence flag is reset, and then in step 242, the determination cancel flag is set.

Figure 42:
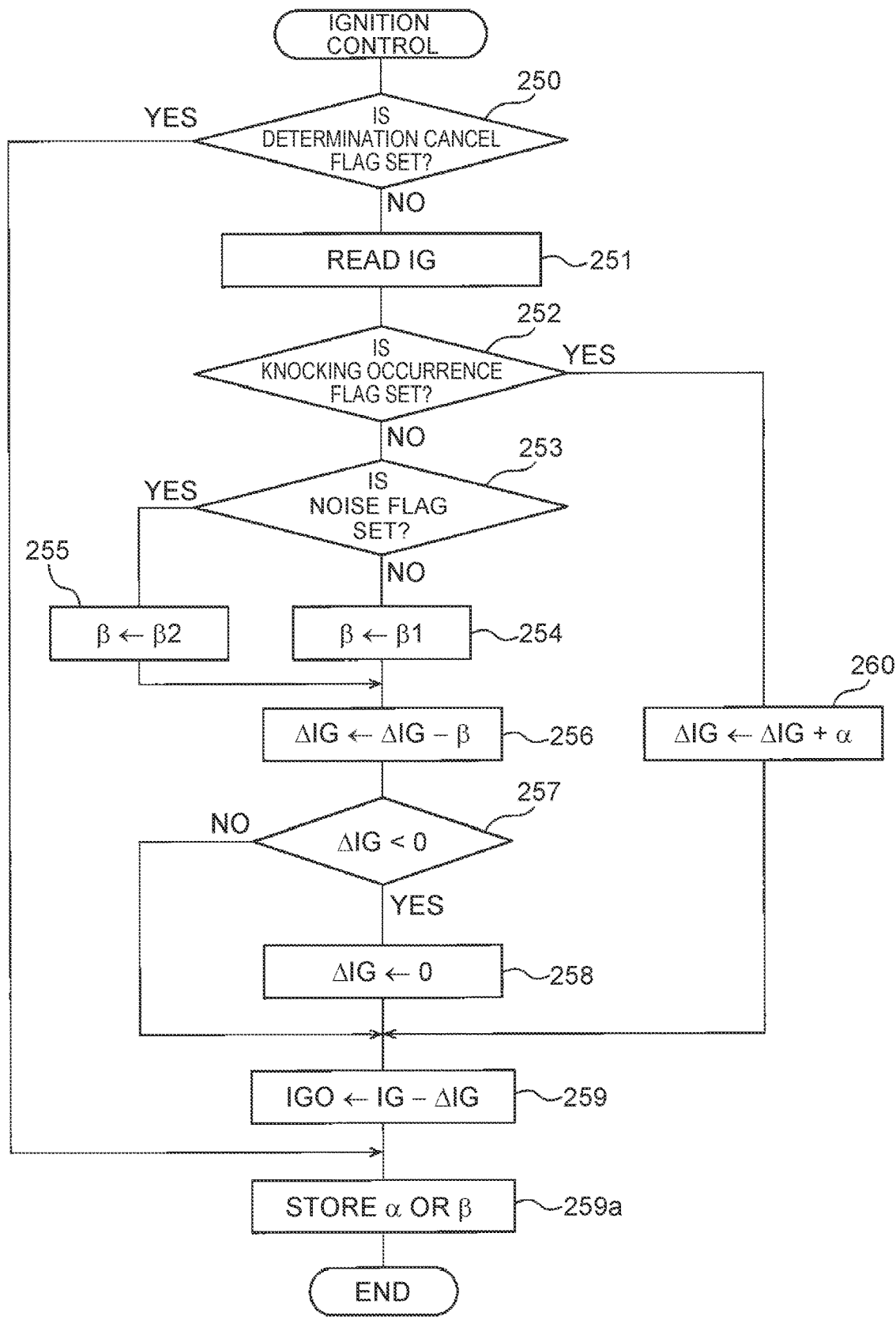
FIG. 42 is a flowchart showing the ignition control routine.

FIG. 42 shows an ignition control routine executed in the electronic control unit 30 based on the determination result in the knocking determination routine shown in FIGS. 40 and 41. Steps 250 to 259 in the ignition control routine shown in FIG. 42 are the same as steps 250 to 259 in the ignition control routine shown in FIG. 33. The ignition control routine shown in FIG. 42 is different from the ignition control routine shown in FIG. 33 only in that step 259a is added after step 259 in the knocking determination routine shown in FIG. 42. Therefore, as for FIG. 42, only step 259a will be described, and description of the other steps will be omitted.

With reference to FIG. 42, in step 259a, the ignition timing delay amount $\alpha$ or the advance amount $\beta$ is stored until ignition is performed predetermined number of times, for example, five times, in the same cylinder. Also in the second embodiment, when the knocking occurrence flag is set, the ignition timing is delayed by a fixed amount $\alpha$, and when the knocking occurrence flag is reset, the ignition timing is advanced by a fixed amount $\beta 1$ or $\beta 2$.

Thus, according to the present disclosure, the first learned neural network is stored in the storage device 32. The first learned neural network estimates a value representing knocking intensity, calculated from output values of the pressure sensor 19 for detecting combustion pressure of air-fuel mixture generated with ignition, based on the output values of the knocking sensor 18 for detecting vibration of the engine body. The second learned neural network that estimates a predictive value or a predictive decrease amount of the estimate of the value representing the knocking intensity when ignition timing is delayed is stored in the storage device 32. When the estimate of the value representing the knocking intensity calculated with use of the first learned neural network exceeds a predetermined threshold, the ignition timing in a next cycle is delayed. In the next cycle where the ignition timing is delayed, control to delay the ignition timing in a cycle after the next cycle is performed based on a difference between the predictive value of the estimate of the value representing the knocking intensity calculated with use of the second learned neural network and the estimate of the value representing the knocking intensity calculated with use of the first learned neural network. When the difference is smaller than a predetermined set value, and the estimate of the value representing the knocking intensity is larger than a preset threshold, the action to delay the ignition timing in a cycle after the next cycle is performed. On the contrary, when the difference is larger than the predetermined set value, the action to delay the ignition timing in the cycle after the next cycle is not performed, even if the estimate of the value representing the knocking intensity is larger than the preset threshold.

In the first embodiment according to the present disclosure, in the second learned neural network, when an operating state of the engine, a delay amount of the ignition timing, and an estimate of the value representing the knocking intensity in a previous cycle are input, a predictive decrease amount of the estimate of the value representing the knocking intensity when the ignition timing is delayed is output. Based on the predictive decrease amount, a predictive value of the estimate of the value representing the knocking intensity when the ignition timing is delayed is calculated. In this case, in the first embodiment according to the present disclosure, the operating state of the engine includes an engine speed, an engine load, and an EGR rate.

In the second embodiment according to the present disclosure, the second learned neural network is formed of a recurrent neural network configured such that when an estimate of the value representing the knocking intensity in each cycle from the cycle where ignition is performed predetermined number of times before to the current cycle, and a delay amount or advance amount of the ignition timing are input, a predictive value of the estimate of the value representing the knocking intensity in the current cycle is output. In the second embodiment, the recurrent neural network may be replaced with a gated recurrent neural network, for example, a long short-term memory (LSTM).

In the first and second embodiments according to the present disclosure, when the action to delay the ignition timing is performed, and then the estimate of the value representing the knocking intensity becomes the predetermined threshold or below, the action to advance the ignition timing is started. When the difference between the estimate representing knocking intensity and the predictive value of the estimate representing knocking intensity when the action to delay the ignition timing is performed is larger than a set value, the advance amount of the ignition timing becomes smaller than the advance amount when the difference is equal to the set value or below.

Furthermore, in the embodiment of the present disclosure, the first learned neural network is such that when values indicating vibration of the engine body 1 that are detected by the knocking sensor 18 within a preset period are input, the estimate of the value representing the knocking intensity is output. In this case, in the embodiment according to the present disclosure, the value representing the knocking intensity is set as a peak value of the output values of the pressure sensor, or the value representing the knocking intensity is set as an integral value of the output values of the pressure sensor. In the embodiment according to the present disclosure, the value indicating vibration of the engine body is set as an output value of the knocking sensor in a preset period, or the value indicating vibration of the engine body are set as an integral value of the output values of the knocking sensor in each equally divided section within a preset period. In this case, the preset period is a fixed crank angle range.

As described before, knocking generally occurs during a period from a compression top dead center to 90° after the compression top dead center. Therefore, in the embodiment described until now, the occurrence of knocking is detected based on the output values of the knocking sensor 18 and the output values of the pressure sensor 19 fetched during the period from a compression top dead center to 90° after the compression top dead center. However, vibration of the engine body 1 caused by knocking tends to be generated in a fixed period of time after the compression top dead center, regardless of the engine speed. In consideration of such tendency, it is considered to detect the occurrence of knocking based on the output values of the knocking sensor 18 and the output values of the pressure sensor 19 fetched during a fixed period of time after the compression top dead center.

Figure 43:
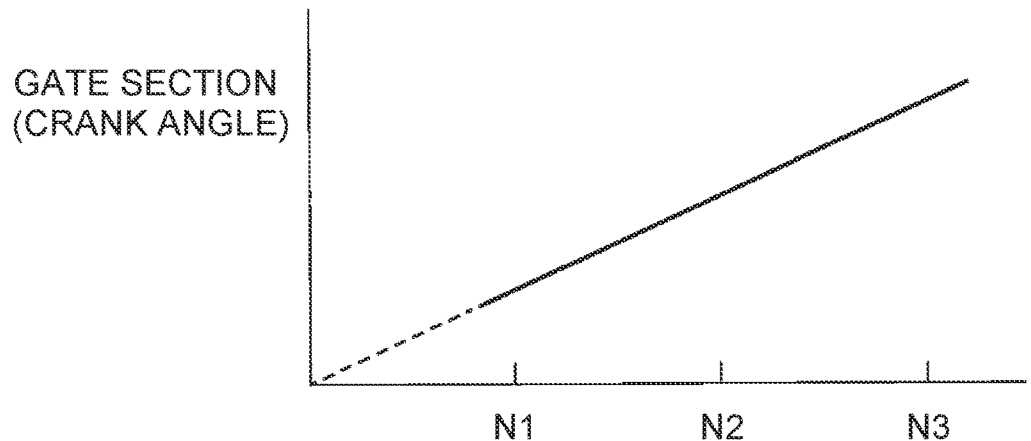
FIG. 43 shows the relationship between a gate section and engine speed.
Figure 44:
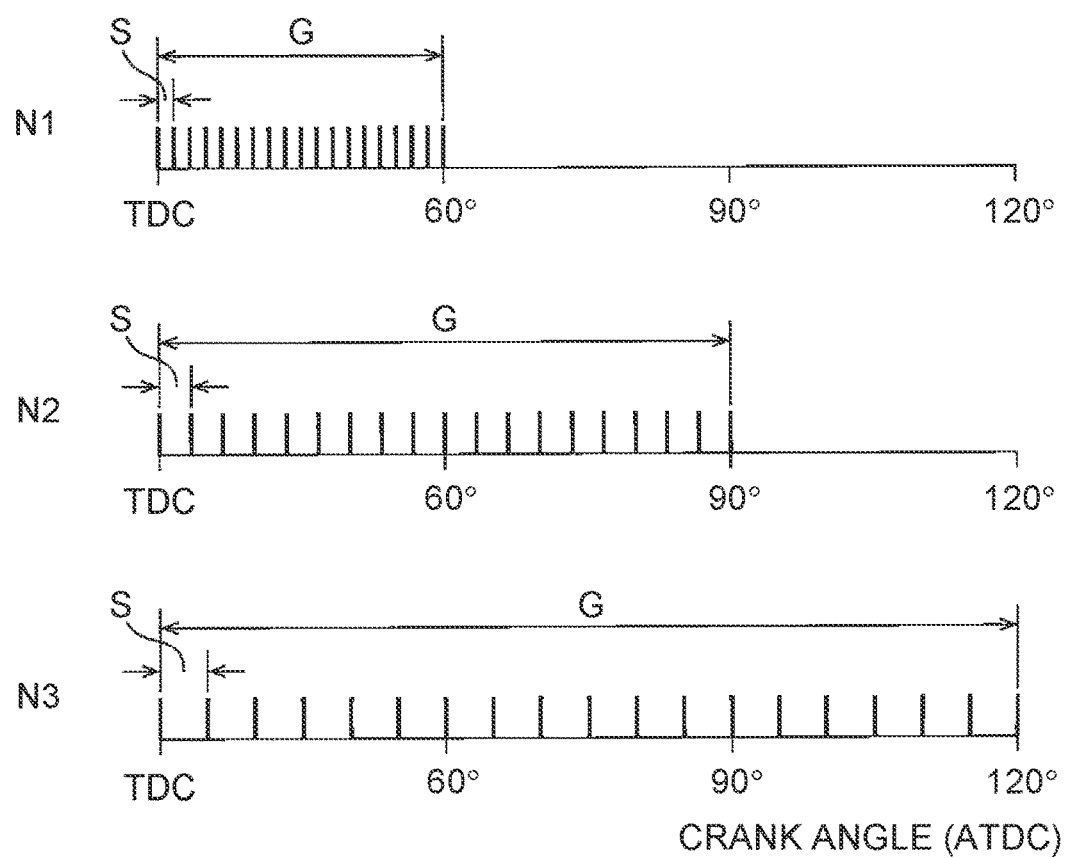
FIG. 44 shows the gate section and divided sections.

Next, with reference to FIGS. 43 and 44, description is given of an embodiment in which learning of the weight of the first neural network 20 is performed based on the output values of the knocking sensor 18 and the output values of the pressure sensor 19 fetched during a fixed period of time after a compression top dead center, and the occurrence of knocking is detected based on the output values of the knocking sensor 18 fetched during the fixed time after the compression top dead center. In one cycle of engine operation, a crank angle range in which the output values of both the knocking sensor 18 and the pressure sensor 19 or the output values of the knocking sensor 18 are fetched is referred to as a gate section. FIG. 43 shows, with a solid line, the relationship between the gate section (vertical axis) and engine speed (horizontal axis) in the embodiment. Note that N1, N2, and N3 in the horizontal axis indicate typical engine speeds.

FIG. 44 shows gate sections G corresponding to the engine speeds N1, N2, N3. FIG. 44 also shows divided sections S divided at equal intervals in the case where an integral value (negative-side integral value being also regarded as positive value) of the output values of the knocking sensor 18 is calculated in each of the divided sections. FIGS. 43 and 44 indicate that as the engine speed becomes higher, a gate section G becomes longer in the embodiment. In the example shown in FIGS. 43 and 44, the period when the output values of the knocking sensor 18 and the output values of the pressure sensor 19 are fetched are set in advance. This preset period is the fixed period. However, it is not necessarily necessary that the preset period is the fixed time. The gate section can be set such that as the engine speed becomes higher, the gate section becomes larger.

In the embodiment described so far, the value representing the knocking intensity is estimated by using one first learned neural network for the entire engine operation region. However, when only one first learned neural network is used for the entire operation region, the estimation accuracy of the value representing the knocking intensity may deteriorate. In order to avoid the deterioration, it is preferable to divide the engine operation region into a plurality of operation regions, and to use different neural networks for the divided operation regions. FIGS. 45A to 45C show an embodiment in which different first neural networks are used for the divided operation regions.

More specifically, in this embodiment, as shown in FIGS. 45A to 45C, the operation region of the engine is divided into a plurality of operation regions in accordance with the engine load L and the engine speed N. As shown in FIG. 45A, different first neural networks $NN_{ij}$ are formed for the divided operation regions, respectively. In this case, as shown in FIG. 45B, a training dataset $DS_{ij}$ as shown in FIG. 9 is prepared for each of the divided operation regions. Learning of the weight of the first neural network $NN_{ij}$ formed for each of the operation regions is performed by using each corresponding training dataset $DS_{ij}$ based on the learning process routine shown in FIG. 10. In the embodiment, as shown in FIG. 45C, the threshold $M_{ij}$ for the knocking intensity representative value is set for each of the divided operation region. In the embodiment, the estimates ye of the knocking intensity representative values are calculated based on the estimation routine of the knocking intensity representative value shown in FIG. 13 or FIG. 14, with use of the corresponding first learned neural networks $NN_{ij}$ for the divided operation regions, respectively.

In the embodiment, the second neural network is also formed for each of the divided operation regions shown in FIG. 45A. The training dataset for the second neural network is also prepared for each of the divided operation regions, and the weight of the second neural network formed for each of the divided operation regions is learned by using a corresponding training dataset. When the estimate ye of the knocking intensity representative value is calculated by the first learned neural network $NN_{ij}$ of a certain operation region, the second learned neural network prepared for the same operation region is used to determine whether or not knocking occurs with use of the corresponding threshold $M_{ij}$ shown in FIG. 45C.

Thus, in the embodiment, the operation region of the engine is divided into a plurality of operation regions, and the first learned neural network and the second learned neural network for each of the divided operation regions are stored in the storage device. For each of the divided operation regions, control to delay the ignition timing in a next cycle is performed based on a difference between the predictive value of the estimate of the value representing the knocking intensity calculated with use of the second learned neural network and the estimate of the value representing the knocking intensity calculated with use of the first learned neural network.

Figure 46:
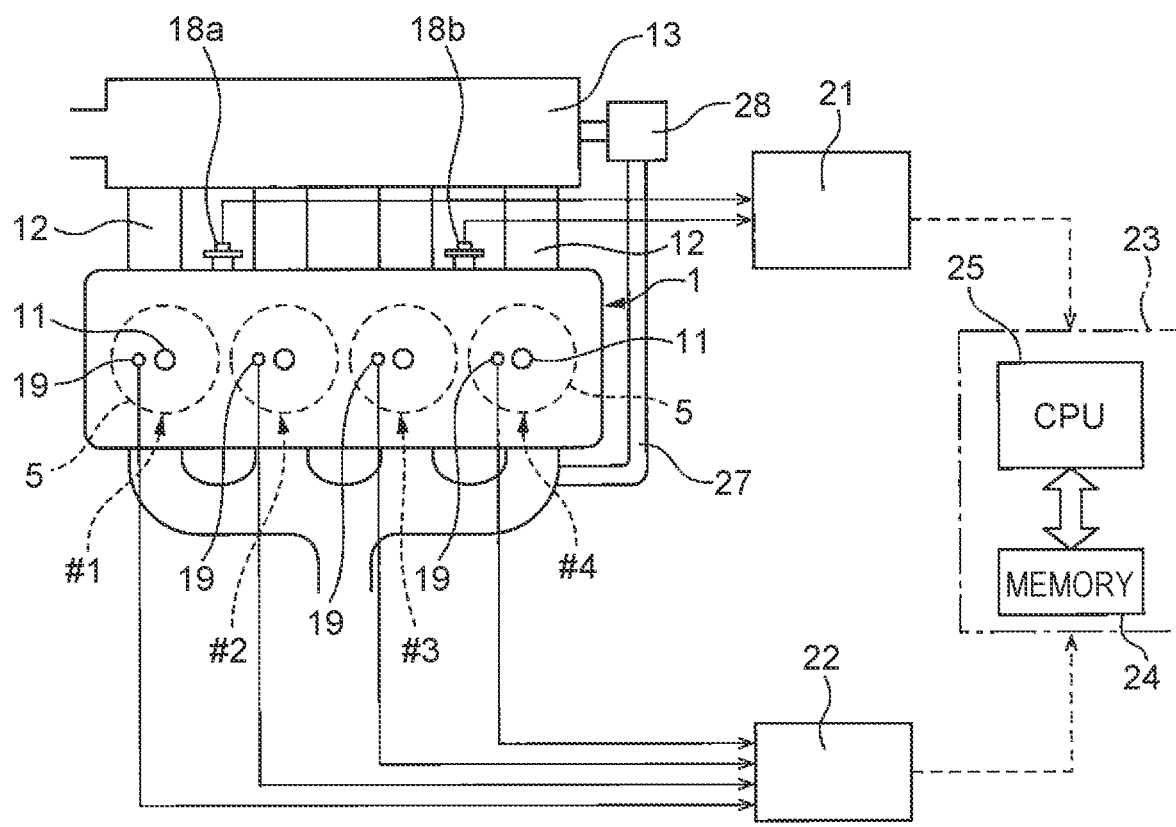
FIG. 46 is a general view of an internal combustion engine.

Still another embodiment is shown in FIGS. 46 and 48. In the embodiment, as shown in FIG. 46, the engine body 1 is equipped with a knocking sensor 18a and a knocking sensor 18b. The knocking sensor 18a and the knocking sensor 18b are connected to a detector 21, for example, an oscilloscope, capable of detecting the waveform of the output value of the knocking sensor 18a, and the waveform of the output value of the knocking sensor 18b. FIG. 46 shows a first cylinder #1, a second cylinder #2, a third cylinder #3, and a fourth cylinder #4 in order from the left side. The knocking sensor 18a is disposed at a position equally distant from the first cylinder #1 and the second cylinder #2, and the knocking sensor 18b is disposed at a position equally distant from the third cylinder #3 and the fourth cylinder #4. Other configuration aspects shown in FIG. 46 are the same as those shown in FIG. 5, and therefore description of the other configuration aspects shown in the FIG. 46 will be omitted.

Figure 47:
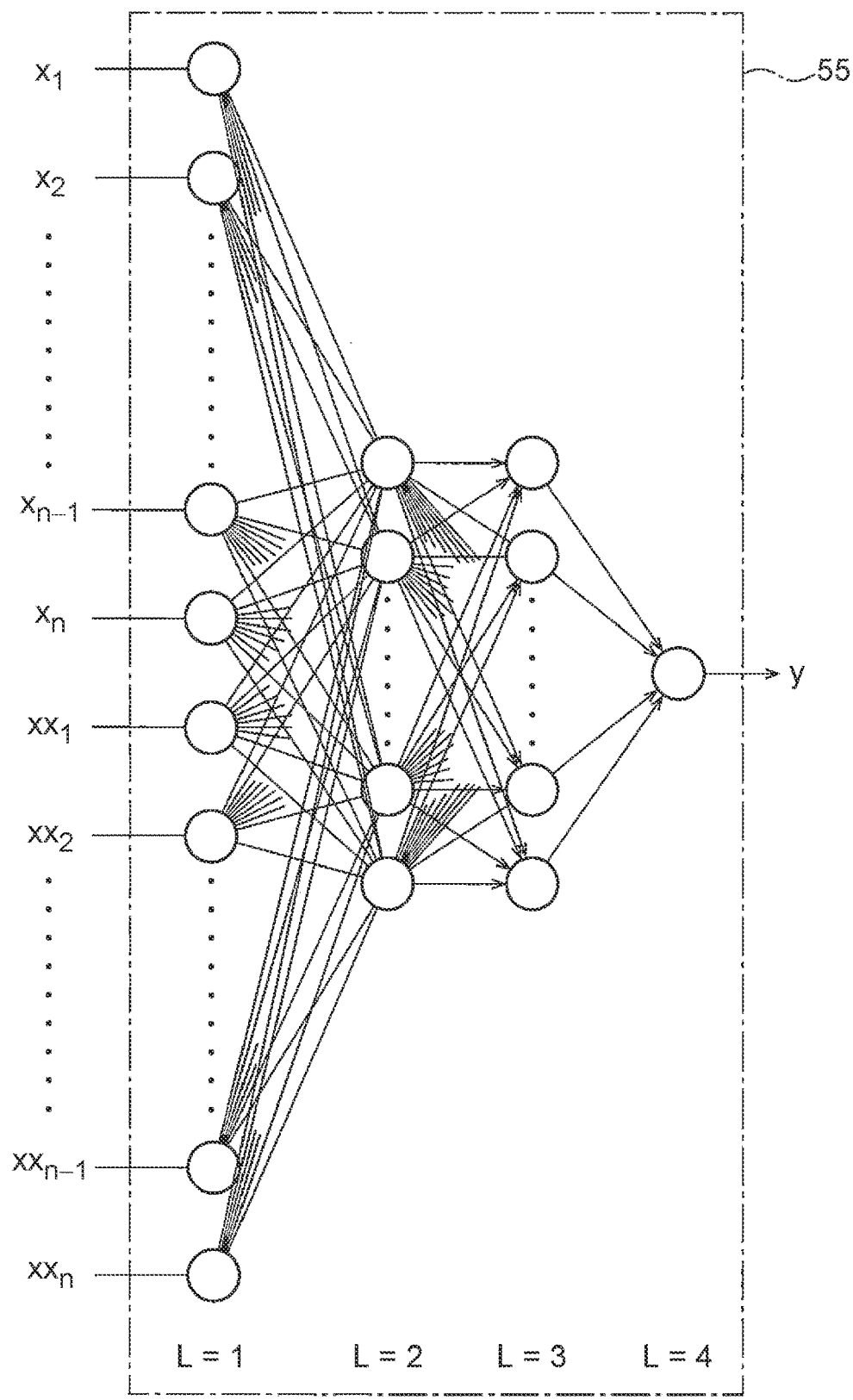
FIG. 47 shows a first neural network used in another embodiment according to the present disclosure.

FIG. 47 shows a first neural network 55 used in the embodiment. With reference to FIG. 47, in the first neural network 55, L=1 indicates an input layer, L=2 and L=3 indicate hidden layers, and L=4 indicates an output layer as in the neural networks shown in FIGS. 3 and 8. In the first embodiment, as shown in FIG. 47, the input layer (L=1) is made up of 2n nodes. While the hidden layer (L=2) and the hidden layer (L=3) are described in FIG. 47, the number of layers of these hidden layers may be one or may be any number, and the number of nodes in these hidden layers may also be any number. There is one node in the output layer (L=4), and an output value from the node of the output layer is expressed with y.

In FIG. 47, input values $x_1$, $x_2$ . . . $x_{n-1}$, $x_n$ are output values of the knocking sensor 18a after filtering, and input values $xx_1$, $xx_2$ . . . $xx_{n-1}$, $xx_n$ are output values of the knocking sensor 18b after filtering. In short, in the embodiment, the filtered output values of both the knocking sensor 18a and the knocking sensor 18b are input into the nodes of the input layer (L=1), respectively. In the embodiment, values shown in FIG. 6B or values shown in FIG. 6C are also used as the input values $x_1$, $x_2$ . . . $xx_{n-1}$, $xx_n$. More specifically, as shown in FIG. 6B, the filtered output values of the knocking sensor 18a and the knocking sensor 18b are set as input values $x_1$, $x_2$ . . . $xx_{n-1}$, $xx_n$, or integral values (negative-side integral value being also regarded as positive values) of the filtered output values of the knocking sensor 18a and the knocking sensor 18b as shown in FIG. 6C, that is, for example, integral values of the output values of the knocking sensor 18a and the knocking sensor 18b in a fixed crank angle, are set as the input values $x_1$, $x_2$ . . . $xx_{n-1}$, $xx_n$.

Meanwhile, as the output value y shown in FIG. 47, the value representing the knocking intensity calculated from the output values of the pressure sensor 19 is adopted as in the case shown in FIG. 8. In this case, as in the case shown in FIG. 8, a peak value of the filtered output values of the pressure sensor 19 indicated with a circle mark in FIG. 7B is used as the output value y, or an integral value of the filtered output values of the pressure sensor 19 (negative-side integral value being also regarded as positive value) shown in FIG. 7C is used as the output value y. Also in this case, an actual measurement value of the value representing the knocking intensity, calculated from the output value of the pressure sensor 19, is set as the teacher data $y_t$.

FIG. 48 shows a training dataset prepared by using the input values $x_1$, $x_2$ . . . $xx_{m-1}$, $xx_m$ and an actual measurement value of the value representing the knocking intensity, calculated from the output value of the pressure sensor 19, that is, the teacher data $y_t$. As shown in FIG. 48, for the training dataset, m pieces of data indicating the relationship between the input values $x_1$, $x_2$ . . . $xx_{m-1}$, $xx_m$ and the teacher data $y_t$ are acquired. The preparation method of the training dataset is the same as the preparation method of the training dataset already described with reference to FIG. 9. More specifically, at the time of preparing the training dataset, the engine is operated such that both an operating state where knocking occurs and an operating state where knocking does not occur are generated in various combinations of the engine load and the engine speed in FIG. 46. Based on the data obtained from the detectors 21, 22 at the time, the training dataset as shown in FIG. 48 is prepared.

When the training dataset is prepared, the weight of the first neural network 55 shown in FIG. 47 is learned with use of the thus-prepared electronic data of the training dataset. The learning method of the weight of the first neural network is the same as the learning method of the weight of the first neural network described with reference to FIG. 5. More specifically, when learning the weight of the first neural network 55 shown in FIG. 47 is performed, the number of nodes of the first neural network 55 and the prepared electronic data of the training dataset are stored in the memory 24 of the learning apparatus 23 shown in FIG. 46. In CPU 25, learning of the weight of the first neural network 55 is performed using the learning process routine shown in FIG. 10.

Thus, in the embodiment, the knocking sensors 18*a*, 18*b* for detecting vibration of the engine body 1 are included. When values indicating vibration of the engine body 1 that are detected by the knocking sensors 18*a*, 18*b* are input, the first learned neural network 55 outputs the value representing the knocking intensity. Thus, when learning of the weight of the first neural network 55 is performed by using the knocking sensors 18*a*, 18*b* and using the output values of both the knocking sensors 18*a*, 18*b*, more information can be acquired than when one knocking sensor is used. As a result, the value representing the knocking intensity can be estimated with sufficient accuracy.

What is claimed is:

1. An ignition timing control device for an internal combustion engine, the ignition timing control device comprising:
    a storage device configured to store a first learned neural network and a second learned neural network, the first learned neural network being configured to calculate an estimate of a value representing knocking intensity, calculated from output values of a pressure sensor for detecting combustion pressure of an air-fuel mixture generated with ignition, based on output values of a knocking sensor for detecting vibration of an engine body, the second learned neural network being configured to calculate a predictive value or a predictive decrease amount of the estimate of the value representing the knocking intensity when ignition timing of the internal combustion engine is delayed; and
    a processor configured to delay the ignition timing in a next cycle, when the estimate of the value representing the knocking intensity, calculated with use of the first learned neural network, exceeds a predetermined threshold, the processor being configured to perform, in the next cycle where the ignition timing is delayed, control to delay the ignition timing in a cycle after the next cycle based on a difference between the predictive value of the estimate of the value representing the knocking intensity calculated with use of the second learned neural network and the estimate of the value representing the knocking intensity calculated with use of the first learned neural network, the processor being configured to perform the control to delay the ignition timing in the cycle after the next cycle when the difference is smaller than a predetermined set value and the estimate of the value representing the knocking intensity is larger than a preset threshold, and when the difference is larger than the predetermined set value, the processor being configured not to perform the control to delay the ignition timing in the cycle after the next cycle even if the estimate of the value representing the knocking intensity is larger than the preset threshold.

2. The ignition timing control device for the internal combustion engine according to claim 1, wherein the second learned neural network is configured such that when an operating state of the internal combustion engine, a delay amount of the ignition timing, and the estimate of the value representing the knocking intensity in a previous cycle are input, the predictive decrease amount of the estimate of the value representing the knocking intensity when the ignition timing is delayed is calculated, and the predictive value of the estimate of the value representing the knocking intensity when the ignition timing is delayed is output based on the predictive decrease amount.

3. The ignition timing control device for the internal combustion engine according to claim 2, wherein the operating state of the internal combustion engine includes an engine speed, an engine load, and an EGR rate.

4. The ignition timing control device for the internal combustion engine according to claim 1, wherein the second learned neural network is configured from a recurrent neural network, the recurrent neural network being configured such that when the estimate of the value representing the knocking intensity in each cycle from a cycle where ignition is performed predetermined number of times before to a current cycle, and a delay amount or an advance amount of the ignition timing are input, the predictive value of the estimate of the value representing the knocking intensity in the current cycle is output.

5. The ignition timing control device for the internal combustion engine according to claim 1, wherein:
    when the control to delay the ignition timing is performed, and then the estimate of the value representing the knocking intensity becomes equal to the predetermined threshold or below, the processor is configured to start control to advance the ignition timing, and
    when the difference in the control to delay the ignition timing is larger than the set value, the processor is configured to make the advance amount of the ignition timing smaller than the advance amount when the difference is equal to the set value or below.

6. The ignition timing control device for the internal combustion engine according to claim 1, wherein the first learned neural network is configured such that when a value indicating vibration of the engine body that is detected by the knocking sensor within a preset period is input, the estimate of the value representing the knocking intensity is output.

7. The ignition timing control device for the internal combustion engine according to claim 6, wherein the value representing the knocking intensity is a peak value of the output values of the pressure sensor.

8. The ignition timing control device for the internal combustion engine according to claim 6, wherein the value representing the knocking intensity is an integral value of the output values of the pressure sensor.

9. The ignition timing control device for the internal combustion engine according to claim 6, wherein the value indicating vibration of the engine body is an output value of the knocking sensor within the preset period.

10. The ignition timing control device for the internal combustion engine according to claim 6, wherein the value indicating vibration of the engine body is an integral value of the output values of the knocking sensor in equally divided sections within the preset period.

11. The ignition timing control device for the internal combustion engine according to claim 6, wherein the preset period is a fixed crank angle range.

12. The ignition timing control device for the internal combustion engine according to claim 6, wherein the preset period is fixed time.

13. The ignition timing control device for the internal combustion engine according to claim 1, wherein:
    the storage device is configured to store the first learned neural network and the second learned neural network for each of a plurality of divided operation regions of the internal combustion engine; and the processor is configured to perform the control to delay the ignition timing in the cycle after the next cycle in each of the divided operation regions, based on the difference between the predictive value of the estimate of the value representing the knocking intensity calculated with use of the second learned neural network and the estimate of the value representing the knocking intensity calculated with use of the first learned neural network.

14. The ignition timing control device for the internal combustion engine according to claim 1, wherein:
the internal combustion engine includes a plurality of the knocking sensors that detect vibration of the engine body; and
the first learned neural network is configured such that when values indicating vibration of the engine body that are detected by the knocking sensors are input, the value representing the knocking intensity is output.

* * * * *